(12) United States Patent
Hayashi et al.

(10) Patent No.: US 11,668,375 B2
(45) Date of Patent: Jun. 6, 2023

(54) PARALLEL LINK MECHANISM AND LINK ACTUATION DEVICE

(71) Applicants: KYUSHU INSTITUTE OF TECHNOLOGY, Fukuoka (JP); NTN CORPORATION, Osaka (JP)

(72) Inventors: Akihiro Hayashi, Iizuka (JP); Hirofumi Fukumaru, Iizuka (JP); Taiga Okamoto, Iizuka (JP); Kenzou Nose, Iwata (JP); Hideki Matsuzawa, Iwata (JP); Hiroshi Isobe, Iwata (JP); Seigo Sakata, Iwata (JP)

(73) Assignees: KYUSHU INSTITUTE OF TECHNOLOGY, Fukuoka (JP); NTN CORPORATION, Osaka (JP)

( * ) Notice: Subject to any disclaimer, the term of this patent is extended or adjusted under 35 U.S.C. 154(b) by 234 days.

(21) Appl. No.: 17/283,218

(22) PCT Filed: Oct. 9, 2019

(86) PCT No.: PCT/JP2019/039901
§ 371 (c)(1),
(2) Date: Apr. 6, 2021

(87) PCT Pub. No.: WO2020/075779
PCT Pub. Date: Apr. 16, 2020

(65) Prior Publication Data
US 2021/0388887 A1    Dec. 16, 2021

(30) Foreign Application Priority Data

Oct. 10, 2018 (JP) .............................. JP2018-191816
Dec. 7, 2018 (JP) .............................. JP2018-229954
Dec. 7, 2018 (JP) .............................. JP2018-230100

(51) Int. Cl.
F16H 21/46   (2006.01)
B25J 9/00    (2006.01)
B25J 9/16    (2006.01)

(52) U.S. Cl.
CPC ............ *F16H 21/46* (2013.01); *B25J 9/0048* (2013.01); *B25J 9/1623* (2013.01)

(58) Field of Classification Search
CPC ........ B25J 9/1623; B25J 9/0048; F16H 21/46
See application file for complete search history.

(56) References Cited

U.S. PATENT DOCUMENTS

| 5,893,296 A | 4/1999 | Rosheim | |
| 2005/0159075 A1* | 7/2005 | Isobe | B25J 9/0048 446/104 |

(Continued)

FOREIGN PATENT DOCUMENTS

| EP | 0987087 A2 | 3/2000 |
| JP | 2000-094245 A | 4/2000 |

(Continued)

OTHER PUBLICATIONS

International Search Report issued in corresponding International Patent Application No. PCT/JP2019/039901, dated Dec. 17, 2019, with English translation.

*Primary Examiner* — Terence Boes
(74) *Attorney, Agent, or Firm* — McDermott Will & Emery LLP

(57) ABSTRACT

A parallel link mechanism includes a proximal end member and three or more link mechanisms. Three or more link mechanisms connect the proximal end member to a distal end member. In three or more link mechanisms, a first center axis of a first revolute pair unit and a second center axis of a second revolute pair unit intersect at a spherical link center point. Fifth center axes of respective fifth revolute pair units (Continued)

of three or more link mechanisms overlap each other and intersect with the spherical link center point.

15 Claims, 30 Drawing Sheets

(56) References Cited

U.S. PATENT DOCUMENTS

| | | | |
|---|---|---|---|
| 2006/0213308 A1* | 9/2006 | Rosheim | B25J 17/0266 |
| | | | 74/490.01 |
| 2016/0256998 A1 | 9/2016 | Isobe et al. | |
| 2017/0014994 A1* | 1/2017 | Isobe | B25J 9/08 |
| 2021/0197362 A1* | 7/2021 | Nose | G05B 19/0426 |
| 2022/0134538 A1* | 5/2022 | Trui | B25J 9/045 |
| | | | 74/490.01 |
| 2022/0166288 A1* | 5/2022 | Nose | F16H 21/46 |
| 2022/0234199 A1* | 7/2022 | Hayashi | F16H 21/46 |

FOREIGN PATENT DOCUMENTS

| | | | |
|---|---|---|---|
| JP | 2015-102125 A | 6/2015 | |
| JP | 2016-112633 A | 6/2016 | |
| JP | 2016-147351 A | 8/2016 | |
| JP | 2021008926 A * | 1/2021 | F16H 21/46 |

* cited by examiner

| ACTING FORCE \ DIRECTION | 0 | 0.5 | 1.0 | 1.5 | 2.0 | 2.5 |
|---|---|---|---|---|---|---|
| 0 | T1 T2 T3 | T1 T2 T3 | T1 T2 T3 | T1 T2 T3 | T1 T2 T3 | T1 T2 T3 |
| 1.0 | T1 T2 T3 | T1 T2 T3 | T1 T2 T3 | T1 T2 T3 | T1 T2 T3 | T1 T2 T3 |
| 2.0 | T1 T2 T3 | T1 T2 T3 | T1 T2 T3 | T1 T2 T3 | T1 T2 T3 | T1 T2 T3 |
| 3.0 | T1 T2 T3 | T1 T2 T3 | T1 T2 T3 | T1 T2 T3 | T1 T2 T3 | T1 T2 T3 |
| 4.0 | T1 T2 T3 | T1 T2 T3 | T1 T2 T3 | T1 T2 T3 | T1 T2 T3 | T1 T2 T3 |

PARALLEL LINK MECHANISM AND LINK ACTUATION DEVICE

CROSS REFERENCE TO RELATED APPLICATIONS

This patent application is the U.S. National Phase under 35 U.S.C. § 371 of International Application No. JP2019/039901, filed on Oct. 9, 2019, which claims the benefit of Japanese Patent Application No. 2018-191816, dated Oct. 10, 2018, Japanese Patent Application No. 2018-229954, dated Dec. 7, 2018, and Japanese Patent Application No. 2018-230100, dated Dec. 7, 2018, the entire contents of each are hereby incorporated by reference in their entirety.

TECHNICAL FIELD

The present invention relates to a parallel link mechanism and a link actuation device.

BACKGROUND ART

Conventionally, parallel link mechanisms for use in various apparatuses such as medical instruments and industrial instruments are known (for example, see Japanese Patent Laying-Open No. 2000-94245 (PTL 1) and U.S. Pat. No. 5,893,296 (PTL 2)).

CITATION LIST

Patent Literature

PTL 1: Japanese Patent Laying-Open No. 2000-94245
PTL 2: U.S. Pat. No. 5,893,296

SUMMARY OF INVENTION

Technical Problem

The parallel link mechanism in PTL 1 has a relatively simple configuration but the operating angle of each link is small. Therefore, when a large operating range of the traveling plate is set, the link length is increased, leading to size increase of the entire mechanism and a larger size of the apparatus.

In the parallel link mechanism in PTL 2, a proximal end-side link hub as a proximal end member and a distal end-side link hub as a distal end member are coupled through three or more sets of link mechanisms in a four-bar chain. In the parallel link mechanism in PTL 2, the posture of the distal end member can be changed relative to the proximal end member. The parallel link mechanism in PTL 2 is compact but can move in a wide operating range at high speed and high accuracy.

However, in the parallel link mechanism in PTL 2, the radius of rotation of the movement path of the distal end member changes with the position of the distal end member, and the position of the center of rotation in rotational movement of the distal end member is unable to be fixed. That is, the distal end member is unable to move on a sphere having a certain radius from the fixed center of rotation as viewed from the proximal end member, and therefore, it is difficult to imagine the operation of the distal end member. Moreover, since the distal end member operates with two degrees of freedom of rotation relative to the proximal end member, it is impossible to control the radius of rotation of the distal end member independently of the rotational movement of the distal end member.

An object of the present invention is to provide a parallel link mechanism and a link actuation device in which a distal end member is movable on a sphere having a certain radius from a fixed center of rotation and the radius of rotation of the distal end member can be controlled independently of rotational movement.

Solution to Problem

A parallel link mechanism according to the present disclosure includes a proximal end member and three or more link mechanisms. The three or more link mechanisms connect the proximal end member to a distal end member. The three or more link mechanisms are capable of changing a posture of the distal end member relative to the proximal end member. Each of the three or more link mechanisms includes first to fourth link members. The first link member is rotatably connected to the proximal end member at a first revolute pair unit. The second link member is rotatably connected to the first link member at a second revolute pair unit. The third link member is rotatably connected to the second link member at a third revolute pair unit. The fourth link member is rotatably connected to the third link member at a fourth revolute pair unit. The fourth link member is further rotatably connected to the distal end member at a fifth revolute pair unit. In the three or more link mechanisms, a first center axis of the first revolute pair unit and a second center axis of the second revolute pair unit intersect at a spherical link center point. Fifth center axes of the respective fifth revolute pair units of the three or more link mechanisms overlap each other and intersect with the spherical link center point.

A link actuation device according to the present disclosure includes the parallel link mechanism described above and a posture control drive source. The posture control drive source is installed in each of at least three link mechanisms among the three or more link mechanisms and changes a posture of the distal end member relative to the proximal end member as desired.

A link actuation device according to the present disclosure includes a proximal end member and three or more link mechanisms. The three or more link mechanisms connect the proximal end member to a distal end member. The three or more link mechanisms are capable of changing a posture of the distal end member relative to the proximal end member. Each of the three or more link mechanisms includes first to fourth link members. The first link member is rotatably connected to the proximal end member at a first revolute pair unit. The second link member is rotatably connected to the first link member at a second revolute pair unit. The third link member is rotatably connected to the second link member at a third revolute pair unit. The fourth link member is rotatably connected to the third link member at a fourth revolute pair unit. The fourth link member is further rotatably connected to the distal end member at a fifth revolute pair unit. In the three or more link mechanisms, a first center axis of the first revolute pair unit and a second center axis of the second revolute pair unit intersect at a spherical link center point. Fifth center axes of the respective fifth revolute pair units of the three or more link mechanisms overlap each other and intersect with the spherical link center point. The link actuation device further includes a posture control drive source and a working body attachment member. The posture control drive source is installed in each of at least three link mechanisms among the three or more link mechanisms and changes a posture of the distal end member relative to the proximal end member as desired. The working body attachment member is fixed to any of the three or more fourth link members.

The present disclosure relates to a link actuation device that uses a parallel link mechanism including a proximal end member and at least three link mechanisms connecting the proximal end member to a distal end member and controls a position and a posture of the distal end member. Each of the at least three link mechanisms includes a first link member rotatably connected to the proximal end member at a first revolute pair unit, a second link member rotatably connected to the first link member at a second revolute pair unit, a third link member rotatably connected to the second link member at a third revolute pair unit, and a fourth link member rotatably connected to the third link member at a fourth revolute pair unit. In each of the at least three link mechanisms, a first center axis of the first revolute pair unit and a second center axis of the second revolute pair unit intersect at a single spherical link center point. The fourth link members of the at least three link mechanisms are rotatably connected to each other at a fifth revolute pair unit. A fifth center axis of the fifth revolute pair unit passes through the spherical link center point. The fourth link member of at least one link mechanism among the at least three link mechanisms is fixed to the distal end member at the fifth revolute pair unit. The link actuation device includes first to third posture control drive sources and a control device. The first to third posture control drive sources are provided corresponding to first to third link mechanisms among the at least three link mechanisms and each changes a rotation angle at the first revolute pair unit of a corresponding first link member. The control device estimates respective torques of the first to third posture control drive sources based on values of current flowing through the first to third posture control drive sources or current command values and estimates a load acting on the distal end member based on the estimated torques.

Preferably, the control device detects that a collision has occurred to the distal end member or a working body mounted on the distal end member from the amount of change in the estimated torques of the posture control drive sources, and interrupts operation of the first to third posture control drive sources.

Preferably, a working body is mounted on the distal end member. The control device controls the first to third posture control drive sources such that an operation of pushing a member gripped by the working body into another member or an operation of pulling a member gripped by the working body out of another member is performed while the estimated torques of the first to third posture control drive sources are monitored.

Advantageous Effects of Invention

According to the description above, a parallel link mechanism and a link actuation device are provided in which the distal end member is movable on a sphere having a certain radius from a fixed center of rotation, and the radius of rotation of the distal end member can be controlled independently of rotational movement.

According to the description above, a link actuation device is provided, which achieves a fast and accurate operation with a heavy-weight working body attached thereto, and in which the radius of rotation of the distal end member can be controlled independently of rotational movement.

According to the description above, a load on the link actuation device can be fed back, the variety of working that can be performed by the link actuation device increases, and safety can be improved.

DESCRIPTION OF EMBODIMENTS

Figure 1:
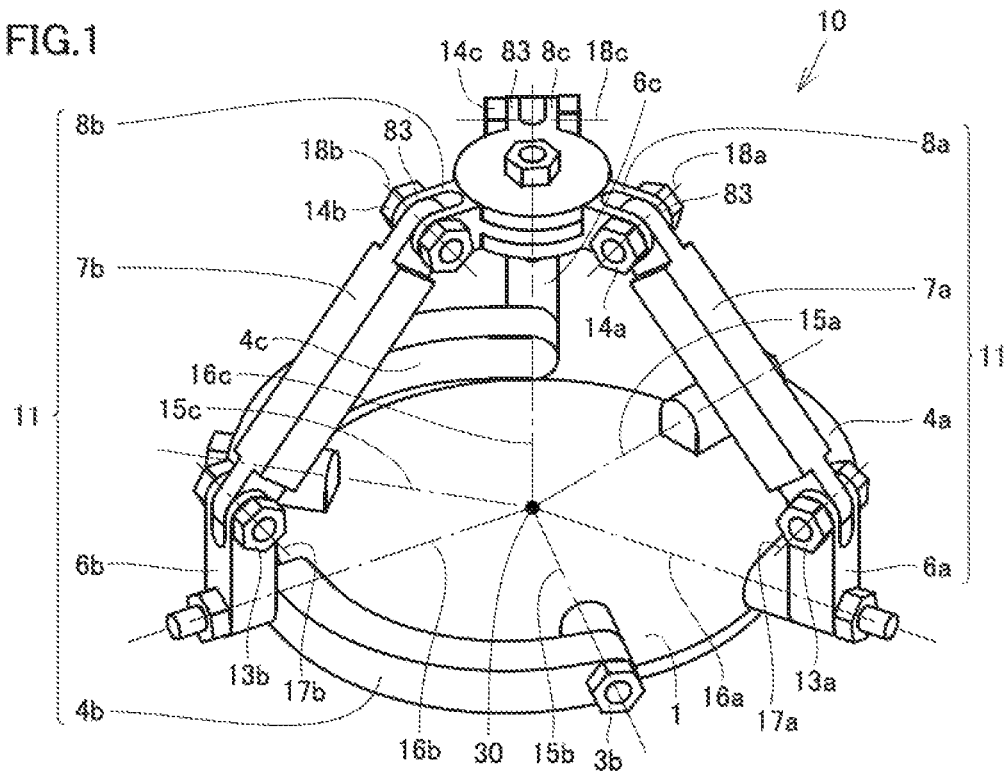
FIG. 1 is a perspective view illustrating a configuration of a parallel link mechanism according to a first embodiment.

Embodiments of the present invention will be described below with reference to the drawings. Like or corresponding parts in the drawings are denoted by like reference numerals and a description thereof is not repeated.

First Embodiment

<Configuration of Parallel Link Mechanism>

Figure 2:
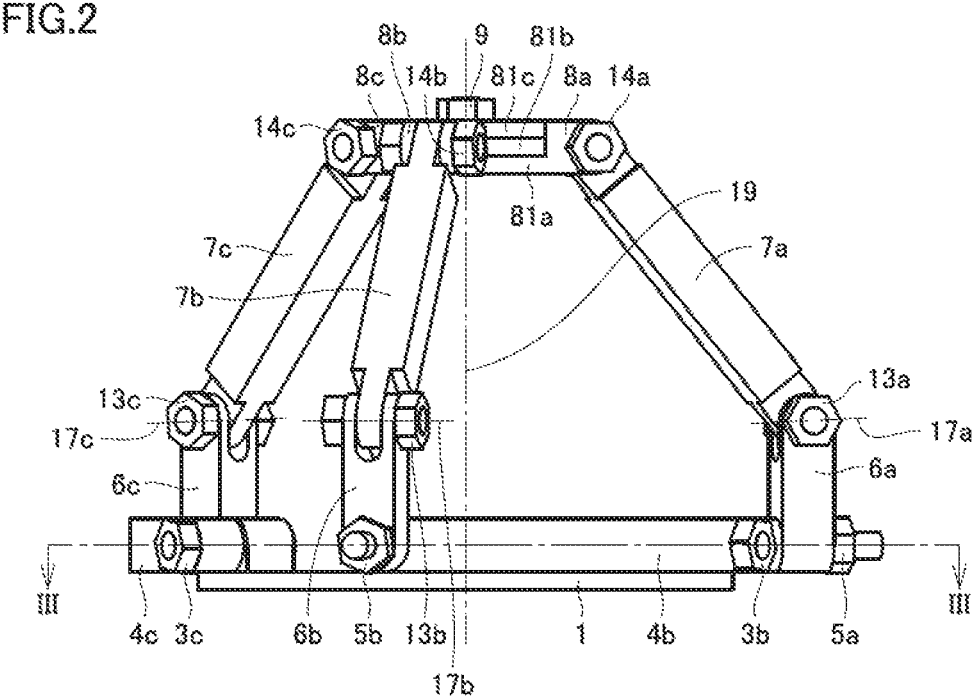
FIG. 2 is a front view of the parallel link mechanism illustrated in FIG. 1.
Figure 3:
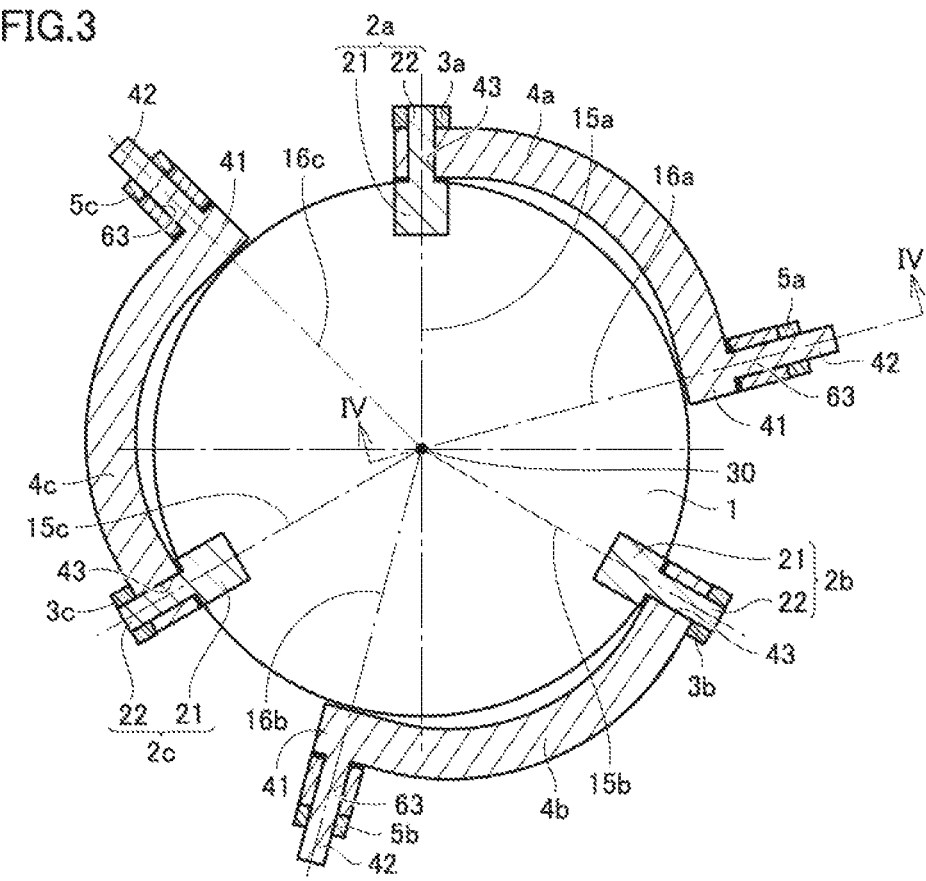
FIG. 3 is a cross-sectional view in line III-III in FIG. 2.
Figure 4:
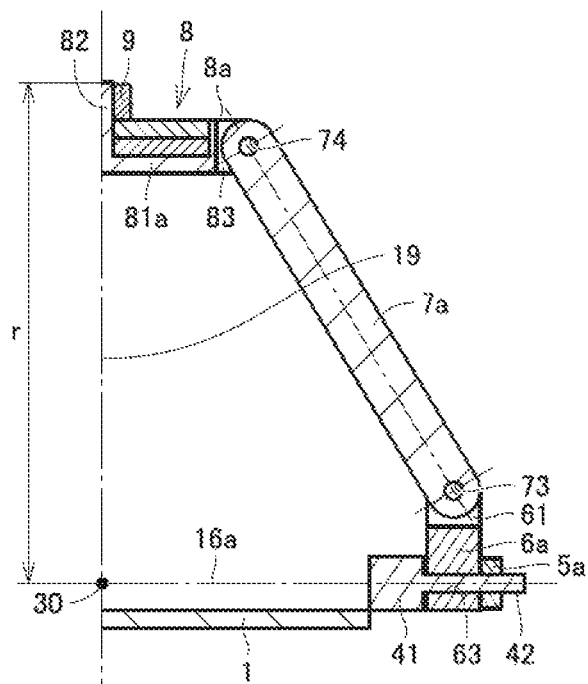
FIG. 4 is a cross-sectional view in line IV-IV in FIG. 3.

FIG. 1 is a perspective view illustrating a configuration of a parallel link mechanism according to a first embodiment of the present invention. FIG. 2 is a front view of the parallel link mechanism illustrated in FIG. 1. FIG. 3 is a cross-sectional view in line III-III in FIG. 2. FIG. 4 is a cross-sectional view in line IV-IV in FIG. 3.

A parallel link mechanism 10 illustrated in FIG. 1 to FIG. 4 includes a proximal end member 1, a distal end member 8, and three link mechanisms 11. Proximal end member 1 is a plate-shaped body having a circular shape in two dimensions. Proximal end member 1 may have any shape. For example, the two-dimensional shape of proximal end member 1 may be polygonal such as quadrangular and triangular, or oval or semi-circular. The number of link mechanisms 11 is three or more, for example, may be four or five.

Three link mechanisms 11 connect proximal end member 1 to distal end member 8 such that a posture of distal end member 8 relative to proximal end member 1 can be changed. Three link mechanisms 11 include respective first link members 4a, 4b, and 4c, respective second link members 6a, 6b, and 6c, respective third link members 7a, 7b, and 7c, and respective fourth link members 8a, 8b, and 8c. First link members 4a, 4b, and 4c are each rotatably connected to proximal end member 1 at a first revolute pair unit. Specifically, proximal-end connecting portions 2a, 2b, and 2c are installed at an outer peripheral portion of proximal end member 1. Proximal-end connecting portions 2a, 2b, and 2c each include a base portion 21 fixed to a surface of proximal end member 1 and a shaft portion 22 formed to protrude from base portion 21 toward the outer periphery. Shaft portion 22 is inserted into a through hole 43 in a corresponding one of first link members 4a, 4b, and 4c. Nuts 3a, 3b, and 3c, which are an example of a fastening member, are respectively fixed to tip end portions of shaft portions 22 protruding from through holes 43 of first link members 4a, 4b, and 4c. First link members 4a, 4b, and 4c are each rotatable around shaft portion 22. Shaft portion 22 and a portion of the corresponding one of first link members 4a, 4b, and 4c having through hole 43 receiving this shaft portion 22 constitute the first revolute pair unit.

First link members 4a, 4b, and 4c are rod-shaped members each extending in the form of an arc. The above-noted through hole 43 is formed at a first end of each of first link members 4a, 4b, and 4c. As illustrated in FIG. 3, in a two-dimensional view as viewed from a direction vertical to the surface of proximal end member 1, the inner peripheral-side surfaces of first link members 4a, 4b, and 4c are each shaped like a curved surface. The radius of curvature of the inner peripheral-side surface in the two-dimensional view is smaller than the radius of curvature of the outer periphery of proximal end member 1. The radius of curvature of the inner peripheral-side surface may be the same as the radius of curvature of the outer periphery of proximal end member 1 or may be larger than the radius of curvature of the outer periphery. The shape of first link members 4a, 4b, and 4c may be a shape other than an arc shape. For example, the shape of first link members 4a, 4b, and 4c may be a rod-like shape extending linearly or a rod-like shape including a bending portion. As illustrated in FIG. 3, first link members 4a, 4b, and 4c are arranged outside of the outer periphery of proximal end member 1.

In each of first link members 4a, 4b, and 4c, a shaft portion 42 is formed at a second end 41 positioned on the opposite side to the first end having through hole 43. Shaft portion 42 is formed to extend from the outer periphery of proximal end member 1 toward the outside. Shaft portion 42 is formed on the outer peripheral side surface on the opposite side to the inner peripheral side surface facing proximal end member 1 in each of first link members 4a, 4b, and 4c. Shaft portion 42 is inserted in a through hole 63 of the corresponding one of second link members 6a, 6b, and 6c. Nuts 5a, 5b, and 5c, which are an example of the fastening member, are respectively fixed to the tip end portions of shaft portions 42 protruding from through holes 63 of second link members 6a, 6b, and 6c. Second link members 6a, 6b, and 6c are each rotatable around shaft portion 42. Shaft portion 42 and a portion of the corresponding one of second link members 6a, 6b, and 6c having through hole 63 receiving this shaft portion 42 constitute a second revolute pair unit. That is, second link members 6a, 6b, and 6c are rotatably connected to first link members 4a, 4b, and 4c, respectively, at the respective second revolute pair units.

Each of center axes 15a, 15b, and 15c of shaft portions 22 in proximal-end connecting portions 2a, 2b, and 2c corresponds to the center axis of the first revolute pair unit. Each of center axes 16a, 16b, and 16c of shaft portions 42 at second ends 41 of first link members 4a, 4b, and 4c corresponds to the center axis of the second revolute pair unit. As illustrated in FIG. 1 and FIG. 3, center axes 15a, 15b, and 15c of shaft portions 22 and center axes 16a, 16b, and 16c of shaft portions 42 intersect at a spherical link center point 30. This intersection is a necessary condition, and the arrangement of the first and second revolute pair units can be changed as desired if center axes 15a, 15b, and 15c of the first revolute pair units and center axes 16a, 16b, and 16c of the second revolute pair units intersect spherical link center point 30.

Second link members 6a, 6b, and 6c are rod-shaped members each extending linearly. The above-noted through hole 63 is formed at a first end of each of second link members 6a, 6b, and 6c. The shape of second link members 6a, 6b, and 6c may be any shape other than the rod-like shape extending linearly. For example, second link members 6a, 6b, and 6c each may be a rod-shaped body extending in the form of an arc. As illustrated in FIG. 1 and FIG. 3, in a state in which first link members 4a, 4b, and 4c are arranged to extend along a surface of proximal end member 1, second link members 6a, 6b, and 6c are arranged outside of the outer periphery of proximal end member 1. Second link members 6a, 6b, and 6c may be arranged at positions overlapping the outer periphery of proximal end member 1 or may be arranged inside of the outer periphery of proximal end member 1.

In each of second link members 6a, 6b, and 6c, a depressed portion receiving a first end of the corresponding one of third link members 7a, 7b, and 7c is formed at a second end positioned on the opposite side to the first end having through hole 63. At the second end of each of second link members 6a, 6b, and 6c, a through hole is formed at a position facing the depressed portion. A through hole is also formed at the first end of each of third link members 7a, 7b, and 7c. The through hole at the second end of each of second link members 6a, 6b, and 6c and through hole 73 at the first end of the corresponding one of third link members 7a, 7b, and 7c are arranged so as to be aligned on a straight line. Coupling members 13a, 13b, and 13c are each inserted in the through hole at the second end of the corresponding one of second link members 6a, 6b, and 6c and through hole 73 at the first end of the corresponding one of third link members 7a, 7b, and 7c. Coupling members 13a, 13b, and 13c respectively couple second link members 6a, 6b, 6c to third link members 7a, 7b, and 7c such that they are rotatable relative to each other. Coupling members 13a, 13b, and 13c are, for example, bolts and nuts. Coupling member 13a, 13b, 13c, the second end of second link member 6a, 6b, 6c, and the first end of third link member 7a, 7b, 7c constitute a third revolute pair unit. That is, second link members 6a, 6b, and 6c are rotatably connected to third link members 7a, 7b, and 7c, respectively, at the third revolute pair units.

Each of center axes 17a, 17b, and 17c of coupling members 13a, 13b, and 13c corresponds to the center axis in the third revolute pair unit. Center axes 17a, 17b, and 17c extend in directions orthogonal to center axes 16a, 16b, and 16c, respectively.

Third link members 7a, 7b, and 7c are rod-shaped members each extending linearly. The above-noted through hole 73 is formed at the first end of each of third link members 7a, 7b, and 7c. The shape of third link members 7a, 7b, and 7c may be any shape other than the rod-like shape extending linearly. For example, third link members 7a, 7b, and 7c each may be a rod-shaped body extending in the form of an arc.

In each of third link members 7a, 7b, and 7c, a through hole 74 is formed at a second end positioned on the opposite side to the first end having through hole 73. In each of fourth link members 8a, 8b, and 8c, a depressed portion is formed to receive the second end of the corresponding one of third link members 7a, 7b, and 7c. A wall portion 83 facing the depressed portion of each of fourth link members 8a, 8b, and 8c has a through hole continuous to the depressed portion. Through hole 74 at the second end of each of third link members 7a, 7b, and 7c and the through hole formed in wall portion 83 of the corresponding one of fourth link members 8a, 8b, and 8c are arranged to be aligned on a straight line. Coupling members 14a, 14b, and 14c are each inserted in through hole 74 at the second end of the corresponding one of third link members 7a, 7b, and 7c and the through hole in wall portion 83 of the corresponding one of fourth link members 8a, 8b, and 8c. Coupling members 14a, 14b, and 14c respectively couple third link members 7a, 7b, and 7c to fourth link members 8a, 8b, and 8c such that they are rotatable relative to each other. Coupling members 14a, 14b, 14c are, for example, bolts and nuts. Coupling member 14a, 14b, 14c, the second end of third link member 7a, 7b, 7c, and wall portion 83 of fourth link member 8a, 8b, 8c constitute a fourth revolute pair unit. That is, third link members 7a, 7b, and 7c are rotatably connected to fourth link members 8a, 8b, and 8c, respectively, at the fourth revolute pair units.

Each of center axes 18a, 18b, and 18c of coupling members 14a, 14b, and 14c corresponds to the center axis of the fourth revolute pair unit. Center axes 18a, 18b, 18c extend in directions parallel to center axes 17a, 17b, 17c, respectively.

Fourth link members 8a, 8b, and 8c respectively include base portions 81a to 81c each connected to wall portion 83. The two-dimensional shape of base portions 81a to 81c is circular. As illustrated in FIG. 4, a center shaft 82 is provided at the middle of base portion 81a. Base portion 81b of fourth link member 8b is arranged so as to overlap base portion 81a. A through hole is formed at the middle of base portion 81b. Base portion 81c of fourth link member 8c is arranged so as to lie on base portion 81b. A through hole is formed at the middle of base portion 81c. Base portions 81b and 81c are stacked on base portion 81a with center shaft 82 inserted in their respective through holes. A nut 9 is installed as a fastening member at the tip end portion of center shaft 82. Fourth link members 8a, 8b, and 8c are rotatable independently of each other around center shaft 82. In parallel link mechanism 10 illustrated in FIG. 1 to FIG. 4, center shaft 82 of the stacked fourth link members 8a, 8b, and 8c or base portions 81a to 81c can be considered as distal end member 8. As a distal end member, another member may be connected to center shaft 82 or one of base portions 81a to 81c. In the configuration as described above, each of base portions 81a to 81c, center shaft 82, and nut 9 constitute a fifth revolute pair unit. As can be understood from FIG. 1, fifth center axes 19 of the fifth revolute pair units of three link mechanisms 11 are arranged to overlap each other. That is, the fifth revolute pair units of a plurality of link mechanisms 11 are arranged to overlap each other at one place. A bolt that is a member separate from base 81a may be used as center shaft 82. In this case, a through hole receiving the bolt is formed at the middle portion of base portion 81a.

In fourth link members 8a, 8b, and 8c, fourth center axes 18a, 18b, and 18c of the fourth revolute pair units and fifth center axes 19 of the fifth revolute pair units are in a twisted arrangement. More specifically, fourth center axes 18a, 18b, and 18c of the fourth revolute pair units extend in directions orthogonal to fifth center axes 19 of the fifth revolute pair units.

As illustrated in FIG. 1 and FIG. 3, first center axes 15a, 15b, and 15c of the first revolute pair units and second center axes 16a, 16b, and 16c of the second revolute pair units intersect at spherical link center point 30. As illustrated in FIG. 4, fifth center axes 19 of the respective fifth revolute pair units of the link mechanisms 11 overlap each other and intersect with spherical link center point 30. As long as the relation above is satisfied, the arrangement of the pair units can be set as desired.

<Operation of Parallel Link Mechanism>

Figure 5:
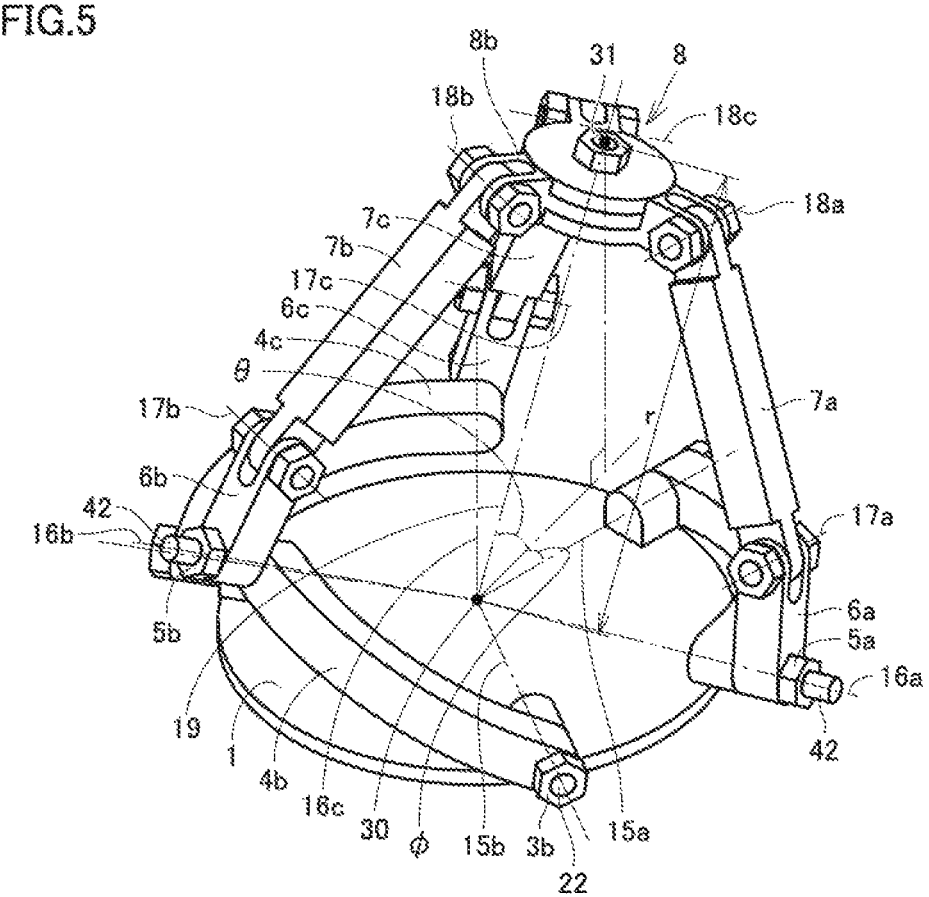
FIG. 5 is a perspective view illustrating a state in which the posture of a distal end member is changed in the parallel link mechanism illustrated in FIG. 1.

FIG. 5 is a perspective view illustrating a state in which the posture of the distal end member is changed in the parallel link mechanism illustrated in FIG. 1. As illustrated in FIG. 5, the position of distal end member 8 can be changed as desired by changing the respective angles of rotation around first center axes 15a, 15b, and 15c in the first revolute pair units of first link members 4a, 4b, and 4c. In FIG. 5, the angle of rotation around first center axis 15b of first link member 4b is relatively increased so that the fourth link member 8b side in distal end member 8 is lifted upward, and the entire distal end member 8 moves to the opposite side to the side on which fourth link member 8b is positioned, as viewed from a distal end member center 31.

In the parallel link mechanism 10 illustrated in FIG. 1 to FIG. 5, because of the configuration as described above, distal end member 8 operates on a sphere around spherical link center point 30. That is, as illustrated in FIG. 5, the posture of distal end member 8 can be represented by three-dimensional polar coordinates (r, θ, φ) in which spherical link center point 30 is the origin. As used herein the bend angle θ is the angle formed by: a straight line passing through spherical link center point 30 and a point at which a line extending downward vertically from distal end member center 31 intersects a plane including first center axes 15a, 15b, and 15c of the first revolute pair units that are connecting parts between proximal end member 1 and first link members 4a, 4b, and 4c; and fifth center axis 19 that is the distal end member center axis. The turning angle φ is the angle formed by: a straight line passing through spherical link center point 30 and a point at which a line extending downward vertically from distal end member center 31 intersects a plane including first center axes 15a, 15b, and 15c; and first center axis 15a of the first revolute pair unit of first link mechanism 11. The center-to-center distance r is the distance between spherical link center point 30 and distal end member center 31.

<Operation and Effect>

Parallel link mechanism 10 according to the present disclosure includes proximal end member 1 and three or more link mechanisms 11. Three or more link mechanisms 11 connect proximal end member 1 to distal end member 8. Three or more link mechanisms 11 can change the posture of distal end member 8 relative to proximal end member 1. Three or more link mechanisms 11 each include first to fourth link members. First link members 4a, 4b, and 4c are rotatably connected to proximal end member 1 at the first revolute pair units. Second link members 6a, 6b, and 6c are rotatably connected to first link members 4a, 4b, and 4c, respectively, at the second revolute pair units. Third link members 7a, 7b, and 7c are rotatably connected to second link members 6a, 6b, and 6c, respectively, at the third revolute pair units. Fourth link members 8a, 8b, and 8c are rotatably connected to third link members 7a, 7b, and 7c, respectively, at the fourth revolute pair units. Fourth link members 8a, 8b, and 8c are further rotatably connected to distal end member 8 at the fifth revolute pair units. In three or more link mechanisms 11, first center axes 15a, 15b, and 15c of the first revolute pair units and second center axes 16a, 16b, and 16c of the second revolute pair units intersect at spherical link center point 30. Fifth center axes 19 of the respective fifth revolute pair units in three or more link mechanisms 11 overlap each other and intersect with spherical link center point 30.

In this manner, since each of three or more link mechanisms 11 is a five-bar chain structure having first to fifth revolute pair units, distal end member 8 can be moved relative to proximal end member 1 with, in total, three degrees of freedom including two degrees of freedom of rotation around spherical link center point 30 and one degree of freedom in a direction along fifth center axis 19. Therefore, distal end member 8 can be moved relative to proximal end member 1 along a sphere around spherical link center point 30 and also can be moved in a direction along fifth center axis 19 independently of the movement along the sphere. As a result, distal end member 8 can be moved along the sphere, and the radius of the sphere along which distal end member 8 moves can be adjusted, so that the operable range of distal end member 8 can be increased compared with when distal end member 8 can move only along a sphere with a fixed radius. As used herein "fourth link members 8a, 8b, and 8c are configured to be rotatably connected to distal end member 8 at the fifth revolute pair units" means that fourth link members 8a, 8b, and 8c have a portion that can connect the distal end member as a separate member, and includes a case where a part of fourth link members 8a, 8b, and 8c functions as the distal end member.

In parallel link mechanism 10 described above, third center axis 17a, 17b, 17c of the third revolute pair unit and fourth center axis 18a, 18b, 18c of the fourth revolute pair unit may extend parallel to each other and may extend in a direction intersecting second center axis 16a, 16b, 16c. In this case, since third center axis 17a, 17b, 17c of the third revolute pair unit in third link member 7a, 7b, 7c and fourth center axis 18a, 18b, 18c of the fourth revolute pair unit that constitute link mechanism 11 are parallel to each other, the configuration of third link member 7a, 7b, 7c can be simplified.

In parallel link mechanism 10 described above, third center axis 17a, 17b, 17c and fourth center axis 18a, 18b, 18c may extend in a direction orthogonal to second center axis 16a, 16b, 16c. In this case, at the time of manufacturing parallel link mechanism 10, the workability in assembly work can be improved in the step of connecting second link members 6a, 6b, and 6c to first link members 4a, 4b, and 4c, respectively, and the step of connecting second link members 6a, 6b, and 6c to third link members 7a, 7b, and 7c, respectively.

In parallel link mechanism 10 described above, when proximal end member 1 is viewed two-dimensionally from distal end member 8, the second revolute pair units may be positioned outside of the outer periphery of proximal end member 1. In this case, the influence of proximal end member 1 on the operable range of the second revolute pair units can be reduced, compared with when the second revolute pair units are positioned inside of the outer periphery of proximal end member 1. For example, when viewed from the lateral direction along a first surface on the distal end member 8 side of proximal end member 1, the operable range of the second revolute pair units can be expanded to a second surface side on the opposite side to the first surface of proximal end member 1. Here, it is preferable that first link members 4a, 4b, and 4c are also arranged outside of the outer periphery of proximal end member 1.

Second Embodiment

<Configuration of Parallel Link Mechanism>

Figure 6:
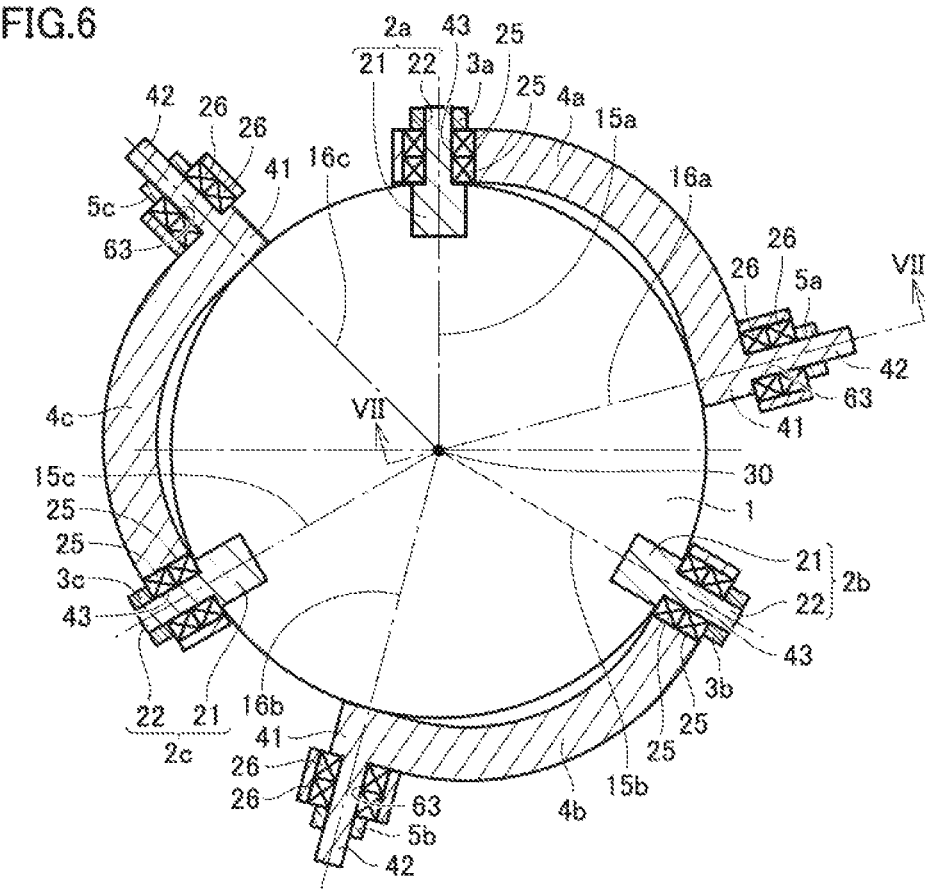
FIG. 6 is a cross-sectional view of the parallel link mechanism according to a second embodiment.
Figure 7:
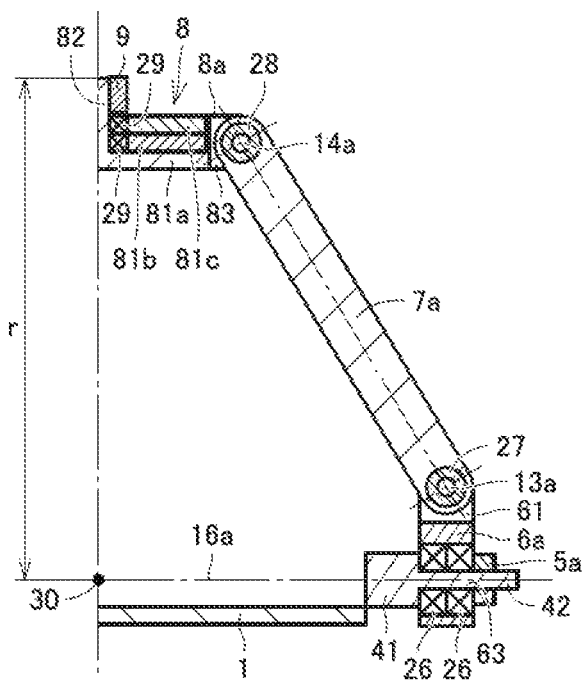
FIG. 7 is a cross-sectional view in line VII-VII in FIG. 6.

FIG. 6 is a cross-sectional view of the parallel link mechanism according to a second embodiment. FIG. 7 is a cross-sectional view in line VII-VII in FIG. 6. FIG. 6 corresponds to FIG. 3, and FIG. 7 corresponds to FIG. 4.

The parallel link mechanism illustrated in FIG. 6 and FIG. 7 basically includes a configuration similar to parallel link mechanism 10 illustrated in FIG. 1 to FIG. 5 but differs from the parallel link mechanism illustrated in FIG. 1 to FIG. 5 in that bearings 25 to 29 as rotation resistance reducing means are respectively provided in the first to fifth revolute pair units. In FIG. 6 and FIG. 7, bearings 25 to 29 are installed in all of the revolute pair units. However, a bearing may be installed in at least one of the first to fifth revolute pair units.

Specifically, as illustrated in FIG. 6, in the first revolute pair unit, bearing 25 is arranged between shaft portion 22 of each of proximal-end connecting portion 2a, 2b, and 2c and the corresponding one of first link member 4a, 4b, and 4c. For example, a roller bearing of any configuration, such as a ball bearing, can be used as bearing 25. For example, the outer face of bearing 25 may be fixed to first link member 4a, 4b, 4c. The inner race of bearing 25 connected to shaft portion 22 may be fixed so as to be sandwiched between nut 3a, 3b, 3c and base portion 21.

In the second revolute pair unit, bearing 26 is arranged between shaft portion 42 of each of first link member 4a, 4b, and 4c and the corresponding one of second link members 6a, 6b, and 6c. For example, the outer race of bearing 26 may be fixed to second link member 6a, 6b, 6c. The inner race of bearing 26 connected to shaft portion 42 may be fixed so as to be sandwiched between nut 5a, 5b, 5c and first link member 4a, 4b, 4c.

In the third revolute pair unit, as illustrated in FIG. 7, bearing 27 is arranged between each of coupling members 13a, 13b, and 13c (see FIG. 2) and the corresponding one of third link members 7a, 7b, and 7c (see FIG. 2). For example, the outer race of bearing 27 may be fixed to third link member 7a, 7b, 7c. Any method can be used to fix the outer race of bearing 27 to third link member 7a, 7b, 7c. For example, a hole for inserting the outer race into third link member 7a, 7b, 7c may be formed, and the outer race may be pushed into the hole so that the outer race is fixed to the hole. Any method may be used to fix the inner race of bearing 27 to coupling member 13a, 13b, 13c. For example, consider a case where a rod-shaped body such as a continuous thread screw and a pair of washers and a pair of nuts arranged at both ends of the rod-shaped body are used as coupling member 13a, 13b, 13c. In this case, the rod-shaped body is arranged so as to pass through a through hole at the first end of second link member 6a, 6b, 6c and an opening in the inner race of bearing 27 arranged in the inside of a through hole at the first end of third link member 7a, 7b, 7c. The washers and the nuts are arranged at both ends of the rod-shaped body. The nut is tightened to press the first end of second link member 6a, 6b, 6c and the washer against the inner race of bearing 27 and apply a pressure to the inner race. As a result, the inner race of bearing 27 is fixed to second link member 6a, 6b, 6c with coupling member 13a, 13b, 13c interposed.

In the fourth revolute pair unit, as illustrated in FIG. 7, bearing 28 is arranged between each of coupling members 14a, 14b, and 14c (see FIG. 2) and the corresponding one of third link members 7a, 7b, and 7c (see FIG. 2). For example, the outer race of bearing 28 may be fixed to third link member 7a, 7b, 7c. Any method can be used to fix the inner race of bearing 28 to coupling member 14a, 14b, 14c. However, a method similar to the method of fixing the inner race of bearing 27 in the third revolute pair unit may be used.

In the fifth revolute pair unit, bearing 29 is arranged between center shaft 82 and each of base members 81b and 81c. For example, the outer race of bearing 29 may be fixed to base member 81b, 81c. The inner race of bearing 26 connected to shaft portion 82 may be fixed so as to be sandwiched between nut 9 and base member 81a. In FIG. 6 and FIG. 7, bearings 25 to 29 are used as rotation resistance reducing means. However, a member different from a bearing may be applied as long as rotation resistance can be reduced.

<Operation and Effect>

In the parallel link mechanism described above, at least one of the first to fifth revolute pair units may include bearings 25 to 29. In this case, the operation of the revolute pair units equipped with bearings 25 to 29 can be made smooth, and the accuracy in positioning the distal end member 8 can be improved. The installation of bearings 25 to 29 reduces friction torque of the revolute pair units equipped with the bearings, thereby suppressing heat generation at the revolute pair units and, consequently, prolonging the life of the revolute pair units. Furthermore, the installation of bearings 25 to 29 can suppress rattling during operation of the revolute pair units, compared with when bearings 25 to 29 are not used.

Third Embodiment

<Configuration of Link Actuation Device>

Figure 8:
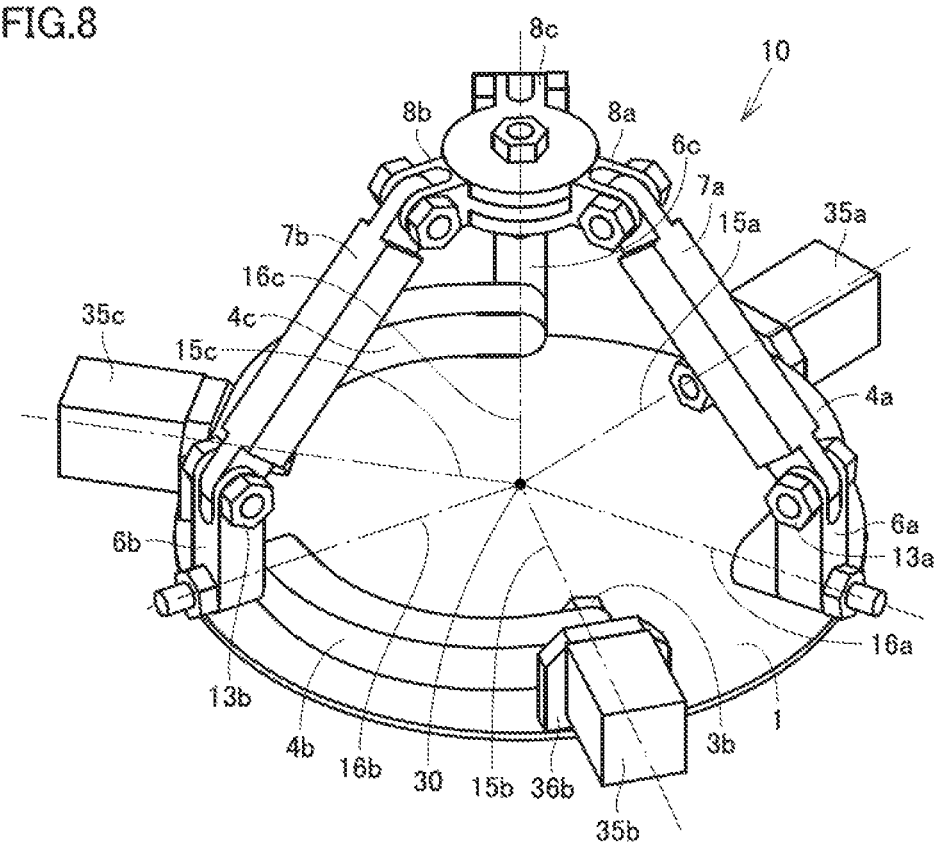
FIG. 8 is a perspective view of a link actuation device according to a third embodiment.
Figure 9:
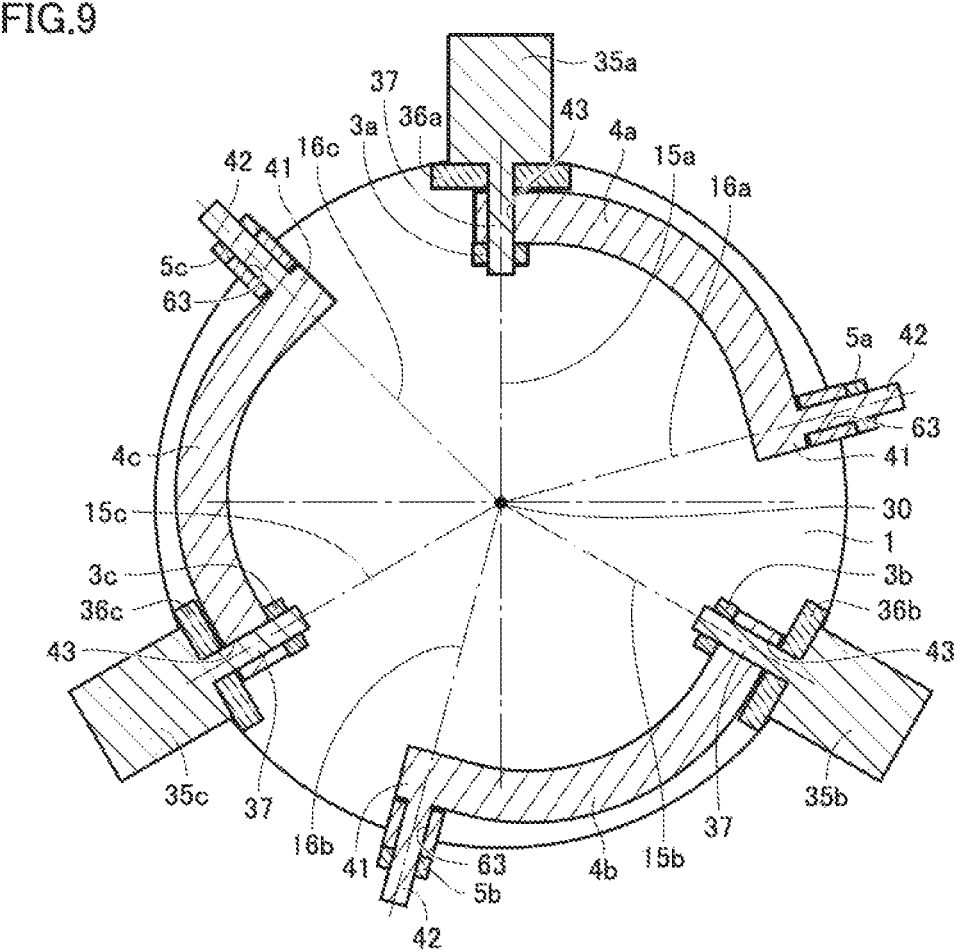
FIG. 9 is a cross-sectional view of the link actuation device illustrated in FIG. 8.

FIG. 8 is a perspective view of the link actuation device according to a third embodiment. FIG. 9 is a cross-sectional view of the link actuation device illustrated in FIG. 8. FIG. 8 corresponds to FIG. 1, and FIG. 9 corresponds to FIG. 3.

The link actuation device illustrated in FIG. 8 and FIG. 9 includes parallel link mechanism 10 illustrated in FIG. 1 to FIG. 5 and posture control drive sources 35a, 35b, and 35c. Posture control drive sources 35a, 35b, and 35c are installed for all of three link mechanisms 11. Posture control drive sources 35a, 35b, and 35c change the posture of distal end member 8 relative to proximal end member 1 as desired by changing the respective angles of rotation around first center axes 15a, 15b, and 15c of first link members 4a, 4b, and 4c.

As illustrated in FIG. 8 and FIG. 9, posture control drive sources 35a, 35b, and 35c are fixed to fixing parts 36a, 36b, and 36c, respectively, and thereby connected to proximal end member 1. Fixing parts 36a, 36b, and 36c are installed at the outer peripheral portion on the surface of proximal end member 1. Fixing parts 36a, 36b, and 36c may be formed in any shape, for example, in a plate shape.

Posture control drive sources 35a, 35b, and 35c may employ any configuration that can generate a rotation driving force, such as electric motors. Posture control drive sources 35a, 35b, and 35c have respective rotatable rotation shafts 37. Rotation shafts 37 are inserted in through holes 43 of first link members 4a, 4b, and 4c and fixed by nuts 3a, 3b, and 3c. That is, first link members 4a, 4b, and 4c are fixed to respective rotation shafts 37. Rotation of rotation shafts 37 causes first link members 4a, 4b, and 4c to rotate around first center axes 15a, 15b, and 15c, respectively. Here, as illustrated in FIG. 9, first center axes 15a, 15b, and 15c each are the center axis of rotation shaft 37.

Posture control drive sources 35a, 35b, and 35c are arranged at positions overlapping first center axes 15a, 15b, and 15c, respectively. Posture control drive sources 35a, 35b, and 35c are arranged on the surface on the distal end member 8 side of proximal end member 1 so as to protrude outward from the outer periphery of proximal end member 1.

With such a configuration, the posture of distal end member 8 relative to proximal end member 1 can be uniquely determined by the state of each link mechanism 11 (see FIG. 1). That is, the posture of distal end member 8 can be controlled by controlling the respective postures of first link members 4a, 4b, and 4c relative to proximal end member 1 or the respective angles of rotation of first link members 4a, 4b, and 4c around first center axes 15a, 15b, and 15c.

When three or more link mechanisms 11 (see FIG. 1) are installed in the link actuation device, posture control drive sources 35a, 35b, and 35c are installed for at least three link mechanisms among the three or more link mechanisms 11.

<Operation and Effect>

The link actuation device according to the present disclosure includes parallel link mechanism 10 described above and posture control drive sources 35a, 35b, and 35c. Posture control drive sources 35a, 35b, and 35c are installed for at least three link mechanisms 11 among three or more link mechanisms 11 and change the posture of distal end member 8 relative to proximal end member 1 as desired.

In this case, at least three posture control drive sources 35a, 35b, and 35c individually control link mechanisms 11 thereby allowing distal end member 8 to operate in a wide range and precisely. Parallel link mechanism 10 as described above can be used to provide a lightweight and compact link actuation device.

Fourth Embodiment

<Configuration of Link Actuation Device>

Figure 10:
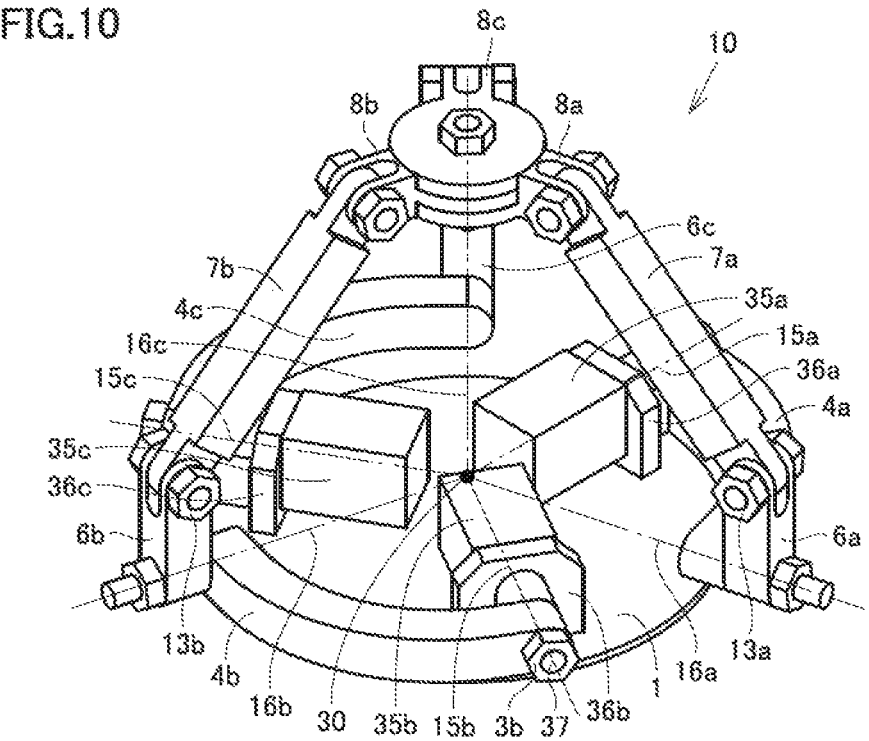
FIG. 10 is a perspective view illustrating the link actuation device according to a fourth embodiment.

FIG. 10 is a perspective view illustrating the link actuation device according to a fourth embodiment. The link actuation device illustrated in FIG. 10 basically includes a configuration similar to the link actuation device illustrated in FIG. 8 and FIG. 9 but differs from the link actuation device illustrated in FIG. 8 and FIG. 9 in arrangement of posture control drive sources 35a, 35b, and 35c. In the link actuation device illustrated in FIG. 10, posture control drive sources 35a, 35b, and 35c are arranged inside of the outer periphery of proximal end member 1, on the surface on the distal end member 8 side of proximal end member 1. Fixing parts 36a, 36b, and 36c for fixing posture control drive sources 35a, 35b, and 35c are respectively fixed to proximal end member 1 on the inner peripheral side of first link members 4a, 4b, and 4c. Posture control drive sources 35a, 35b, and 35c are arranged on the inner peripheral side of fixing parts 36a, 36b, and 36c, respectively.

<Operation and Effect>

Such a configuration can achieve an effect similar to that of the link actuation device illustrated in FIG. 8 and FIG. 9. In addition, since posture control drive sources 35a, 35b, and 35c are arranged inside of the outer periphery of proximal end member 1, the area occupied by the device can be reduced compared with the link actuation device illustrated in FIG. 8 and FIG. 9.

Fifth Embodiment

<Configuration of Link Actuation Device>

Figure 11:
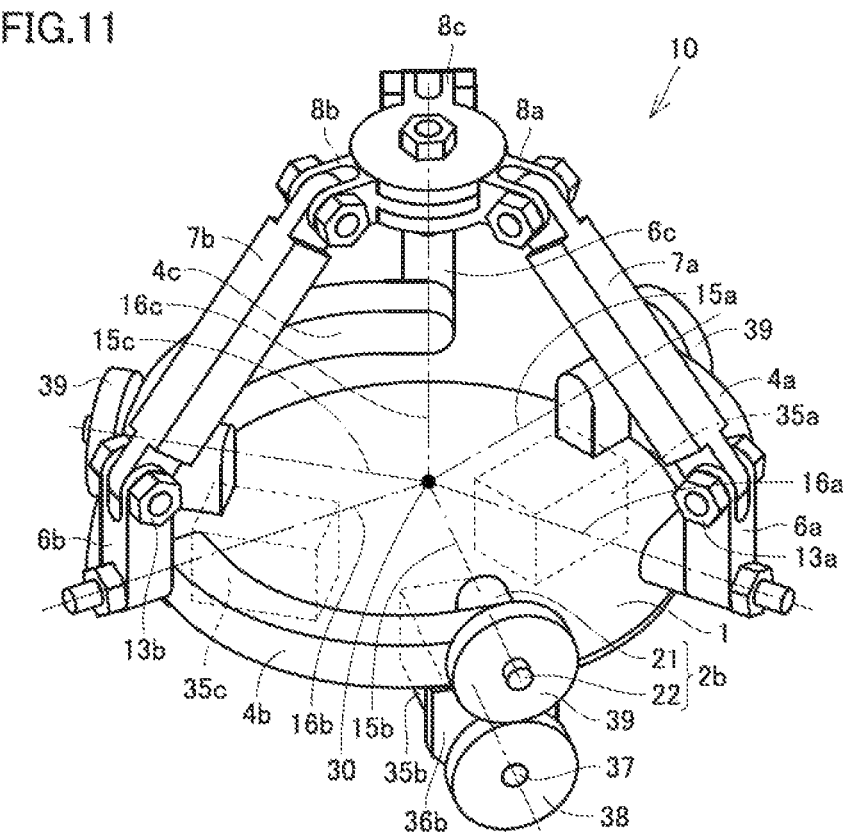
FIG. 11 is a perspective view illustrating the link actuation device according to a fifth embodiment.

FIG. 11 is a perspective view illustrating the link actuation device according to a fifth embodiment. The link actuation device illustrated in FIG. 11 basically has a configuration similar to the link actuation device illustrated in FIG. 10 but differs from the link actuation device illustrated in FIG. 10 in the arrangement of posture control drive sources 35a, 35b, and 35c and the configuration of respective connecting parts between posture control drive sources 35a, 35b, and 35c and first link members 4a, 4b, and 4c. In the link actuation device illustrated in FIG. 11, posture control drive sources 35a, 35b, and 35c are arranged on the back surface side of proximal end member 1. That is, posture control drive sources 35a, 35b, and 35c are connected to the back surface on the opposite side to the front surface facing distal end member 8 in proximal end member 1. The method of fixing posture control drive sources 35a, 35b, and 35c to the back surface of proximal end member 1 is basically similar to the one in the link actuation device illustrated in FIG. 10. Posture control drive source 35a is described as an example. Posture control drive source 35a is connected to fixing part 36a fixed to the back surface of proximal end member 1. A gear 38 is fixed to rotation shaft 37 of each of posture control drive sources 35a, 35b, and 35c. A gear 39 is installed to be meshed with gear 38. Gear 39 is rotatably installed on shaft portion 22 of each of proximal-end connecting portions 2a, 2b, and 2c, on the front surface side of proximal end member 1. Gear 39 is fixed to each of first link members 4a, 4b, and 4c. In this way, rotation shafts 37 of posture control drive sources 35a, 35b, and 35c rotate to allow first link members 4a, 4b, and 4c to rotate around first center axes 15a, 15b, 15c through gears 38 and 39.

<Operation and Effect>

Such a configuration can achieve an effect similar to that of the link actuation device illustrated in FIG. 8 and FIG. 9. In addition, since posture control drive sources 35a, 35b, and 35c are arranged on the back surface side of proximal end member 1, interference of posture control drive sources 35a, 35b, and 35c with the operation of link mechanism 11 (see FIG. 1) can be prevented. Furthermore, since posture control drive sources 35a, 35b, and 35c are arranged at positions overlapping proximal end member 1 in a two-dimensional view, the area occupied by the device can be reduced, compared with the link actuation device illustrated in FIG. 8 and FIG. 9.

Sixth Embodiment

<Configuration of Parallel Link Mechanism>

Figure 12:
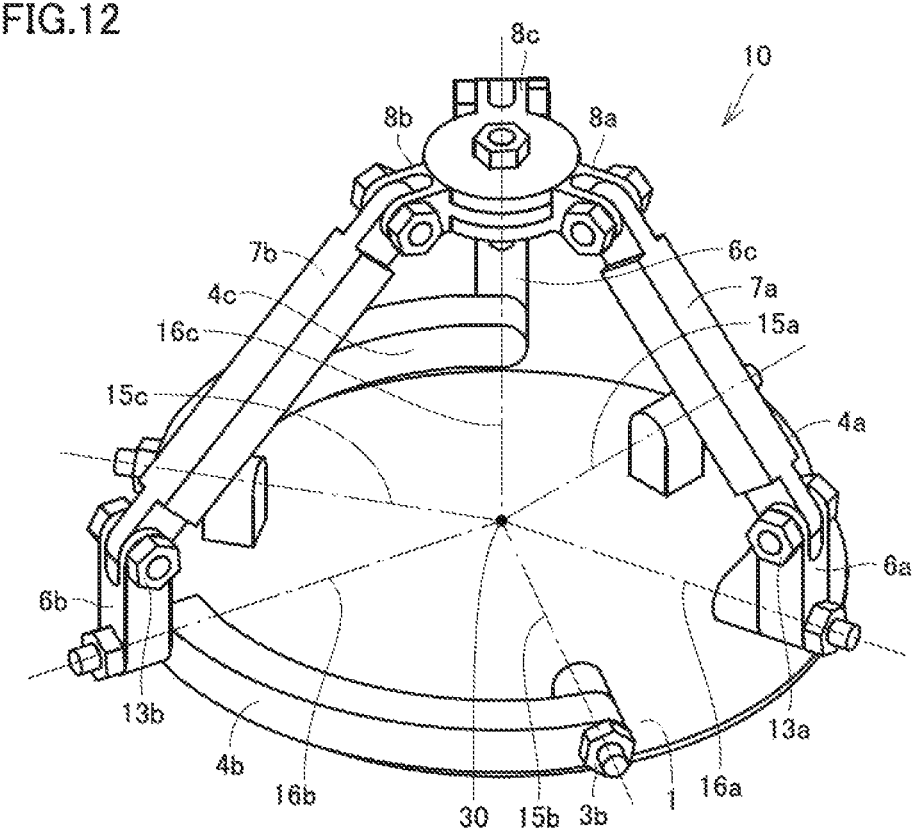
FIG. 12 is a perspective view illustrating a configuration of the parallel link mechanism according to a sixth embodiment.
Figure 13:
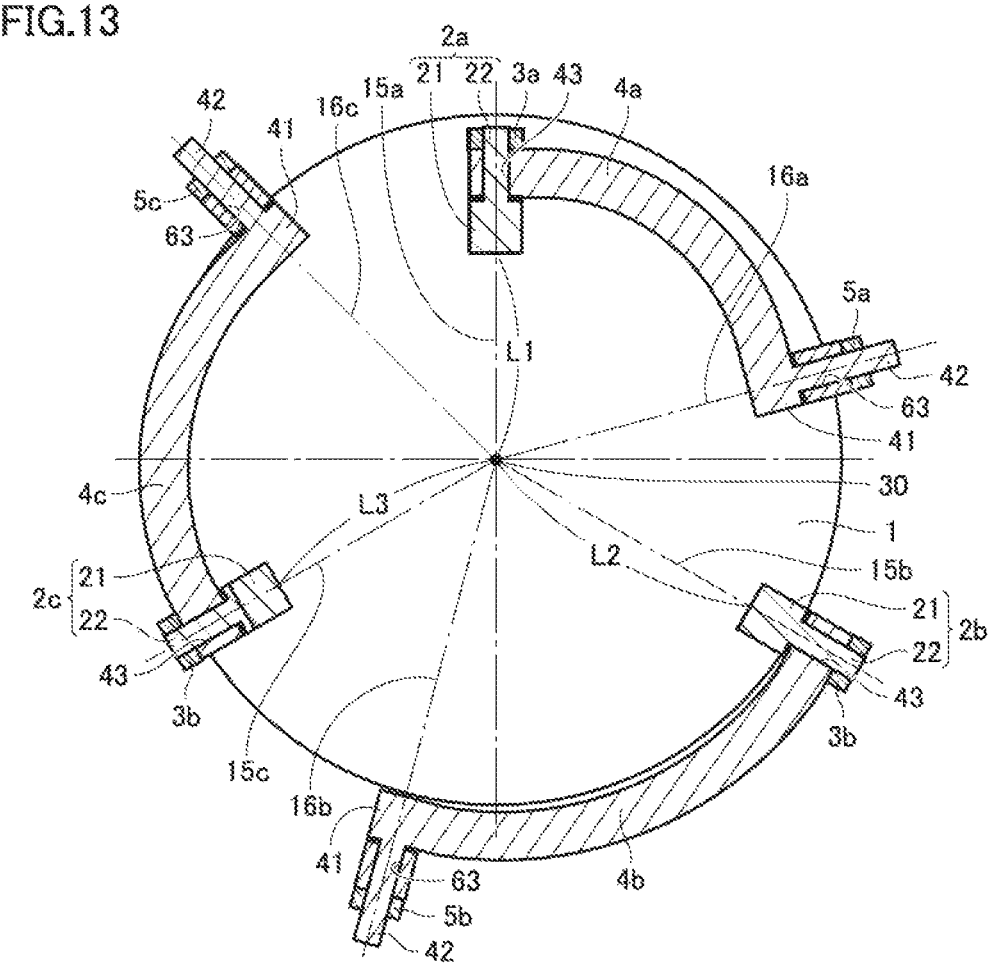
FIG. 13 is a cross-sectional view of the parallel link mechanism illustrated in FIG. 12.

FIG. 12 is a perspective view illustrating a configuration of the parallel link mechanism according to a sixth embodiment. FIG. 13 is a cross-sectional view of the parallel link mechanism illustrated in FIG. 12. FIG. 12 corresponds to FIG. 1, and FIG. 13 corresponds to FIG. 3. The parallel link mechanism illustrated in FIG. 12 and FIG. 13 basically has a configuration similar to the parallel link mechanism illustrated in FIG. 1 to FIG. 5 but, as illustrated in FIG. 13, differs in that the respective distances L1 to L3 from proximal-end connecting portions 2a, 2b, and 2c to the spherical link center point are different from each other. Specifically, distance L1 from proximal-end connecting portion 2a to spherical link center point 30 is the smallest. Distance L2 from proximal-end connecting portion 2b to spherical link center point 30 is larger than the above distance L1. Distance L3 from proximal-end connecting portion 2c to spherical link center point 30 is larger than the above distance L1 and smaller than distance L2. In a two-dimensional view illustrated in FIG. 13, first link member 4a is arranged at a position overlapping the surface of proximal end member 1. Another first link member 4b is arranged outside of the outer periphery on the surface of proximal end member 1. The other first link member 4c is arranged such that its outer peripheral portion substantially overlaps the outer peripheral portion of the surface of proximal end member 1 in a two-dimensional view.

<Operation and Effect>

In this way, even when respective distances L1 to L3 from proximal-end connecting portions 2a, 2b, and 2c to the spherical link center point are different, an effect similar to that of the parallel link mechanism illustrated in FIG. 1 to FIG. 5 can be achieved. That is, as long as the following conditions are met: first center axes 15a, 15b, and 15c of the first revolute pair units and second center axes 16a, 16b, and 16c of the second revolute pair units intersect at spherical link center point 30, and fifth center axes 19 (see FIG. 2) of the respective fifth revolute pair units in three link mechanisms 11 (see FIG. 1) overlap each other and intersect with spherical link center point 30, distal end member 8 can be moved relative to proximal end member 1 along a sphere around spherical link center point 30 and can be moved also in a direction along fifth center axes 19 independently of the movement along the sphere, in the same manner as the parallel link mechanism illustrated in FIG. 1 to FIG. 5.

Seventh Embodiment

<Configuration of Parallel Link Mechanism>

Figure 14:
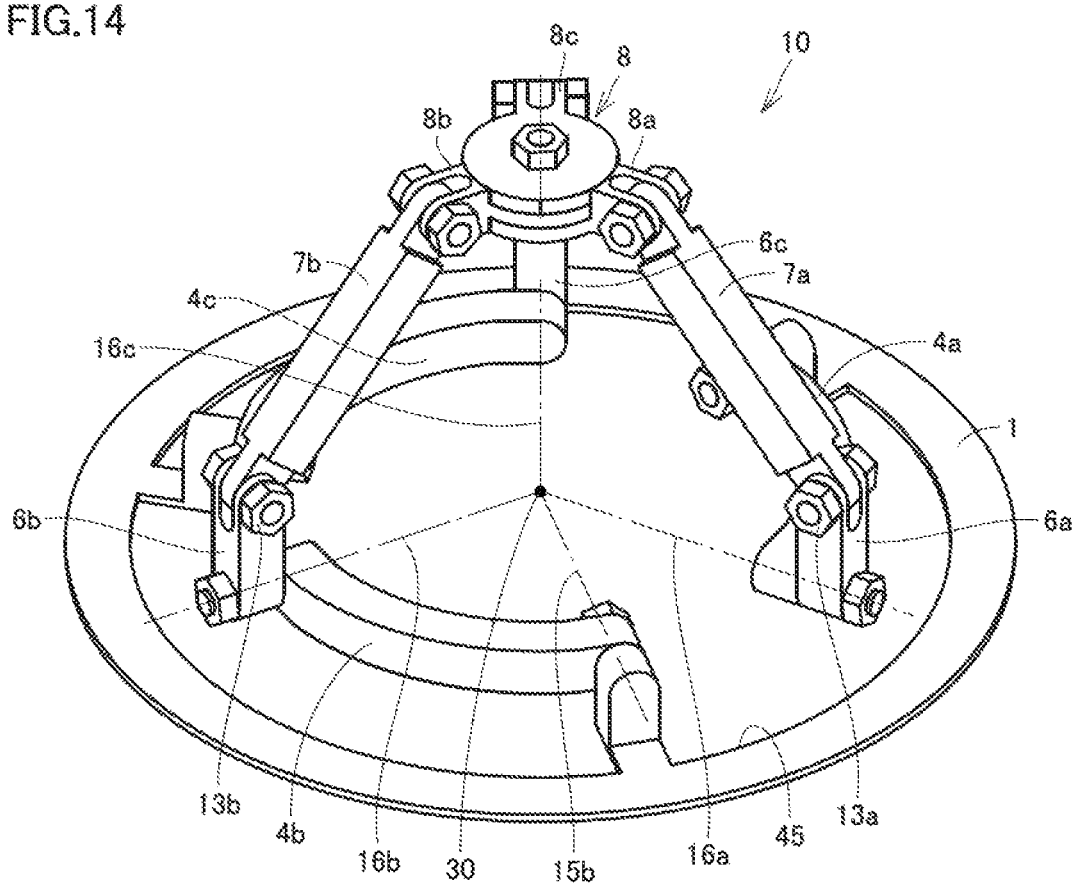
FIG. 14 is a perspective view illustrating a configuration of the parallel link mechanism according to a seventh embodiment.

FIG. 14 is a perspective view illustrating a configuration of the parallel link mechanism according to a seventh embodiment. The parallel link mechanism illustrated in FIG. 14 basically has a configuration similar to the parallel link mechanism illustrated in FIG. 1 to FIG. 5 but differs in the configuration of proximal end member 1 and the relative arrangement between proximal-end connecting portions 2a, 2b, and 2c and first link members 4a, 4b, and 4c. In parallel link mechanism 10 illustrated in FIG. 14, an opening 45 is formed in proximal end member 1. When proximal end member 1 is two-dimensionally viewed from distal end member 8, the first revolute pair units and the second revolute pair units are positioned in the inside of opening 45. Proximal-end connecting portions 2a, 2b, and 2c are connected to proximal end member 1 and arranged on the outer peripheral side of first link members 4a, 4b, and 4c, respectively.

<Operation and Effect>

With the configuration as described above, proximal end member 1 is not present at a position overlapping the second revolute pair units in a two-dimensional view. Therefore, when viewed from the lateral direction along a first surface on the distal end member 8 side of proximal end member 1, the operable range of the second revolute pair units can be expanded to a second surface side (back surface side) on the opposite side to the first surface of proximal end member 1. As a result, the distal end member 8 can be moved to a position near spherical link center point 30.

Posture control drive sources 35a, 35b, and 35c illustrated in any one of FIG. 8 to FIG. 11 may be applied to the parallel link mechanism in each embodiment described above to configure a link actuation device. Although the number of link mechanisms 11 is three in each embodiment, the number of link mechanisms 11 may be any number equal to or greater than four, for example, five, six, or eight.

Eighth Embodiment

<Configuration of Link Actuation Device>

Figure 15:
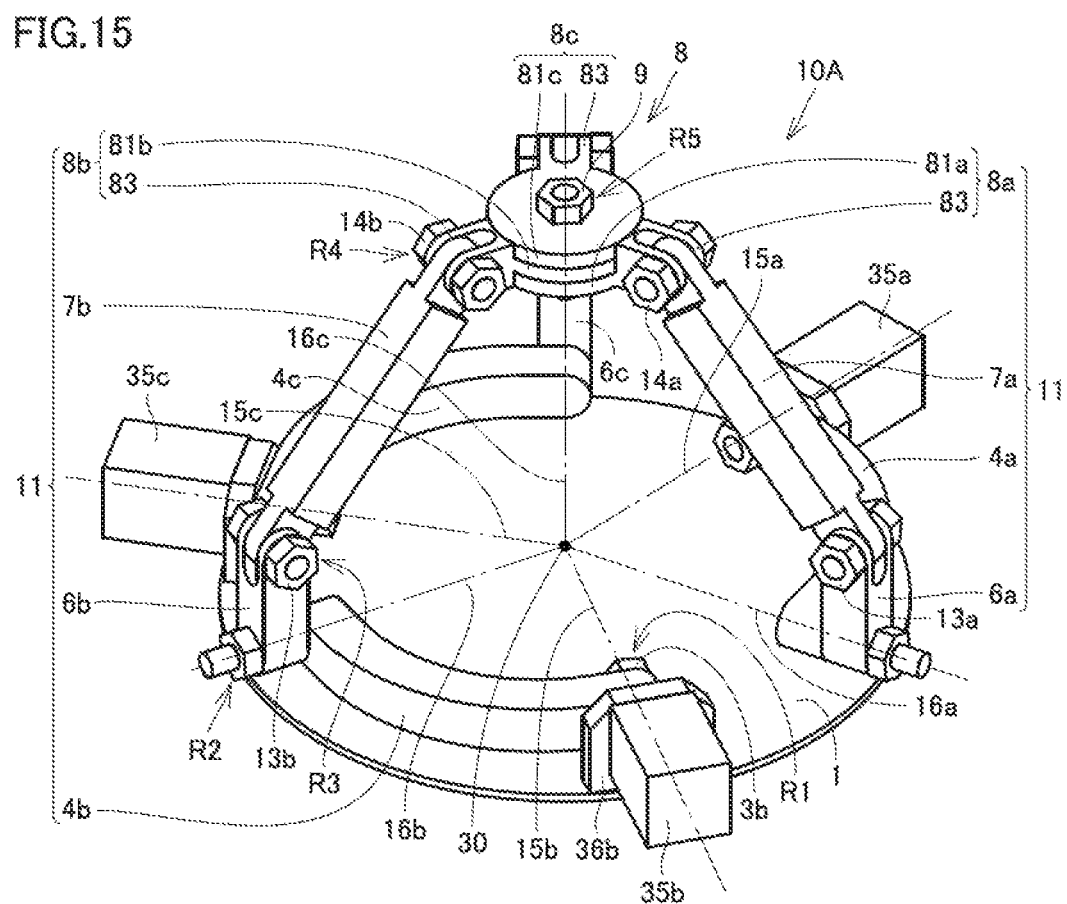
FIG. 15 is a perspective view illustrating the link actuation device according to an eighth embodiment in a state before a working body attachment member is mounted.
Figure 16:
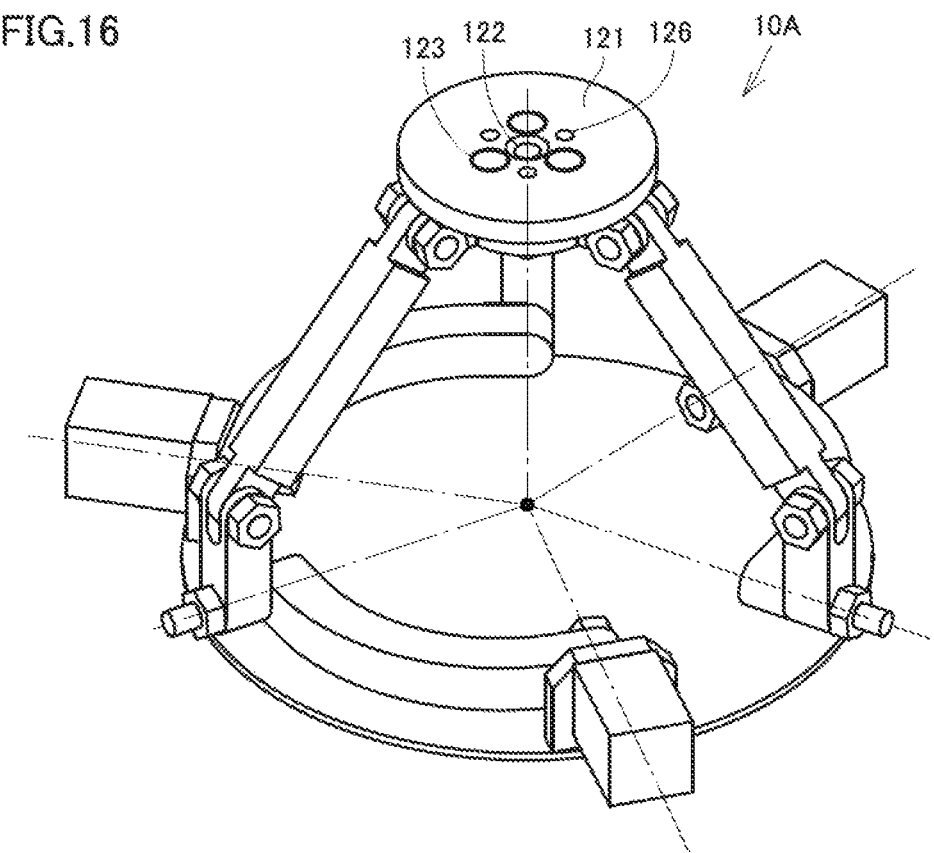
FIG. 16 is a perspective view illustrating the link actuation device according the eighth embodiment in a state in which the working body attachment member is mounted.
Figure 17:
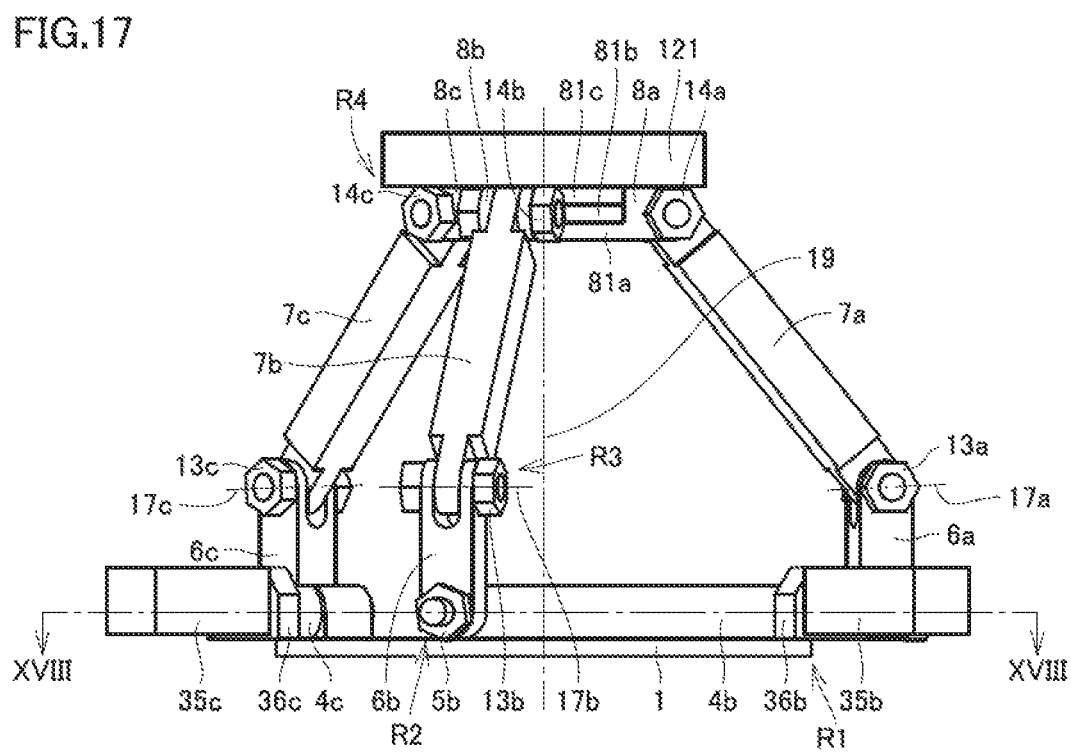
FIG. 17 is a front view of the link actuation device illustrated in FIG. 16.
Figure 18:
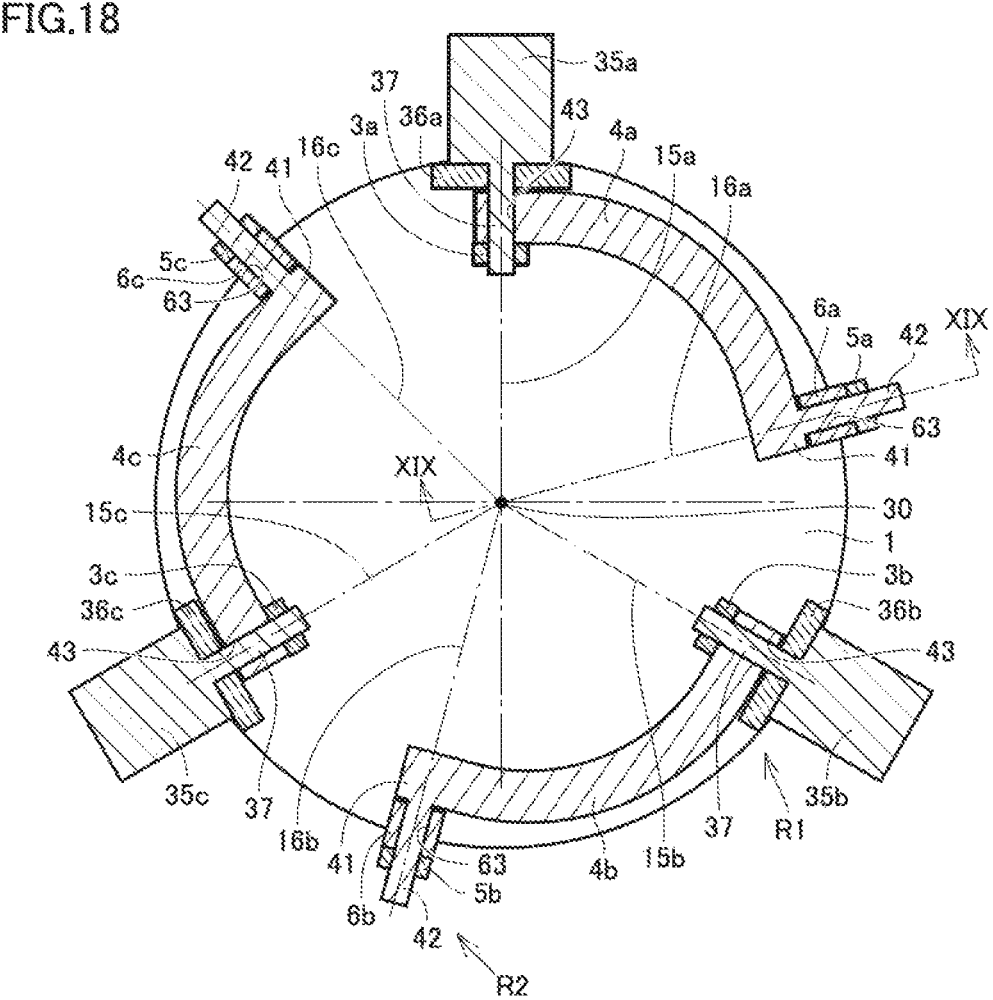
FIG. 18 is a cross-sectional view in line XVIII-XVIII in FIG. 17.
Figure 19:
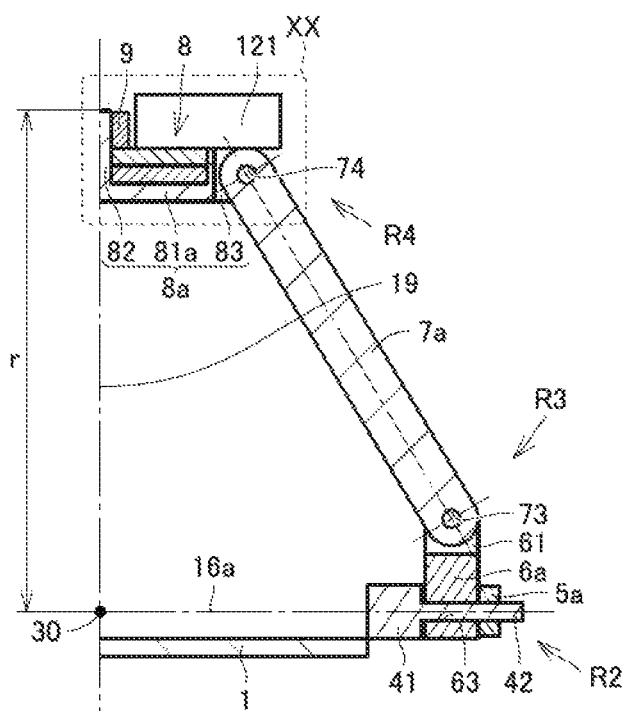
FIG. 19 is a cross-sectional view in line XIX-XIX in FIG. 18.
Figure 20:
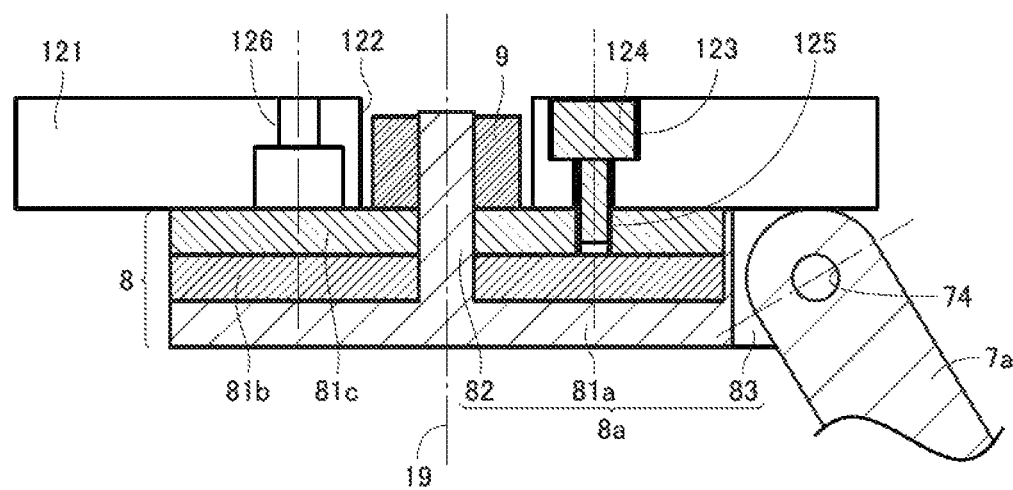
FIG. 20 is an enlarged cross-sectional view illustrating the configuration of a region XX surrounded by a dotted line in FIG. 19 in more detail.

FIG. 15 is a perspective view illustrating a link actuation device according to an eighth embodiment in a state before a working body attachment member is mounted. FIG. 16 is a perspective view illustrating the link actuation device according to the eighth embodiment in a state in which the working body attachment member is mounted. FIG. 17 is a front view of the link actuation device illustrated in FIG. 16. FIG. 18 is a cross-sectional view in line XVIII-XVIII in FIG. 17. FIG. 19 is a cross-sectional view in line XIX-XIX in FIG. 18. FIG. 20 is an enlarged cross-sectional view illustrating the configuration of a region XX surrounded by a dotted line in FIG. 19 in more detail.

A link actuation device 10A illustrated in FIG. 15 to FIG. 20 includes proximal end member 1, distal end member 8, and three link mechanisms 11. Proximal end member 1 is a plate-shaped body having a circular shape in two dimensions. Proximal end member 1 may have any shape. For example, the two-dimensional shape of proximal end member 1 may be polygonal such as quadrangular and triangular, or oval or semi-circular. The number of link mechanisms 11 is three or more, for example, may be four or five.

Three link mechanisms 11 connect proximal end member 1 to distal end member 8 such that a posture of distal end member 8 relative to proximal end member 1 can be changed. Three link mechanisms 11 include respective first link members 4a, 4b, and 4c, respective second link members 6a, 6b, and 6c, respective third link members 7a, 7b, and 7c, and respective fourth link members 8a, 8b, and 8c. First link members 4a, 4b, and 4c are connected to proximal end member 1 so as to be rotatable by posture control drive sources 35a, 35b, and 35c, respectively, at respective first revolute pair units R1. First revolute pair units R1 and posture control drive sources 35a, 35b, and 35c will be described later.

First link members 4a, 4b, and 4c are rod-shaped members each extending in the form of an arc. The above-noted through hole 43 is formed at a first end of each of first link members 4a, 4b, and 4c. As illustrated in FIG. 18, in a two-dimensional view as viewed from a direction vertical to the surface of proximal end member 1, the inner peripheral-side surfaces of first link members 4a, 4b, and 4c are each shaped like a curved surface. The radius of curvature of the inner peripheral-side surface in the two-dimensional view is smaller than the radius of curvature of the outer periphery of proximal end member 1. The radius of curvature of the inner peripheral-side surface may be the same as the radius of curvature of the outer periphery of proximal end member 1 or may be larger than the radius of curvature of the outer periphery. The shape of first link members 4a, 4b, and 4c may be a shape other than an arc shape. For example, the shape of first link members 4a, 4b, and 4c may be a rod-like shape extending linearly or a rod-like shape including a bending portion. As illustrated in FIG. 18, first link members 4a, 4b, and 4c are arranged inside of the outer periphery of proximal end member 1. However, first link members 4a, 4b, and 4c may be arranged outside of the outer periphery of proximal end member 1.

In each of first link members 4a, 4b, and 4c, a shaft portion 42 is formed at a second end 41 positioned on the opposite side to the first end having through hole 43. Shaft portion 42 is formed to extend from the outer periphery of proximal end member 1 toward the outside. Shaft portion 42 is formed on the outer peripheral side surface on the opposite side to the inner peripheral side surface facing proximal end member 1 in each of first link members 4a, 4b, and 4c. Shaft portion 42 is inserted in through hole 63 of the corresponding one of second link members 6a, 6b, and 6c. Nuts 5a, 5b, and 5c, which are an example of the fastening member, are respectively fixed to the tip end portions of shaft portions 42 protruding from through holes 63 of second link members 6a, 6b, and 6c. Second link members 6a, 6b, and 6c are each rotatable around shaft portion 42. Shaft portion 42 and a portion of the corresponding one of second link members 6a, 6b, and 6c having through hole 63 receiving this shaft portion 42 constitute a second revolute pair unit R2. That is, second link members 6a, 6b, and 6c are rotatably connected to first link members 4a, 4b, and 4c, respectively, at second revolute pair units R2.

Each of center axes 15a, 15b, and 15c corresponds to the center axis of first revolute pair unit R1. Each of center axes 16a, 16b, and 16c of shaft portions 42 at second ends 41 of first link members 4a, 4b, and 4c corresponds to the center axis of second revolute pair unit R2. As illustrated in FIG. 15 and FIG. 18, center axes 15a, 15b, and 15c of rotation shafts 37 described later and center axes 16a, 16b, and 16c of shaft portions 42 intersect at spherical link center point 30. This intersection is a necessary condition, and the arrangement of first revolute pair units R1 and second revolute pair units R2 can be changed as desired if center axes 15a, 15b, and 15c of first revolute pair units R1 and center axes 16a, 16b, and 16c of second revolute pair units R2 intersect spherical link center point 30.

Second link members 6a, 6b, and 6c are rod-shaped members each extending linearly. The above-noted through hole 63 is formed at a first end of each of second link members 6a, 6b, and 6c. The shape of second link members 6a, 6b, and 6c may be any shape other than the rod-like shape extending linearly. For example, second link members 6a, 6b, and 6c each may be a rod-shaped body extending in the form of an arc. As illustrated in FIG. 15 and FIG. 18, when viewed from distal end member 8 in a state in which first link members 4a, 4b, and 4c are arranged so as to extend along the surface of proximal end member 1, second link members 6a, 6b, and 6c are arranged at positions overlapping the outer periphery of proximal end member 1. Second link members 6a, 6b, and 6c may be arranged only inside of the outer periphery of proximal end member 1. Second link members 6a, 6b, and 6c may be arranged only outside of the outer periphery of proximal end member 1.

In each of second link members 6a, 6b, and 6c, a depressed portion receiving a first end of the corresponding one of third link members 7a, 7b, and 7c is formed at a second end positioned on the opposite side to the first end having through hole 63. At the second end of each of second link members 6a, 6b, and 6c, a through hole is formed at a position facing the depressed portion. A through hole is also formed at the first end of each of third link members 7a, 7b, and 7c. The through hole at the second end of each of second link member 6a, 6b, 6c and through hole 73 at the first end of the corresponding one of third link member 7a, 7b, 7c are arranged so as to be aligned on a straight line. Coupling members 13a, 13b, and 13c are each inserted in the through hole at the second end of the corresponding one of second link members 6a, 6b, and 6c and through hole 73 at the first end of the corresponding one of third link members 7a, 7b, and 7c. Coupling members 13a, 13b, and 13c respectively couple second link members 6a, 6b, and 6c to third link members 7a, 7b, and 7c such that they are rotatable relative to each other. Coupling members 13a, 13b, and 13c are, for example, bolts and nuts. Coupling member 13a, 13b, and 13c, the second end of second link member 6a, 6b, 6c, and the first end of third link member 7a, 7b, 7c constitute a third revolute pair unit R3. That is, second link members 6a, 6b, and 6c are rotatably connected to third link members 7a, 7b, and 7c, respectively, at third revolute pair units R3.

Each of center axes 17a, 17b, and 17c of coupling members 13a, 13b, and 13c corresponds to the center axis of third revolute pair unit R3. Center axes 17a, 17b, and 17c extend in directions orthogonal to center axes 16a, 16b, and 16c, respectively.

Second link members 6a, 6b, and 6c may be configured such that center axes 17a, 17b, and 17c intersect center axes 16a, 16b, and 16c, respectively. In this case, the structure of first link members 4a to 4c and the structure of second link members 6a to 6c are slightly different from those described above. Specifically, in such a manner, a through hole is formed at an end (the location of revolute pair unit R2) of each of first link members 4a to 4c, and the location corresponding to revolute pair unit R2 in each of second link members 6a to 6c is formed in the shape of a shaft. In revolute pair unit R2, the shaft-shaped portion of each of second link members 6a to 6c is inserted in the through hole of the corresponding one of first link members 4a to 4c. In each of second link members 6a to 6c, the shaft-shaped portion at revolute pair unit R2 extends like a rod and its end portion serve as a depressed portion for connecting the corresponding one of third link members 7a to 7c. That is, for example, a triangle formed by three points: spherical link center point 30, revolute pair unit R3, and revolute pair unit R4, is a geometric structure that rotates on revolute pair unit R2. Three revolute pair units R2, R3, and R4 are arranged to have such a configuration.

Third link members 7a, 7b, and 7c are rod-shaped members each extending linearly. The above-noted through hole 73 is formed at a first end of each of third link members 7a, 7b, and 7c. The shape of third link members 7a, 7b, and 7c may be any shape other than the rod-like shape extending linearly. For example, third link members 7a, 7b, and 7c each may be a rod-shaped body extending in the form of an arc.

In each of third link members 7a, 7b, and 7c, a through hole 74 is formed at a second end positioned on the opposite side to the first end having through hole 73. In each of fourth link members 8a, 8b, and 8c, a depressed portion is formed to receive the second end of the corresponding one of third link members 7a, 7b, and 7c. A wall portion 83 facing the depressed portion of each of fourth link members 8a, 8b, and 8c has a through hole continuous to the depressed portion. Through hole 74 at the second end of each of third link members 7a, 7b, and 7c and the through hole formed in wall portion 83 of the corresponding one of fourth link members 8a, 8b, and 8c are arranged to be aligned on a straight line. Coupling members 14a, 14b, and 14c are each inserted in through hole 74 at the second end of the corresponding one of third link members 7a, 7b, and 7c and the through hole in wall portion 83 of the corresponding one of fourth link members 8a, 8b, and 8c. Coupling members 14a, 14b, and 14c respectively couple third link members 7a, 7b, and 7c to fourth link members 8a, 8b, and 8c such that they are rotatable relative to each other. Coupling members 14a, 14b, 14c are, for example, bolts and nuts. Coupling member 14a, 14b, 14c, the second end of third link member 7a, 7b, 7c, and wall portion 83 of fourth link member 8a, 8b, 8c constitute a fourth revolute pair unit R4. That is, third link members 7a, 7b, and 7c are rotatably connected to fourth link members 8a, 8b, and 8c, respectively, at fourth revolute pair units R4.

Each of center axes 18a, 18b, and 18c of coupling members 14a, 14b, and 14c corresponds to the center axis of fourth revolute pair unit R4. Center axes 18a, 18b, and 18c extend in directions parallel to center axes 17a, 17b, and 17c, respectively.

Fourth link members 8a, 8b, and 8c include respective base members 81a to 81c each connected to wall portion 83. Therefore, fourth link member 8a includes base member 81a and wall portion 83 coupled to third link member 7a. Fourth link member 8b is formed with base member 81b and wall portion 83 coupled to third link member 7b. Fourth link member 8c is formed with base member 81c and wall portion 83 coupled to third link member 7c.

The two-dimensional shape of base members 81a to 81c is circular. At the middle of base member 81a, as illustrated in FIG. 19, center shaft 82 is provided. Therefore, fourth link member 8a includes center shaft 82, in addition to base member 81a and wall portion 83. Base member 81b of fourth link member 8b is arranged so as to overlap base member 81a. A through hole is formed at the middle of base member 81a. Base member 81c of fourth link member 8c is arranged so as to lie on base member 81b. A through hole is formed at the middle of base member 81c. Base members 81b and 8c are stacked on base member 81a with center shaft 82 inserted in their respective through holes. A nut 9 is installed as a fastening member at the tip end portion of the center shaft 82. Fourth link members 8a, 8b, and 8c are rotatable independently of each other around center shaft 82. In the parallel link mechanism illustrated in FIG. 15 to FIG. 20, center shaft 82 of the stacked fourth link members 8a, 8b, and 8c or base members 81a to 81c can be considered as distal end member 8. As a distal end member, another member may be connected to center shaft 82 or one of base members 81a to 81c. In the configuration as described above, each of base members 81a to 81c, center shaft 82, and nut 9 constitute a fifth revolute pair unit R5. As can be understood from FIG. 19, fifth center axes 19 of fifth revolute pair units R5 of three link mechanisms 11 are arranged to overlap each other. That is, fifth revolute pair units R5 of a plurality of link mechanisms 11 are arranged to overlap each other at one place. A bolt that is a member separate from base member 81a may be used as center shaft 82. In this case, a through hole receiving the bolt is formed at the middle portion of base member 81a.

In fourth link members 8a, 8b, and 8c, fourth center axes 18a, 18b, and 18c of fourth revolute pair units R4 and fifth center axes 19 of fifth revolute pair units R5 are in a twisted arrangement. More specifically, fourth center axes 18a, 18b, and 18c of fourth revolute pair units R4 extend in directions orthogonal to fifth center axes 19 of fifth revolute pair units R5.

As illustrated in FIG. 15 and FIG. 18, first center axes 15a, 15b, and 15c of the first revolute pair units R1 and second center axes 16a, 16b, and 16c of second revolute pair units R2 intersect at spherical link center point 30. As illustrated in FIG. 19, fifth center axes 19 of respective fifth revolute pair units R5 of the link mechanisms 11 overlap each other and intersect with spherical link center point 30. As long as the relation above is satisfied, the arrangement of the pair units R1 to R5 can be set as desired.

Referring to FIG. 15 to FIG. 18, link actuation device 10A includes the parallel link mechanism having the configuration described above and posture control drive sources 35a, 35b, and 35c. Posture control drive sources 35a, 35b, and 35c are installed for all of three link mechanisms 11. Posture control drive sources 35a, 35b, and 35c change the posture of distal end member 8 relative to proximal end member 1 as desired by changing the respective angles of rotation around first center axes 15a, 15b, and 15c of first link members 4a, 4b, and 4c. In FIG. 19, posture control drive sources 35a, 35b, and 35c are not illustrated.

As illustrated in FIG. 15 and FIG. 18, posture control drive sources 35a, 35b, and 35c are fixed to fixing parts 36a, 36b, and 36c, respectively, and thereby connected to proximal end member 1. Fixing parts 36a, 36b, and 36c are installed at the outer peripheral portion on the surface of proximal end member 1. Fixing parts 36a, 36b, and 36c may be formed in any shape, for example, in a plate shape.

Posture control drive sources 35a, 35b, and 35c may employ any configuration that can generate a rotation driving force, such as electric motors. Posture control drive sources 35a, 35b, and 35c have respective rotatable rotation shafts 37. Rotation shafts 37 are inserted in through holes 43 of first link members 4a, 4b, and 4c and fixed by nuts 3a, 3b, and 3c. That is, first link members 4a, 4b, and 4c are fixed to rotation shafts 37. Rotation of rotation shafts 37 causes first link members 4a, 4b, and 4c to rotate around first center axes 15a, 15b, and 15c, respectively. Here, as illustrated in FIG. 18, first center axes 15a, 15b, and 15c each are the center axis of rotation shaft 37. Rotation shaft 37 and a portion of the corresponding one of first link members 4a, 4b, and 4c having through hole 43 receiving this rotation shaft 37 constitute first revolute pair unit R1.

Posture control drive sources 35a, 35b, and 35c are arranged at positions overlapping first center axes 15a, 15b, and 15c. Posture control drive sources 35a, 35b, and 35c are arranged on the surface on the distal end member 8 side of proximal end member 1 so as to protrude outward from the outer periphery of proximal end member 1.

With such a configuration, the posture of distal end member 8 relative to proximal end member 1 can be uniquely determined by the state of each link mechanism 11 (see FIG. 15). That is, the posture of distal end member 8 can be controlled by controlling the respective postures of first link members 4a, 4b, and 4c relative to proximal end member 1 or the respective angles of rotation of first link members 4a, 4b, and 4c around first center axes 15a, 15b, and 15c.

When three or more link mechanisms 11 (see FIG. 15) are installed in the link actuation device, posture control drive sources 35a, 35b, and 35c are installed for at least three link mechanisms among the three or more link mechanisms 11.

As illustrated in FIGS. 16, 17, 19, and 20, a working body attachment member 121 is fixed to link actuation device 10A. A working body described later can be attached to working body attachment member 121. The working body is a member that performs the working to be performed by link actuation device 10A. Working body attachment member 121 has, for example, a circular shape in a two-dimensional view and has a disc shape having a thickness along the up-down direction in FIG. 17. A through hole 122 extending in the thickness direction is formed at the middle portion including the center of working body attachment member 121 in a two-dimensional view. Center shaft 82 of fourth link member 8a and nut 9 are accommodated in through hole 122. Working body attachment member 121 has bolt-accommodating holes 123. Each bolt-accommodating hole 123 accommodates a bolt 124 as a fastening member so that bolt 124 fixes working body attachment member 121 to distal end member 8.

Working body attachment member 121 is fixed to any of three fourth link members 8a, 8b, and 8c. As illustrated in FIG. 20, here, as an example, working body attachment member 121 is fixed by bolt 124 on the top surface of base member 81c, which is the top layer of the stacked base members 81a, 81b, and 81c. Bolt-accommodating hole 123 extends in the thickness direction of working body attachment member 121 and penetrates therethrough. Bolt-accommodating hole 123 may be a through hole through which bolt 124 can penetrate, but may have a countersunk shape as illustrated in FIG. 20. Alternatively, instead of bolt-accommodating hole 123, a planar portion for fixing a working body by adhesive may be provided on the surface of working body attachment member 121.

Base member 81c may have a hole 125 having a female thread in which a threaded part of bolt 124 can be inserted and screwed. Bolt 124 is arranged and screwed so as to be inserted into bolt-accommodating hole 123 and hole 125 adjacent thereto. Working body attachment member 121 is thus fixed to base member 81c, that is, fourth link member 8c.

On the outside of through hole 122 in a two-dimensional view, attachment portions 126 each extending in the thickness direction are formed as holes for attaching a working body described later. Attachment portions 126 are spaced apart from through hole 122. Attachment portions 126 each may be a through hole through which a bolt can penetrate or may have a countersunk shape as illustrated in FIG. 20. Attachment portions 126 may be formed at positions near the outer periphery of attachment portions 126. Alternatively, instead of attachment portion 126, a planar portion may be provided on a surface of working body attachment member 121 as a space to which a working body is fixed by adhesive.

<Operation of Link Actuation Device>

Figure 21:
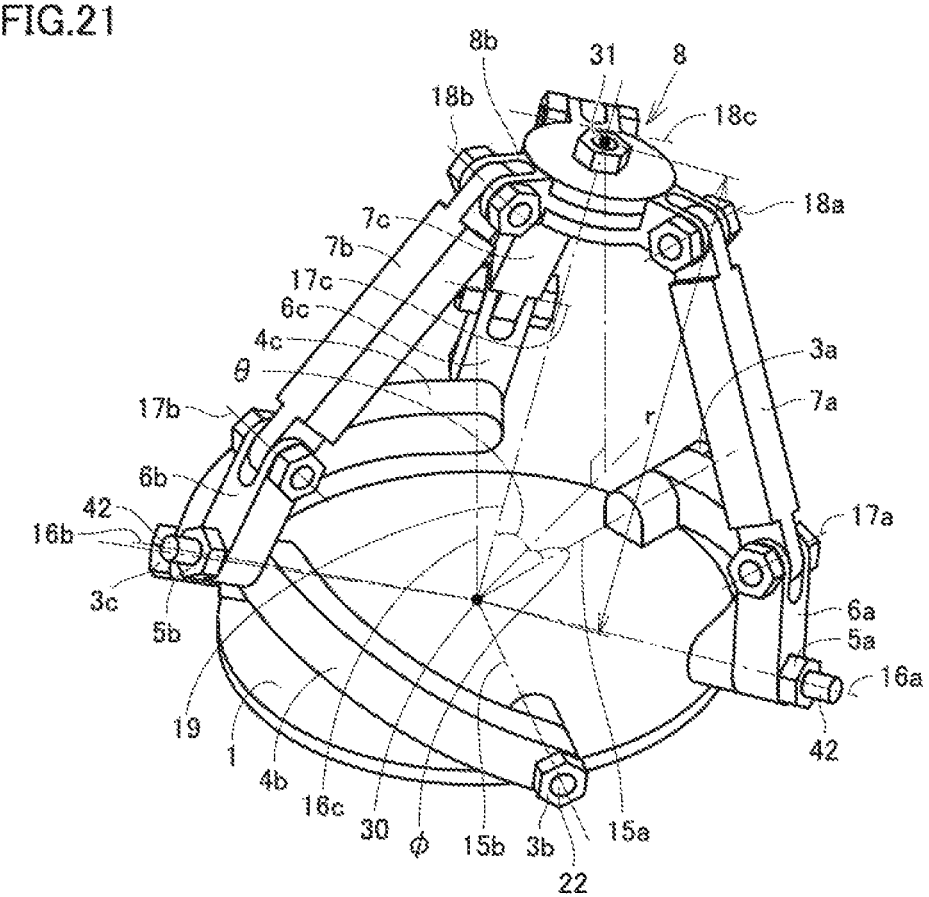
FIG. 21 is a perspective view illustrating a state in which the posture of the distal end member is changed in the link actuation device illustrated in FIG. 15.

FIG. 21 is a perspective view illustrating a state in which the posture of the distal end member is changed in the link actuation device illustrated in FIG. 15. As illustrated in FIG. 21, the position of distal end member 8 can be changed as desired by changing each of the angles of rotation around first center axes 15a, 15b, and 15c in first revolute pair units R1 of first link members 4a, 4b, and 4c. In FIG. 21, the angle of rotation around first center axis 15b of first link member 4b is relatively increased so that the fourth link member 8b side of distal end member 8 is lifted upward, and the entire distal end member 8 moves to the opposite side to the side on which fourth link member 8b is positioned as viewed from distal end member center 31.

In link actuation device 10A illustrated in FIG. 15 to FIG. 21, because of the configuration as described above, distal end member 8 operates on a sphere around spherical link center point 30. That is, as illustrated in FIG. 21, the posture of distal end member 8 can be represented by three-dimensional polar coordinates (r, θ, φ) in which spherical link center point 30 is the origin. As used herein the bend angle θ is the angle formed by: a straight line passing through spherical link center point 30 and a point at which a line extending downward vertically from distal end member center 31 intersects a plane including first center axes 15a, 15b, and 15c of first revolute pair units R1 that are connecting parts between proximal end member 1 and first link members 4a, 4b, and 4c; and fifth center axis 19 that is the distal end member center axis. The turning angle φ is the angle formed by: a straight line passing through spherical link center point 30 and a point at which a line extending downward vertically from distal end member center 31 intersects a plane including first center axes 15a, 15b, and 15c; and first center axis 15a of first revolute pair unit R1 of first link mechanism 11. The center-to-center distance r is the distance between spherical link center point 30 and distal end member center 31.

In FIG. 21, for convenience of explanation, the parallel link mechanism that does not have posture control drive sources 35a, 35b, and 35c is illustrated. In FIG. 21, first link members 4a, 4b, and 4c are rotatably connected to respective shaft portions 22, which are equivalent to the above-noted rotation shafts 37, connected to proximal end member 1. Nuts 3a, 3b, and 3c are fixed to the tip ends of the respective shaft portions 22.

<Attachment Example of Working Body>

Figure 22:
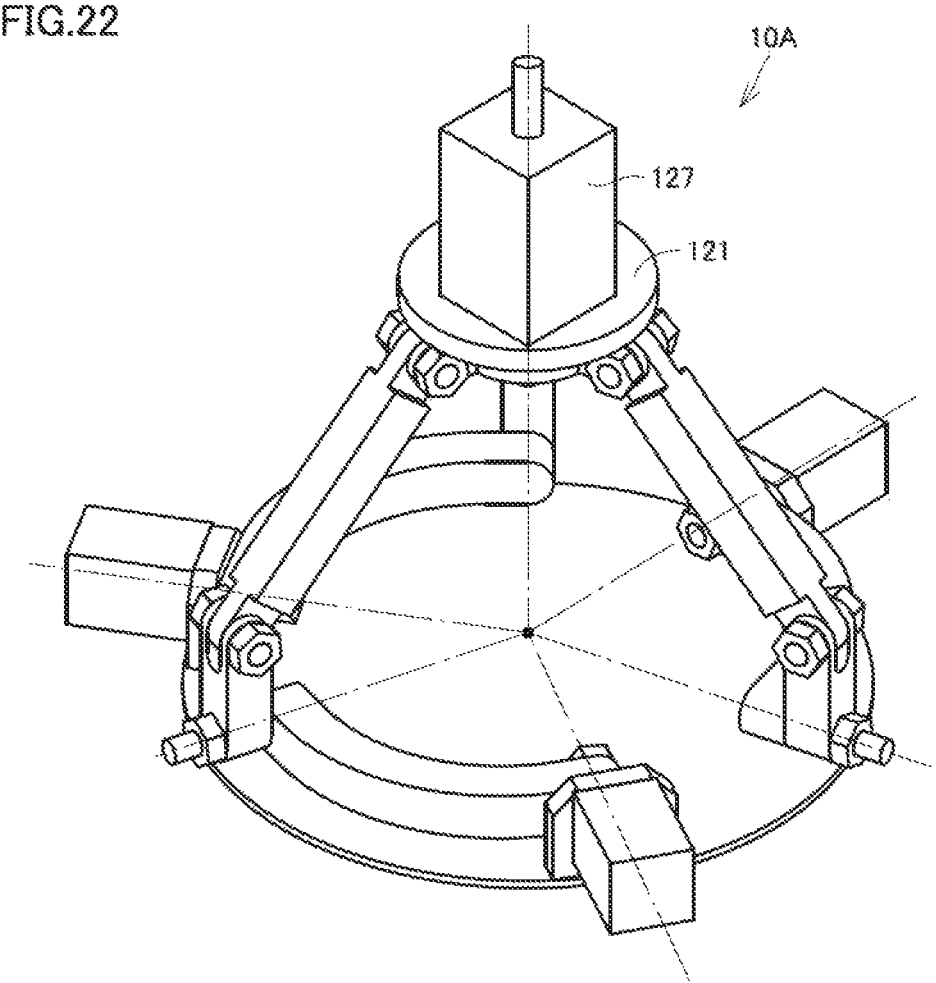
FIG. 22 is a perspective view illustrating a manner in which a working body is attached to the working body attachment member of the link actuation device in FIG. 16.

FIG. 22 is a perspective view illustrating a manner in which a working body is attached to the working body attachment member of the link actuation device in FIG. 16. As illustrated in FIG. 22, a working body 127, which may be called an end effector, is attached to working body attachment member 121 of link actuation device 10A according to the present embodiment. Working body 127 is attached by, for example, not-shown bolts accommodated in the above-noted attachment portions 126. In FIG. 22, a shaft protrudes upward from the rectangular parallelepiped-shaped main part of working body 127. This shaft serves as, for example, the axis of center of rotation when a drill serving as a working body part is attached to working body 127, and the axis for transmitting rotational motive power to the attached drill. However, working body 127 does not necessarily have such a shaft.

Figure 23:
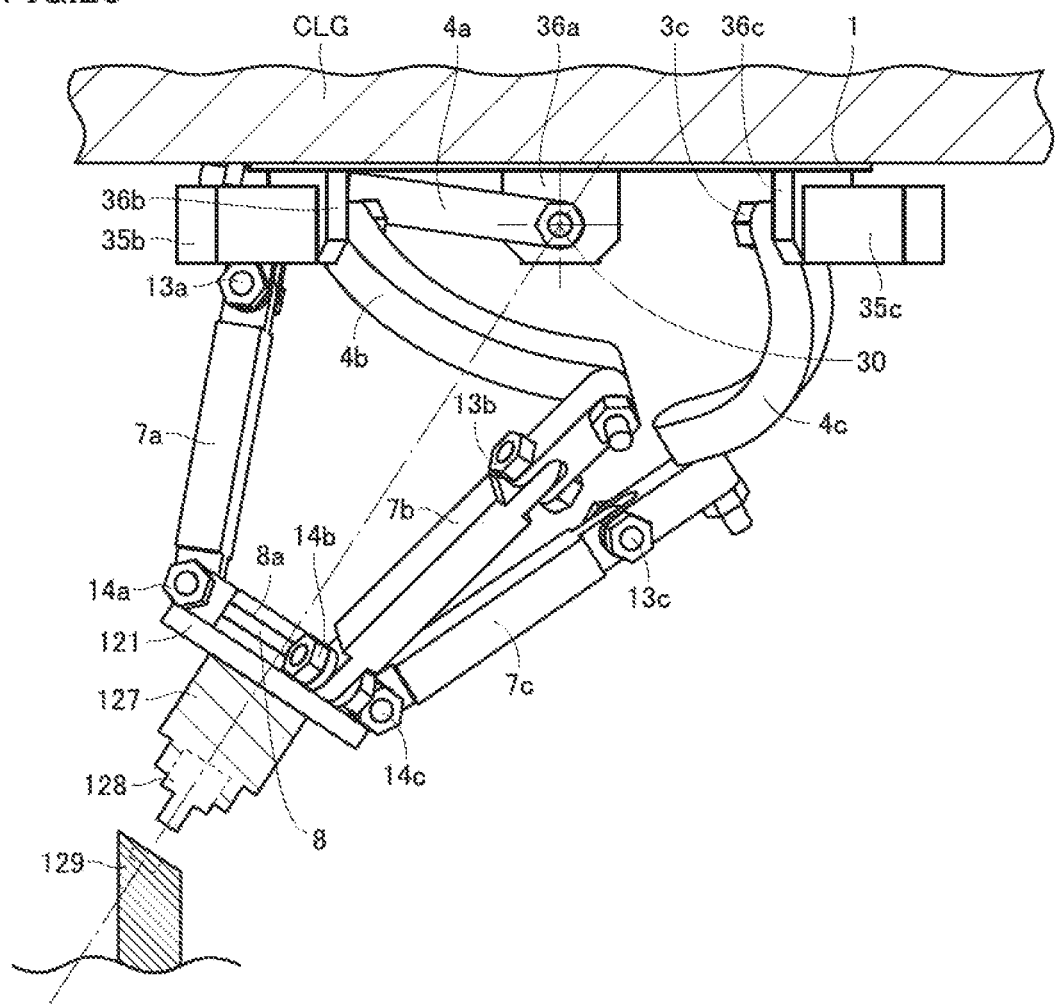
FIG. 23 is a front view illustrating a use example of the link actuation device in the eighth embodiment illustrated in FIG. 22.

FIG. 23 is a front view illustrating a use example of the link actuation device in the eighth embodiment illustrated in FIG. 22. As illustrated in FIG. 23, the link actuation device in FIG. 22 is turned upside down from the state in FIG. 22, and proximal end member 1 is fixed to a surface of a ceiling CLG facing downward. Thus, posture control drive sources 35a, 35b, and 35c and fixing parts 36a, 36b, and 36c are arranged adjacent to the surface of ceiling CLG facing downward.

In FIG. 23, working body attachment member 121 is attached to base member 81c as shown in FIG. 20, and working body 127 is attached to the opposite side to proximal end member 1, that is, the lower surface in FIG. 23. Working body 127 is a hand for gripping an object in. FIG. 23. However, the working body is not limited thereto. The hand that is working body 127 has a distal end on the lower side split into two parts. A work target 128 can be pinched and gripped between the two parts. In FIG. 23, the hand that is working body 127 grips a connector as work target 128. However, work target 128 is not limited to a connector. Working body 127 is thus installed so that a given work is performed on work target 128. Work target 128 gripped by working body 127 faces a workbench 129, for example, a connector slot. Working body 127 is moved in the up-down direction by link actuation device 10A. Working body 127 thus can insert work target 128 into workbench 129 or remove work target 128 from workbench 129. In FIG. 23, by changing the distance between spherical link center point 30 and distal end member 8, link actuation device 10A can attach and remove work target 128 to/from workbench 129 oriented in any given direction.

<Operation and Effect>

Link actuation device 10A according to the present disclosure includes proximal end member 1 and three or more link mechanisms 11. Three or more link mechanisms 11 are configured to connect proximal end member 1 to distal end member 8. Three or more link mechanisms 11 can change the posture of distal end member 8 relative to proximal end member 1. Three or more link mechanisms 11 each include first to fourth link members. First link members 4a, 4b, and 4c are rotatably connected to proximal end member 1 at first revolute pair units R1. Second link members 6a, 6b, and 6c are rotatably connected to first link members 4a, 4b, and 4c, respectively, at second revolute pair units R2. Third link members 7a, 7b, and 7c are rotatably connected to second link members 6a, 6b, and 6c, respectively, at third revolute pair units R3. Fourth link members 8a, 8b, and 8c are rotatably connected to third link members 7a, 7b, and 7c, respectively, at fourth revolute pair units R4. Fourth link members 8a, 8b, and 8c are further rotatably connected to distal end member 8 at fifth revolute pair units R5. In three or more link mechanisms 11, first center axes 15a, 15b, and 15c of first revolute pair units R1 and second center axes 16a, 16b, and 16c of second revolute pair units R2 intersect at spherical link center point 30. Fifth center axes 19 of respective fifth revolute pair units R5 of three or more link mechanisms 11 overlap each other and intersect with spherical link center point 30. Link actuation device 10A further includes posture control drive sources 35a, 35b, and 35c and working body attachment member 121. Posture control drive sources 35a, 35b, and 35c are installed for at least three link mechanisms 11 among three or more link mechanisms 11 and change the posture of distal end member 8 relative to proximal end member 1 as desired. Working body attachment member 121 is fixed to any of three or more fourth link members 8a, 8b, and 8c.

In this manner, since each of three or more link mechanisms 11 is a five-bar chain structure having first revolute pair unit R1 to fifth revolute pair unit R5, distal end member 8 can be moved relative to proximal end member 1 with, in total, three degrees of freedom including two degrees of freedom of rotation around spherical link center point 30 and one degree of freedom in a direction along fifth center axis 19. Therefore, distal end member 8 can be moved relative to proximal end member 1 along a sphere around spherical link center point 30 and also can be moved in a direction along fifth center axis 19 independently of the movement along the sphere. As a result, distal end member 8 can be moved along the sphere, and the radius of the sphere along which distal end member 8 moves can be adjusted, so that the operable range of distal end member 8 can be increased compared with when distal end member 8 can move only along a sphere with a fixed radius. As used herein "fourth link members 8a, 8b, and 8c are configured to be rotatably connected to distal end member 8 at fifth revolute pair units R5" means that fourth link members 8a, 8b, and 8c have a portion that can connect the distal end member as a separate member, and includes a case where a part of fourth link members 8a, 8b, and 8c functions as the distal end member. The movement of distal end member 8 in a direction along fifth center axis 19 facilitates an operation such as insertion and removal of a connector to/from a desired place as shown in FIG. 23.

In link actuation device 10A according to the present disclosure, at least three posture control drive sources 35a, 35b, and 35c individually control link mechanisms 11 thereby allowing distal end member 8 to operate in a wide range and precisely. The configuration described above can be used to provide a lightweight and compact link actuation device.

Working body attachment member 121 is fixed to link actuation device 10A. Thus, link actuation device 10A has working body 127 attached to working body attachment member 121 and allows the working body to operate stably. Link actuation device 10A therefore can function as a working device capable of working on work target 128 as a target that is a workpiece. Because of working body attachment member 121, even a heavy-weight working body 127 can be fixed to the surface of working body attachment member 121 and thus attached more easily than when working body attachment member 121 is not provided. Therefore, the heavy-weight working body 127 attached can operate at high speed and high accuracy. Furthermore, the positioning for processing a work target can be performed precisely.

Ninth Embodiment

<Configuration of Link Actuation Device>

Figure 24:
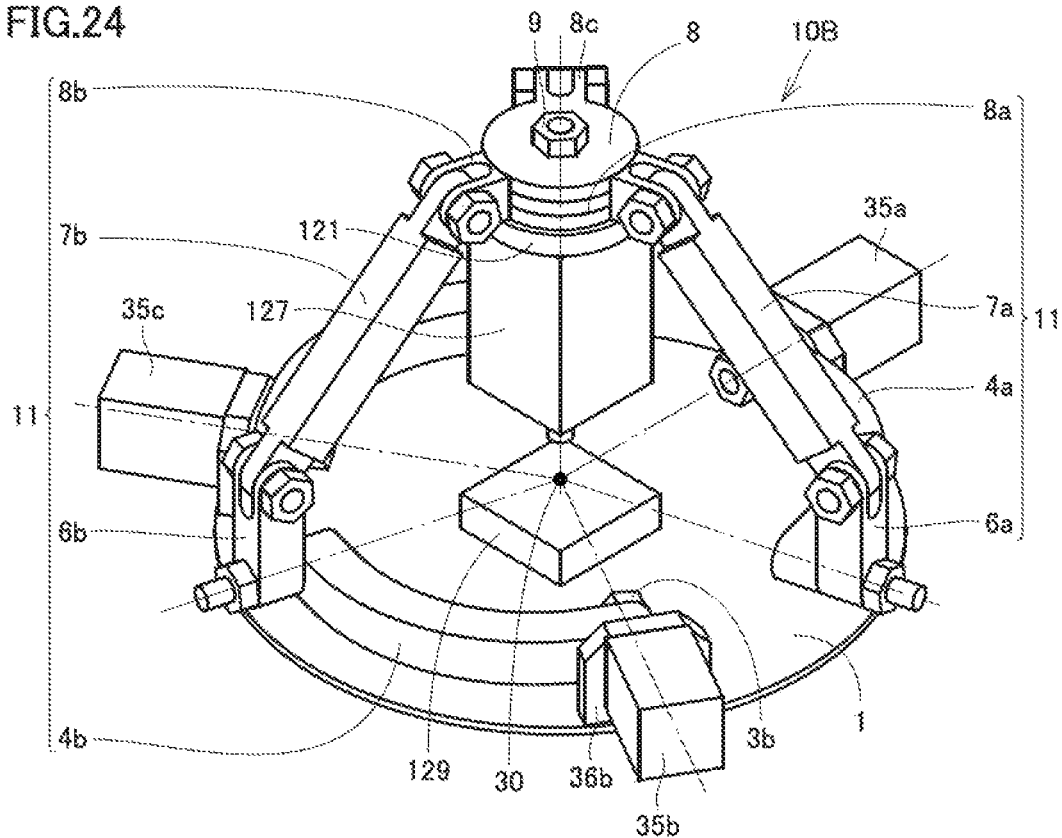
FIG. 24 is a perspective view illustrating the link actuation device according a ninth embodiment in a state in which the working body attachment member is mounted.
Figure 25:
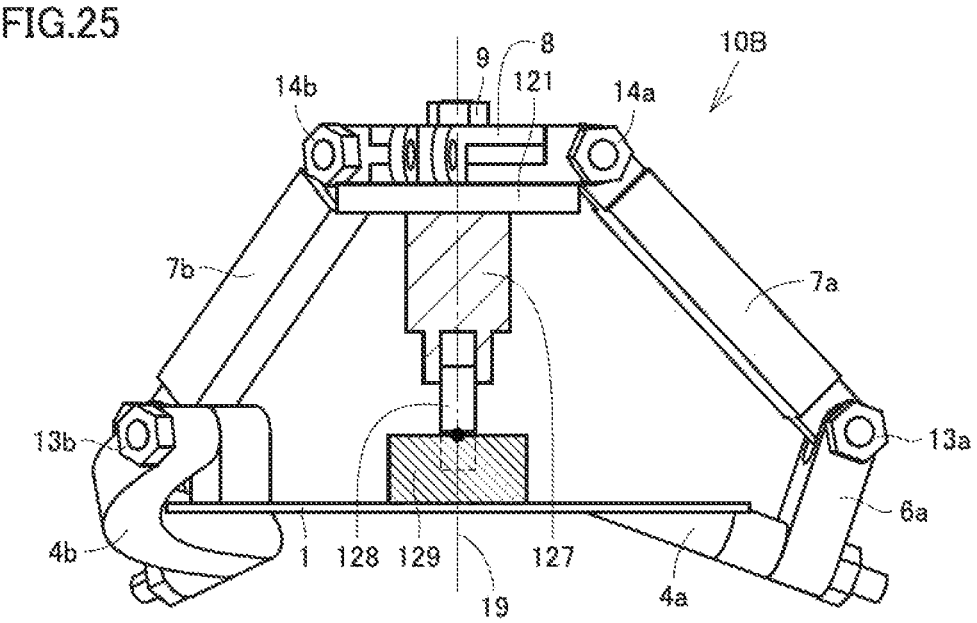
FIG. 25 is a front view illustrating a use example of the link actuation device in the ninth embodiment illustrated in FIG. 24.

FIG. 24 is a perspective view illustrating the link actuation device according a ninth embodiment in a state in which the working body attachment member is mounted. FIG. 25 is a front view illustrating a use example of the link actuation device in the ninth embodiment illustrated in FIG. 24. As illustrated in FIG. 24 and FIG. 25, a link actuation device 10B in the present embodiment differs from link actuation device 10A in the position where working body attachment member 121 and working body 127 are arranged. In link actuation device 10B in FIG. 24 and FIG. 25, proximal end member 1 is arranged on the lower side and distal end member 8 is arranged on the upper side in the same manner as in FIG. 15, and they are not turned upside down unlike FIG. 23.

As illustrated in FIG. 25, working body attachment member 121 is fixed to the proximal end member 1 side of distal end member 8, that is, the lower side of distal end member 8 in FIG. 25. Working body 127 is attached to the lower-side surface of working body attachment member 121 in FIG. 25. Therefore, working body 127 is attached to working body attachment member 121 such that its center of gravity is arranged on the proximal end member 1 side with respect to distal end member 8, that is, on the lower side in the figure. Working body 127 is arranged such that its position in the height direction is substantially the same as third link members 7a to 7c.

Work target 128 that working body 127 works on can be arranged on the proximal end member 1 side with respect to distal end member 8. In the present embodiment, work target 128 can be arranged on the proximal end member 1 side with respect to distal end member 8 in the up-down direction in FIG. 24 and FIG. 25. That is, work target 128 is gripped, for example, at the lower region in FIG. 25 of working body 127 and is arranged between distal end member 8 and proximal end member 1. Work target 128 is arranged such that its position in the height direction is substantially the same as first link members 4a to 4c. Workbench 129 is illustrated on proximal end member 1.

That is, in FIG. 24 and FIG. 25, working body attachment member 121, working body 127, work target 128, and workbench 129 are arranged in a position surrounded by three or more link mechanisms 11 in a two-dimensional view. In other words, working body attachment member 121, working body 127, work target 128, and workbench 129 are arranged in a region overlapping with distal end member 8 in a two-dimensional view, that is, at a middle portion of a region overlapping with proximal end member 1 in a two-dimensional view.

FIG. 25 illustrates a link actuation device having a configuration different from the original link actuation device 10B in the present embodiment illustrated in FIG. 24, for convenience of explanation of operation. Specifically, posture control drive sources 35a, 35b, and 35c are not drawn in the link actuation device illustrated in FIG. 25. In the link actuation device illustrated in FIG. 25, some members are not illustrated for visibility of the inside operation. Examples of these members include first link member 4c and second link member 6c. In the link actuation device illustrated in FIG. 25, first link members 4a and 4b are arranged outside when proximal end member 1 is viewed from distal end member 8. Therefore, first link members 4a to 4c in FIG. 25 are lowered more easily to the lower side of proximal end member 1, that is, to the opposite side to distal end member 8, compared with first link members 4a to 4c in FIG. 24. That is, in FIG. 25, working body 127 is moved to the lower side more easily in FIG. 25 than in FIG. 24.

<Attachment Example of Working Body>

In FIG. 25, working body 127 is a hand for gripping an object. However, working body 127 is not limited thereto. The hand serving as a gripper that is working body 127 has a distal end on the lower side split into two parts. Work target 128 can be pinched and gripped between the two parts. In FIG. 25, the hand that is working body 127 grips a pin as work target 128. However, work target 128 is not limited to a pin. Workbench 129 is placed on the middle portion of proximal end member 1. Work target 128 gripped by working body 127 faces, for example, a pin slot formed in workbench 129. Working body 127 is moved by link actuation device 10A in the up-down direction along fifth center axis 19. Working body 127 thus can insert work target 128 into the pin slot in workbench 129 or remove work target 128 from workbench 129. It is preferable that, for example, a not-shown load sensor is arranged appropriately and the positioning control of working body 127 is performed by referring to output from the load sensor. In this way, working body 127 can operate minutely in the state illustrated in FIG. 25 to enable minute operation such as inserting and removing a pin into/from the pin slot in workbench 129 without misalignment. As illustrated in. FIG. 24, it is more preferable that the center in a two-dimensional view of working body 127 is arranged at a position overlapping spherical link center point 30. In this manner, the working can be performed more easily.

<Operation and Effect>

The present embodiment achieves the following operation and effect in addition to the operation and effect of link actuation device 10A in the eighth embodiment. In link actuation device 10B according to the present disclosure, working body 127 performing the working can be attached to working body attachment member 121. Working body 127 is attached to working body attachment member 121 such that the center of gravity of working body 127 is arranged on the proximal end member 1 side with respect to distal end member 8.

In this manner, for example, compared with the eighth embodiment in which working body 127 is attached to working body attachment member 121 fixed on the upper surface of base member 81c, the distance between the center of gravity of working body 127 and spherical link center point 30 can be reduced. Therefore, compared with link actuation device 10A in the eighth embodiment, the moment of inertia around spherical link center point 30 of working body 127 can be reduced. In the present embodiment, therefore, vibration of working body 127 during positioning operation can be reduced compared with the eighth embodiment. As a result, working body 127 in the present embodiment can perform fast and accurate operation.

Supposing that working body 127 is arranged above distal end member 8 outside of the region surrounded by three or more link mechanisms 11 as in the eighth embodiment, the distance between the center of gravity of working body 127 and spherical link center point 30 is greater than the distance in the configuration illustrated in FIG. 24. In the eighth embodiment, therefore, the moment of inertia in the operation of positioning working body 127 is larger. The present embodiment can eliminate such inconvenience.

Link actuation device 10B according to the present disclosure can achieve lower output, that is, energy saving of posture control drive sources 35a to 35c. As a result, link actuation device 10B can be downsized. Such an effect is achieved particularly when, for example, working body 127 that is long in the direction of fifth center axis 19 or working body 127 that has the center of gravity on the distal end member 8 side is used in FIG. 25. This is because the moment of inertia of working body 127 is large particularly when such a working body 127 is used.

In the present embodiment, it suffices if working body 127 is attached to working body attachment member 121 such that the center of gravity of working body 127 is arranged on the proximal end member 1 side with respect to distal end member 8. That is, as illustrated in FIG. 24 and FIG. 25, work target 128 and workbench 129 may be arranged on the proximal end member 1 side of working body 127. However, although not illustrated, the arrangement of work target 128 and workbench 129 can be selected as desired as long as the center of gravity of working body 127 is arranged on the proximal end member 1 side with respect to distal end member 8.

In link actuation device 10B, working body attachment member 121 is fixed to face the proximal end member 1 side of distal end member 8. Work target 128 that working body 127 works on can be arranged on the proximal end member 1 side with respect to distal end member 8. In particular, it is preferable that work target 128 can be arranged between distal end member 8 and proximal end member 1.

As described above, the center of gravity of working body 127 is arranged on the proximal end member 1 side with respect to distal end member 8. Therefore, even when work target 128 is arranged on the proximal end member 1 side with respect to distal end member 8, working body 127 can be arranged in a region surrounded by three or more link mechanisms 11 at a short distance to work target 128. When work target 128 can be arranged between distal end member 8 and proximal end member 1, in particular, the distance between working body 127 and work target 128 can be reduced so that, for example, the operation such as delivery of work target 128 can be performed more reliably.

Tenth Embodiment

<Configuration of Link Actuation Device>

Figure 26:
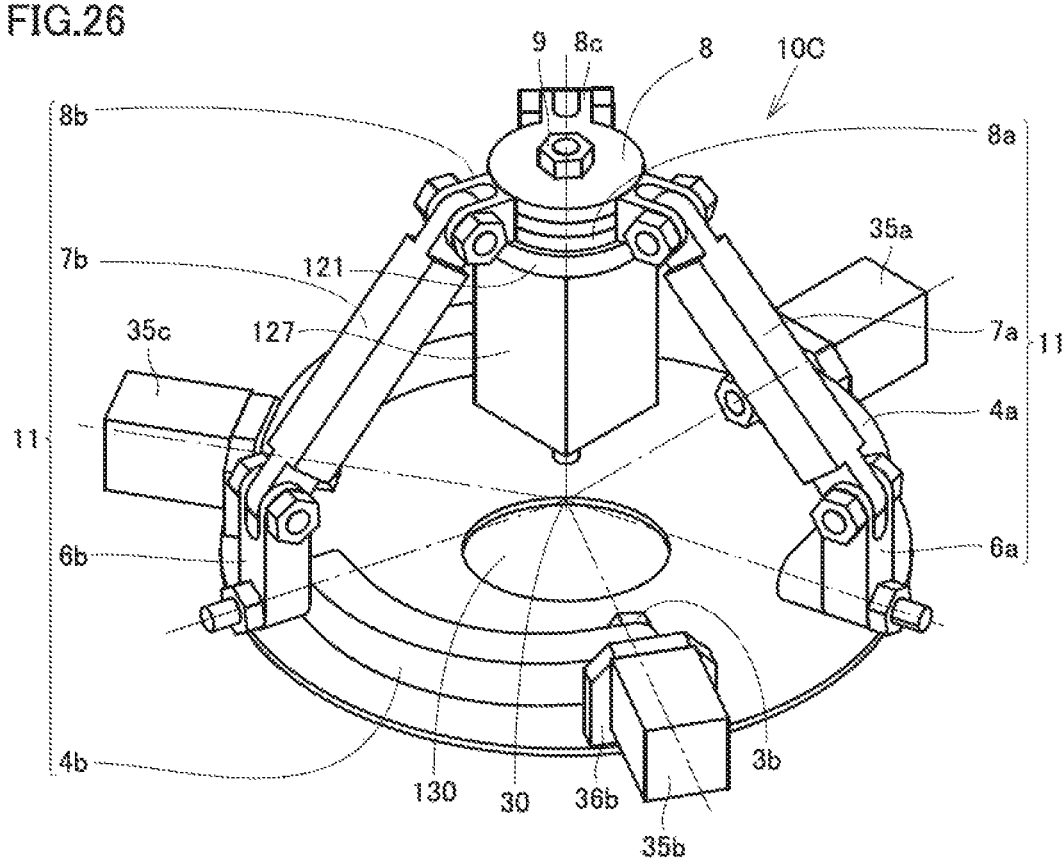
FIG. 26 is a perspective view illustrating the link actuation device according a tenth embodiment in a state in which the working body attachment member is mounted.
Figure 27:
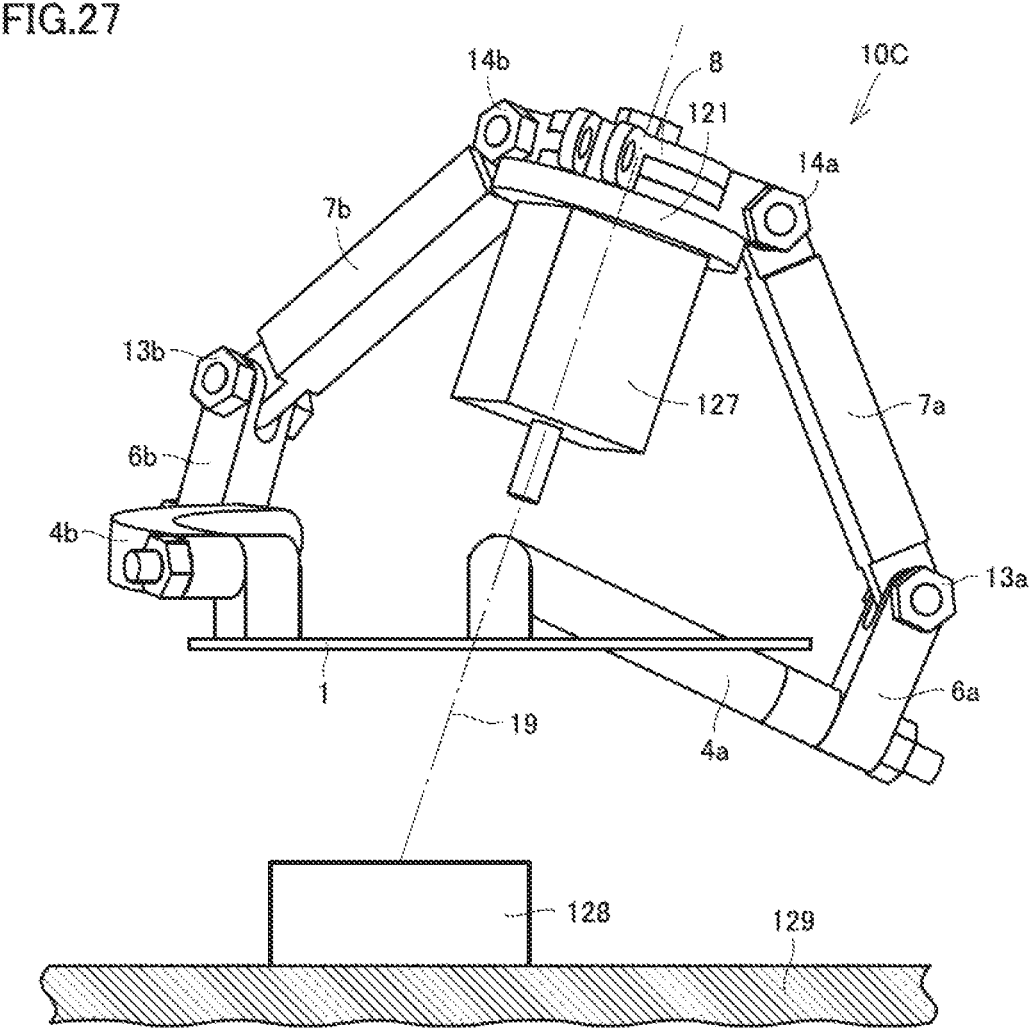
FIG. 27 is a front view illustrating a use example of the link actuation device in the tenth embodiment illustrated in FIG. 26.

FIG. 26 is a perspective view illustrating the link actuation device according a tenth embodiment in a state in which the working body attachment member is mounted. FIG. 27 is a front view illustrating a use example of the link actuation device in the tenth embodiment illustrated in FIG. 26. As illustrated in FIG. 26 and FIG. 27, a link actuation device 10C in the present embodiment differs from link actuation device 10B in a manner of proximal end member 1. In link actuation device 10C in FIG. 26 and FIG. 27, proximal end member 1 is arranged on the lower side and distal end member 8 is arranged on the upper side, similarly to link actuation device 10B in FIG. 24 and FIG. 25, and they are not turned upside down unlike FIG. 23.

Specifically, as illustrated in FIG. 26, proximal end member 1 has a proximal end member through hole 130. Proximal end member through hole 130 is formed, for example, at the middle portion of proximal end member 1 so as to have a circular shape around the middle of proximal end member 1 in a two-dimensional view, that is, the position overlapping spherical link center point 30. However, proximal end member through hole 130 is not limited thereto and may have any other two-dimensional shape, for example, a rectangular shape as long as it is formed at the middle portion of proximal end member 1.

As illustrated in FIG. 27, in the present embodiment, work target 128 can be arranged on the opposite side to distal end member 8 relative to proximal end member 1. That is, work target 128 is arranged below proximal end member 1. Thus, working body 127, proximal end member 1 (proximal end member through hole 130), and work target 128 are arranged in this order from the upper side to the lower side in FIG. 27. Working body 127 can work on work target 128 arranged on the opposite side to distal end member 8 with proximal end member through hole 130 interposed. That is, in the present embodiment, work target 128 is arranged below first link members 4a to 4c in FIG. 27. Work target 128 is spaced apart from proximal end member 1 in the direction along fifth center axis 19. It is preferable that work target 128 is mounted on workbench 129.

FIG. 27 illustrates a link actuation device having a configuration different from the original link actuation device 10B in the present embodiment illustrated in FIG. 26, for convenience of explanation of operation, similarly to FIG. 24 and FIG. 25. Specifically, posture control drive sources 35a, 35b, and 35c are not drawn in the link actuation device illustrated in FIG. 27. In the link actuation device illustrated in FIG. 27, some members are not illustrated for visibility of the inside operation. Examples of these members include first link member 4c and second link member 6c. In the link actuation device illustrated in FIG. 27, first link members 4a and 4b are arranged outside when proximal end member 1 is viewed from distal end member 8. Therefore, first link members 4a to 4c in FIG. 27 are lowered more easily to the lower side of proximal end member 1, that is, to the opposite side to distal end member 8, compared with first link members 4a to 4c in FIG. 26. That is, in FIG. 27, working body 127 is moved to the lower side in FIG. 27 more easily than in FIG. 26.

<Attachment Example of Working Body>

In FIG. 27, working body 127 is a dispenser for supplying a coating liquid. An axial protrusion provided at the lowest portion of working body 127 is a nozzle for ejecting the liquid. It is preferable that the nozzle extends from the middle portion in a two-dimensional view on the bottom surface of working body 127, for example, in a direction along fifth center axis 19 in such a manner that liquid can be ejected from the lowest portion thereof. Work target 128 is a processed member to be coated with a coating liquid ejected by the dispenser of working body 127. Work target 128 is placed on, for example, a belt conveyor as workbench 129. That is, work target 128 is conveyed on the belt conveyor to be arranged, for example, immediately below proximal end member through hole 130.

Work target 128 is conveyed to immediately below proximal end member through hole 130 through the belt conveyor serving as workbench 129, and the nozzle of working body 127 and a region to be coated with liquid on a surface of work target 128 are aligned on a straight line through a space in the inside of proximal end member through hole 130. At this moment, for example, working body 127 may be moved by link actuation device 10C in the up-down direction along fifth center axis 19. The nozzle of working body 127 thus can pass through, for example, proximal end member through hole 130 and move downward therefrom. In this state, working body 127 ejects liquid so that a desired place of work target 128 is coated with the liquid. It is more preferable that the center of proximal end member 1 and the center of proximal end member through hole 130 are arranged at a position overlapping spherical link center point 30. In this manner, the working can be performed more easily.

<Operation and Effect>

The present embodiment achieves the following operation and effect in addition to the operation and effect of link actuation device 10A in the eighth embodiment and link actuation device 10B in the ninth embodiment. In link actuation device 10C according to the present disclosure, proximal end member 1 has proximal end member through hole 130. Work target 128 can be arranged on the opposite side to distal end member 8 relative to proximal end member 1. Working body 127 can work on work target 128 arranged on the opposite side to distal end member 8 with proximal end member through hole 130 interposed.

In this manner, as illustrated in FIG. 27, even for work target 128 located below proximal end member 1, working body 127 can work on work target 128 because proximal end member through hole 130 is formed. For example, working body 127 is moved by link actuation device 10C in the up-down direction so that working body 127 can be arranged in close proximity to work target 128. Working body 127 thus can perform a desired operation for work target 128.

In addition to the examples described above, although not illustrated in the figures, when working body 127 that is long in the axial direction is mounted, working body 127 may be passed through proximal end member through hole 130 and a part of working body 127 may protrude below proximal end member 1 to work on work target 128.

In the present embodiment, while the moment of inertia of working body 127 is reduced, similarly to the ninth embodiment, the working can be performed on work target 128 arranged outside the region surrounded by three or more link mechanisms 11 of link actuation device 10C.

Although the number of link mechanisms 11 is three in each embodiment, the number of link mechanisms 11 may be any number of four or more, for example, five, six, or eight.

Eleventh Embodiment

Figure 28:
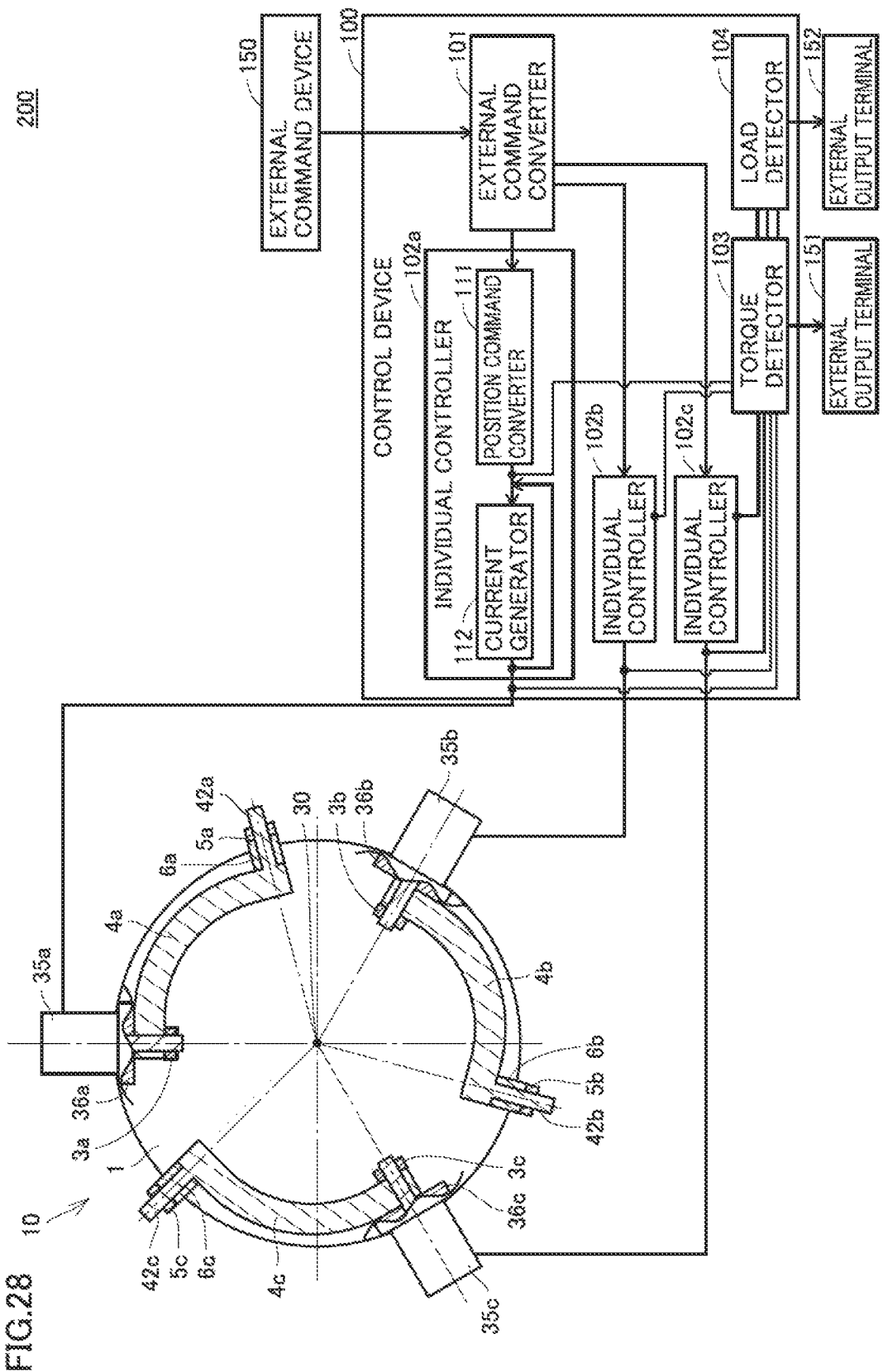
FIG. 28 is a diagram illustrating an overall configuration of the link actuation device according to an eleventh embodiment.

FIG. 28 is a diagram illustrating an overall configuration of the link actuation device according to an eleventh embodiment. Referring to FIG. 28, a link actuation device 200 includes parallel link mechanism 10 on which a working body is mounted, posture control drive sources 35a, 35b, and 35c serving as actuators for actuating parallel link mechanism 10, and a control device 100 for controlling posture control drive sources 35a, 35b, and 35c. First link members 4a, 4b, and 4c that constitute parallel link mechanism 10 are attached to the rotation shafts of posture control drive sources 35a, 35b, and 35c, respectively.

The detail of parallel link mechanism 10 will be described first and then control of posture control drive sources 35a, 35b, and 35c by control device 100 will be described.

<Configuration of Parallel Link Mechanism>

Figure 29:
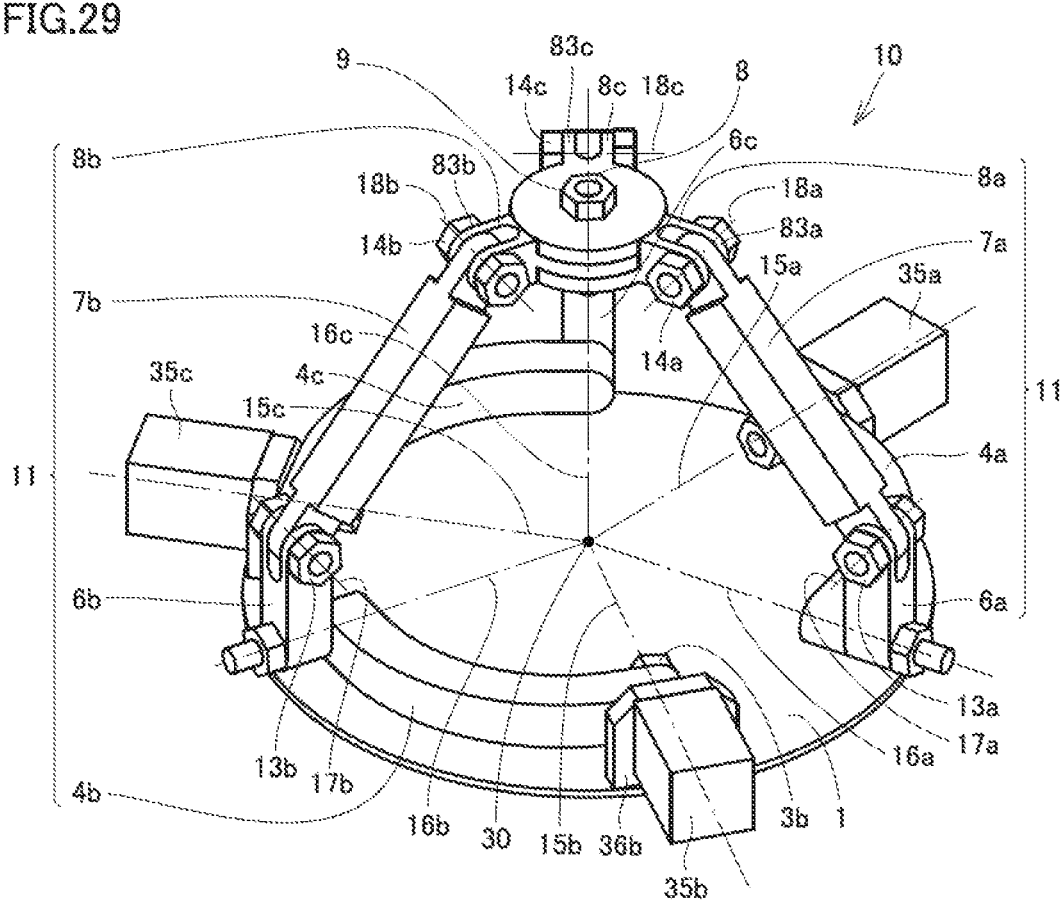
FIG. 29 is a perspective view illustrating a configuration of the parallel link mechanism according to the eleventh embodiment.
Figure 30:
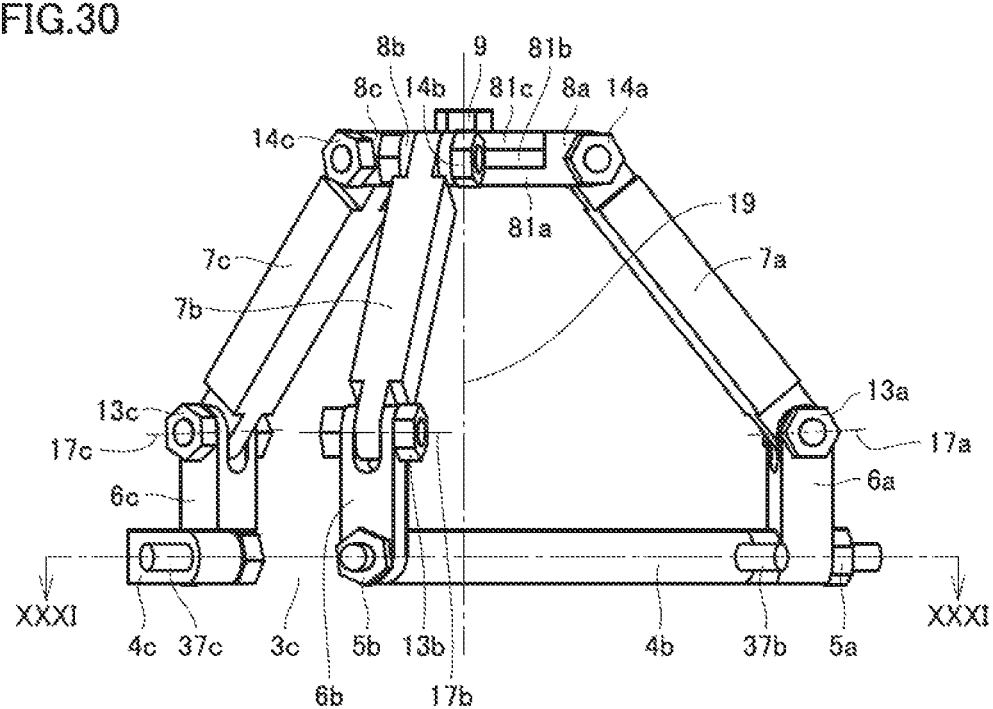
FIG. 30 is a front view of the parallel link mechanism illustrated in FIG. 29.
Figure 31:
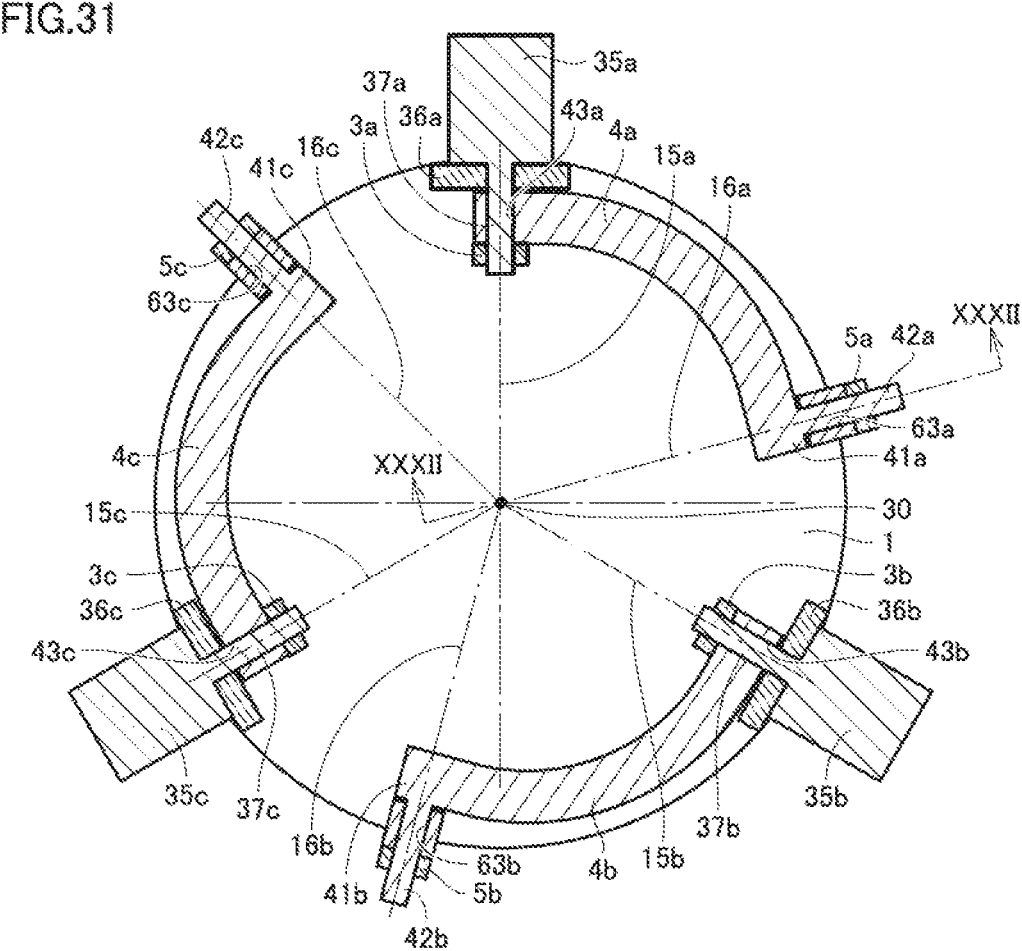
FIG. 31 is a cross-sectional view in line XXXI-XXXI in FIG. 30.
Figure 32:
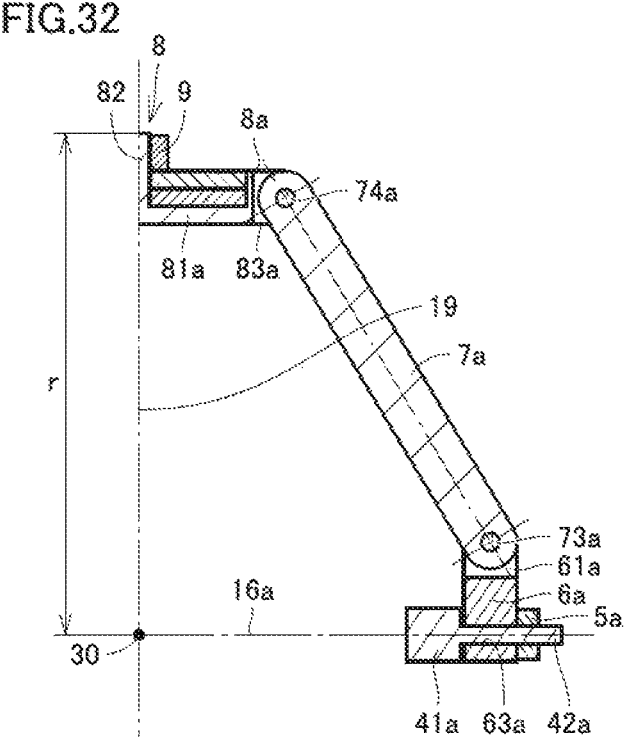
FIG. 32 is a cross-sectional view in line XXXII-XXXII in FIG. 31.

FIG. 29 is a perspective view illustrating a configuration of the parallel link mechanism according to the present eleventh embodiment. FIG. 30 is a front view of the parallel link mechanism illustrated in FIG. 29. FIG. 31 is a cross-sectional view in line XXXI-XXXI in FIG. 30. FIG. 32 is a cross-sectional view in line XXXII-XXXII in FIG. 31.

Parallel link mechanism 10 illustrated in FIG. 29 to FIG. 32 includes proximal end member 1, distal end member 8, and three link mechanisms 11. Proximal end member 1 is a plate-shaped body having a circular shape in two dimensions. Proximal end member 1 may have any shape. For example, the two-dimensional shape of proximal end member 1 may be polygonal such as quadrangular and triangular, or oval or semi-circular. The number of link mechanisms 11 is three or more, for example, may be four or five.

Three link mechanisms 11 connect proximal end member 1 to distal end member 8 such that a posture of distal end member 8 relative to proximal end member 1 can be changed. Three link mechanisms 11 include respective first link members 4a, 4b, and 4c, respective second link members 6a, 6b, and 6c, respective third link members 7a, 7b, and 7c, and respective fourth link members 8a, 8b, and 8c.

Posture control drive sources 35a, 35b, and 35c are installed for respective three link mechanisms 11. Posture control drive sources 35a, 35b, and 35c may employ any configuration that can generate a rotation driving force, such as electric motors. Posture control drive sources 35a, 35b, and 35c change the posture of distal end member 8 relative to proximal end member 1 as desired by changing the respective angles of rotation around first center axes 15a, 15b, and 15c serving as the axes of center of rotation of first link members 4a, 4b, and 4c.

First link members 4a, 4b, and 4c are rotatably connected to proximal end member 1 at the first revolute pair units. Specifically, fixing parts 36a, 36b, and 36c are installed at the outer peripheral portion on the surface of proximal end member 1.

Posture control drive sources 35a, 35b, and 35c are fixed to fixing parts 36a, 36b, and 36c, respectively, and thereby connected to proximal end member 1. Fixing parts 36a, 36b, and 36c may be formed in any shape, for example, in a plate shape.

Posture control drive source 35a, 35b, and 35c are configured to generate torque on shaft portions 37a, 37b, and 37c, respectively. Shaft portions 37a, 37b, and 37c respectively penetrate through fixing parts 36a, 36b, and 36c and fit in through holes 43a, 43b, and 43c provided at the first ends of first link members 4a, 4b, and 4c. The tip end portions of shaft portions 37a, 37b, and 37c are respectively inserted in through holes 43a, 43b, and 43c of first link members 4a, 4b, and 4c and retained by nuts 3a, 3b, and 3c. That is, first link members 4a, 4b, and 4c are fixed to shaft portions 37a, 37b, and 37c, respectively. Rotation of shaft portions 37a, 37b, and 37c causes first link members 4a, 4b, and 4c to rotate around first center axes 15a, 15b, and 15c, respectively. Here, as illustrated in FIG. 31, first center axes 15a, 15b, and 15c are the respective center axes of shaft portions 37a, 37b, and 37c.

Shaft portions 37a, 37b, and 37c and the respective portions of first link members 4a, 4b, 4c having through holes 43a, 43b, and 43c constitute "first revolute pair units".

First link members 4a, 4b, and 4c are rod-shaped members each extending in the form of an arc. Through holes 43a, 43b, and 43c are formed at the first ends of first link members 4a, 4b, and 4c, respectively. As illustrated in FIG. 31, in a two-dimensional view as viewed from a direction vertical to the surface of proximal end member 1, the inner peripheral-side surfaces of first link members 4a, 4b, and 4c are each shaped like a curved surface. The shape of first link members 4a, 4b, and 4c may be a shape other than an arc shape. For example, the shape of first link members 4a, 4b, and 4c may be a rod-like shape extending linearly or a rod-like shape including a bending portion.

In first link members 4a, 4b, and 4c, shaft portions 42a, 42b, and 42c are respectively formed at second ends 41a, 41b, and 41c positioned on the opposite side to the first ends having through holes 43a, 43b, and 43c. Each of shaft portions 42a, 42b, and 42c is formed to extend from the outer periphery of proximal end member 1 toward the outside. Shaft portion 42a, 42b, and 42c are respectively formed on the outer peripheral side surfaces on the opposite side to the arc-shaped inner peripheral side surfaces of first link members 4a, 4b, and 4c. Shaft portions 42a, 42b, and 42c are respectively inserted in through holes 63a, 63b, and 63c of second link members 6a, 6b, and 6c. Nuts 5a, 5b, and 5c, which are an example of the fastening member, are respectively fixed at tip end portions of shaft portions 42a, 42b, and 42c protruding from through holes 63a, 63b, and 63c. Second link members 6a, 6b, 6c are rotatable around shaft portions 42a, 42b, and 42c, respectively. Shaft portions 42a, 42b, and 42c and the respective portions of second link members 6a, 6b, and 6c having through holes 63a, 63b, and 63c constitute "second revolute pair units". That is, second link members 6a, 6b, and 6c are rotatably connected to first link members 4a, 4b, and 4c, respectively, at the second revolute pair units.

Each of first center axes 15a, 15b, and 15c of shaft portions 37a, 37b, and 37c corresponds to the rotation center axis of the "first revolute pair unit". Each of second center axes 16a, 16b, and 16c as the rotation center axes of shaft portions 42a, 42b, and 42c at second ends 41a, 41b, and 41c of first link members 4a, 4b, and 4c corresponds to the rotation center axis of the "second revolute pair unit". As illustrated in FIG. 29 and FIG. 31, first center axes 15a, 15b, and 15c of shaft portions 37a, 37b, and 37c and second center axes 16a, 16b, and 16c of shaft portions 42a, 42b, and 42c intersect at spherical link center point 30. This intersection is a necessary condition, and the arrangement of the first and second revolute pair units can be changed as desired if first center axes 15a, 15b, and 15c of the first revolute pair units and second center axes 16a, 16b, and 16c of the second revolute pair units intersect spherical link center point 30.

Second link members 6a, 6b, and 6c are rod-shaped members each extending linearly. Through holes 63a, 63b, and 63c are formed at the first ends of second link members 6a, 6b, and 6c, respectively. The shape of second link members 6a, 6b, and 6c may be any shape other than the rod-like shape extending linearly. For example, second link members 6a, 6b, and 6c each may be a rod-shaped body extending in the form of an arc.

In second link members 6a, 6b, and 6c, respective depressed portions receiving the first ends of third link members 7a, 7b, and 7c are formed at the second ends positioned on the opposite side to the first ends having through holes 63a, 63b, and 63c, respectively. At the second end of each of second link members 6a, 6b, and 6c, a through hole is formed at a position facing the depressed portion. A through hole 73a (FIG. 32) is also formed at the first end of third link member 7a, and not-shown through holes 73b and 73c are formed at similar positions of the respective first ends of third link members 7b and 7c. The through holes at the second ends of second link members 6a and 6b are respectively arranged to be aligned with through holes 73a and 73b at the first ends of third link members 7a and 7b, and coupling members 13a and 13b are respectively inserted. Similarly, the through hole at the second end of second link member 6c is arranged to be aligned with through hole 73c at the first end of third link member 7c, and coupling member 13c is inserted.

Coupling members 13a, 13b, and 13c respectively couple second link members 6a, 6b, and 6c to third link members 7a, 7b, and 7c such that they are rotatable relative to each other. Coupling members 13a, 13b, and 13c are, for example, bolts and nuts. Coupling members 13a, 13b, and 13c, the second ends of second link members 6a, 6b, and 6c, and the first ends of third link members 7a, 7b, and 7c constitute third revolute pair units. That is, second link members 6a, 6b, and 6c are rotatably connected to third link members 7a, 7b, and 7c, respectively, at the "third revolute pair units".

The respective center axes of coupling members 13a, 13b, and 13c correspond to third center axes 17a, 17b, and 17c each serving as the rotation center axis in the third revolute pair unit. Third center axes 17a, 17b, and 17c extend in directions orthogonal to second center axes 16a, 16b, and 16c, respectively.

Second link members 6a, 6b, and 6c may be configured such that third center axes 17a, 17b, and 17c and second center axes 16a, 16b, and 16c intersect. In this case, the structure of first link members 4a to 4c and the structure of second link members 6a to 6c are slightly different from those described above. Specifically, in such a manner, a through hole is formed at an end (the location of revolute pair unit R2) of each of first link members 4a to 4c, and the location corresponding to revolute pair unit R2 in each of second link members 6a to 6c is formed in the shape of a shaft. In revolute pair unit R2, the shaft-shaped portion of each of second link members 6a to 6c is inserted in the through hole of the corresponding one of first link members 4a to 4c. In each of second link members 6a to 6c, the shaft-shaped portion at revolute pair unit R2 extends like a rod and its end portion serves as a depressed portion for connecting the corresponding one of third link members 7a to 7c. That is, for example, a triangle formed by three points: spherical link center point 30, revolute pair unit R3, and revolute pair unit R4, is a geometric structure that rotates on revolute pair unit R2. Three revolute pair units R2, R3, and R4 are arranged to have such a configuration.

Third link members 7a, 7b, and 7c are rod-shaped members each extending linearly. The shape of third link members 7a, 7b, and 7c may be any shape other than the rod-like shape extending linearly. For example, third link members 7a, 7b, and 7c each may be a rod-shaped body extending in the form of an arc.

In third link members 7a, 7b, and 7c, a through hole 74a (FIG. 32) is formed at a second end positioned on the opposite side to the first end having through hole 73a. Not-shown through holes 74b and 74c are respectively formed in third link members 7b and 7c each at a position similar to that of through hole 74a.

In each of fourth link members 8a, 8b, and 8c, a depressed portion is formed to receive the second end of the corresponding one of third link members 7a, 7b, and 7c. Each of wall portions 83a, 83b, and 83c facing the depressed portions of fourth link members 8a, 8b, and 8c has a through hole continuous to the depressed portion. Through holes 74a, 74b, and 74c at the second ends of third link members 7a, 7b, and 7c are respectively arranged to be aligned with through holes formed at wall portions 83a, 83b, and 83c of fourth link members 8a, 8b, and 8c on a straight line, and coupling members 14a, 14b, and 14c are respectively inserted.

Coupling members 14a, 14b, and 14c respectively couple third link members 7a, 7b, and 7c to fourth link members 8a, 8b, and 8c such that they are rotatable relative to each other. Coupling members 14a, 14b, and 14c are, for example, bolts and nuts. Coupling members 14a, 14b, and 14c, the respective second ends of third link members 7a, 7b, and 7c, and wall portions 83a, 83b, and 83c of fourth link members 8a, 8b, and 8c constitute "fourth revolute pair units". That is, third link members 7a, 7b, and 7c are rotatably connected to fourth link members 8a, 8b, and 8c, respectively, at the fourth revolute pair units.

The respective center axes of coupling members 14a, 14b, and 14c correspond to fourth center axes 18a, 18b, and 18c each serving as the rotation center axis in the fourth revolute pair unit. Fourth center axes 18a, 18b, and 18c extend in directions parallel to third center axes 17a, 17b, and 17c, respectively.

Fourth link members 8a, 8b, and 8c include base portions 81a, 81b, and 81c connected to wall portions 83a, 83b, and 83c, respectively. The two-dimensional shape of base portions 81a, 81b, and 81c is circular. As illustrated in FIG. 32, center shaft 82 is provided at the middle of base portion 81a. Base portion 81b of fourth link member 8b is arranged so as to overlap base portion 81a. A through hole is formed at the middle of base portion 81b. Base portion 81c of fourth link member 8c is arranged so as to overlap base portion 81b. A through hole is formed at the middle of base portion 81c. Base portions 81b and 81c are stacked on base portion 81a with center shaft 82 inserted in their respective through holes. Nut 9 is installed as a fastening member at the tip end of center shaft 82. Fourth link members 8a, 8b, and 8c are rotatable independently of each other around center shaft 82. In parallel link mechanism 10 illustrated in FIG. 29 to FIG. 32, center shaft 82 of the stacked fourth link members 8a, 8b, and 8c or base members 81a, 81b, and 81c can be considered as distal end member 8. As a distal end member, another member may be connected to center shaft 82 or one of base portions 81a, 81b, and 81c.

In the configuration as described above, base portions 81a, 81b, and 81e, center shaft 82, and nut 9 constitute "fifth revolute pair units". As can be understood from FIG. 29, fifth center axes 19 as the rotation center axes of the fifth revolute pair units of three link mechanisms 11 are arranged to overlap each other. That is, the fifth revolute pair units of a plurality of link mechanisms 11 are arranged to overlap each other at one place. A bolt that is a member separate from base portion 81a may be used as center shaft 82. In this case, a through hole receiving the bolt is formed at the middle portion of base portion 81a.

In fourth link members 8a, 8b, and 8c, fourth center axes 18a, 18b, and 18c of the fourth revolute pair units and fifth center axes 19 of the fifth revolute pair units are in a twisted arrangement. More specifically, fourth center axes 18a, 18b, and 18c of the fourth revolute pair units extend in directions orthogonal to fifth center axes 19 of the fifth revolute pair units.

As illustrated in FIG. 29 and FIG. 31, first center axes 15a, 15b, and 15c of the first revolute pair units and second center axes 16a, 16b, and 16c of the second revolute pair units intersect at spherical link center point 30. As illustrated in FIG. 32, the common fifth center axes 19 of the fifth revolute pair units of the link mechanisms 11 intersect with spherical link center point 30. As long as the relation above is satisfied, the arrangement of the pair units can be set as desired.

<Operation of Parallel Link Mechanism>

Figure 33:
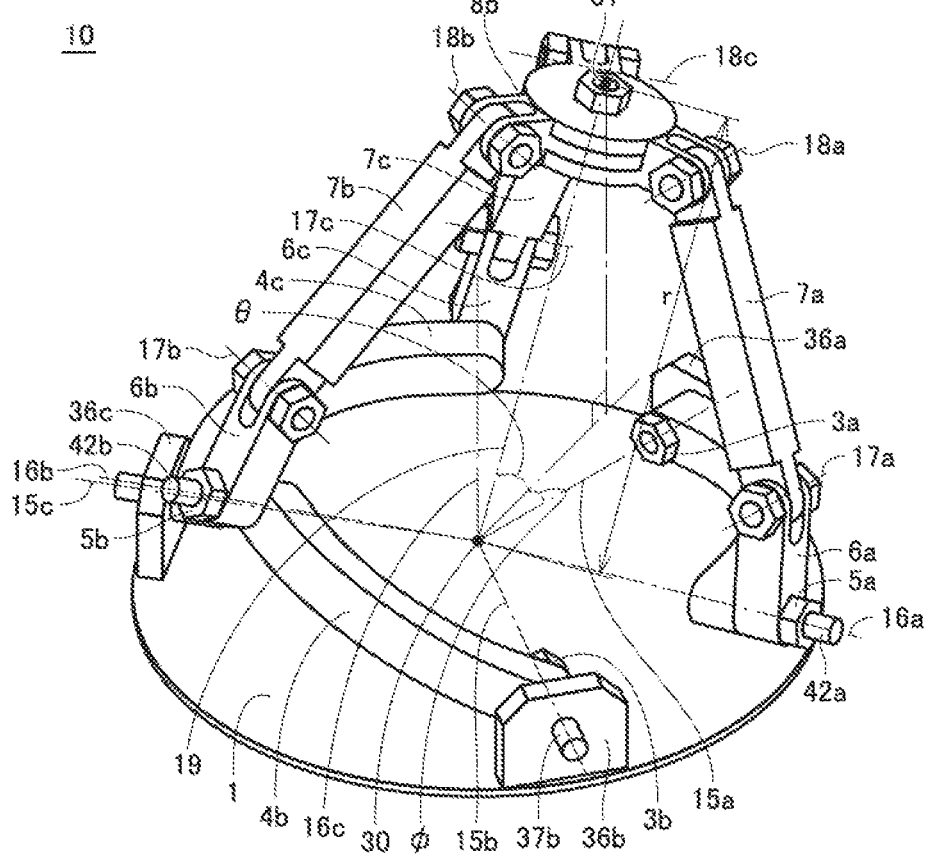
FIG. 33 is a perspective view illustrating a state in which the posture of the distal end member is changed in the parallel link mechanism illustrated in FIG. 29.

FIG. 33 is a perspective view illustrating a state in which the posture of the distal end member is changed in the parallel link mechanism illustrated in FIG. 29. As illustrated in FIG. 33, the position of distal end member 8 can be changed as desired by changing the respective angles of rotation around first center axes 15a, 15b, and 15c in the first revolute pair units of first link members 4a, 4b, and 4c. In FIG. 33, the angle of rotation around first center axis 15b of first link member 4b is relatively increased so that the fourth link member 8b side of distal end member 8 is lifted upward, and the entire distal end member 8 moves to the opposite side to the side on which fourth link member 8b is positioned as viewed from distal end member center 31.

In parallel link mechanism 10 illustrated in FIG. 29 to FIG. 33, because of the configuration as described above, distal end member 8 operates on a sphere around spherical link center point 30. That is, as illustrated in FIG. 33, the posture of distal end member 8 can be represented by three-dimensional polar coordinates (θ, φ, r) in which spherical link center point 30 is the origin. As illustrated in FIG. 33, as used herein the bend angle θ is the angle formed by: a straight line passing through spherical link center point 30 and a point at which a line extending downward vertically from distal end member center 31 intersects a plane including first center axes 15a, 15b, and 15c of the first revolute pair units that are connecting parts between proximal end member 1 and first link members 4a, 4b, and 4c; and fifth center axis 19 that is the center axis of distal end member 8. The turning angle φ is the angle formed by: a straight line passing through spherical link center point 30 and a point at which a line extending downward vertically from distal end member center 31 intersects a plane including first center axes 15a, 15b, and 15c; and first center axis 15a of the first revolute pair unit of link mechanism 11. The center-to-center distance r is the distance between spherical link center point 30 and distal end member center 31.

In parallel link mechanism 10 according to the present disclosure, since each of three or more link mechanisms 11 is a five-bar chain structure having first to fifth revolute pair units, distal end member 8 can be moved relative to proximal end member 1 with, in total, three degrees of freedom including two degrees of freedom of rotation around spherical link center point 30 and one degree of freedom in a direction along fifth center axis 19. Therefore, distal end member 8 can be moved relative to proximal end member 1 along a sphere around spherical link center point 30 and also can be moved in a direction along fifth center axis 19 independently of the movement along the sphere. As a result, distal end member 8 can be moved along the sphere, and the radius of the sphere along which distal end member 8 moves can be adjusted, so that the operable range of distal end member 8 can be increased compared with when distal end member 8 can move only along a sphere with a fixed radius. As used herein "fourth link members 8a, 8b, and 8c are configured to be rotatably connected to distal end member 8 at the fifth revolute pair units" means that fourth link members 8a, 8b, and 8c have a portion that can connect the distal end member as a separate member, and includes a case where a part of fourth link members 8a, 8b, and 8c functions as the distal end member.

<Description of Drive Control of Posture Control Drive Sources>

Referring to FIG. 28 again, an overview of control device 100 that controls the posture control drive sources will be described. Control device 100 includes an external command converter 101, individual controllers 102a, 102b, and 102c, a torque detector 103, and a load detector 104.

Individual controller 102a includes a position command converter 111 and a current generator 112. Although not illustrated, individual controllers 102b and 102c have a configuration similar to individual controller 102a.

Individual controllers 102a, 102b, and 102c for feeding current are respectively connected to posture control drive sources 35a, 35b, and 35c for rotating first link members 4a, 4b, and 4c. Here, control device 100 in the present eleventh embodiment is characterized in that torque detector 103 and load detector 104 are provided separately from individual controllers 102a, 102b, and 102c.

A posture change command for posture control drive sources 35a, 35b, and 35c is given through the following procedure. First, external command device 150 sends an operation command (for example, target (θ, φ, r)) to external command converter 101. Second, external command converter 101 converts the operation command to a position command for each motor and sends the position command to position command converter 111 of each of individual controllers 102a, 102b, and 102c. Third, position command converter 111 converts the position command to a current command for the motor and sends the current command to current generator 112. Fourth, current generator 112 generates current in proportion to the current command and feeds current to the corresponding posture control drive source 35a, 35b, 35c. In doing so, control device 100 measures the current actually flowing and performs feedback control. Current generator 112 has a not-shown current sensor because it is necessary to monitor a current command for the motor and current fed to the motor for feedback control.

When a motor is used as posture control drive sources 35a, 35b, and 35c, torque can be estimated from the current command or current in the motor since there is a correlation between current and torque. For example, when a load is exerted on distal end member 8 from a certain direction, current generated in each motor increases or decreases in order to keep the posture. The load can be estimated by load detector 104 which calculates the direction and magnitude of torque from a current value of each monitor or a current command value at the moment and estimating the direction and magnitude of the load exerted on distal end member 8. With the current sensor, torque and load can be estimated by software from the detected current value, and the load can be detected without separately providing a torque sensor or a load sensor.

External output terminals 151 and 152 may be provided for outputting the respective detection results of torque detector 103 and load detector 104 to the outside. When external output terminals 151 and 152 are provided, the detection results can be referred to from external command device 150 or another external control device.

Figure 34:
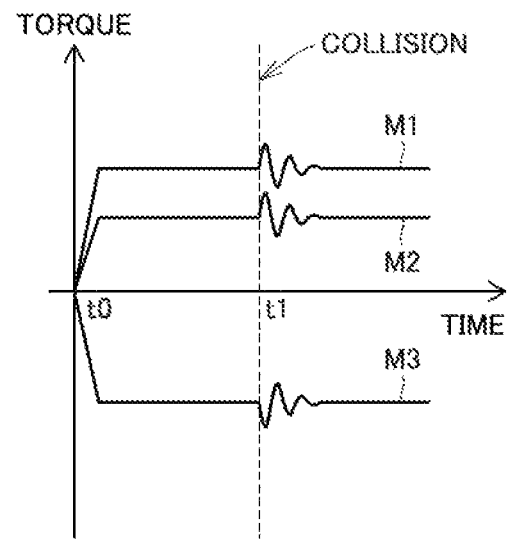
FIG. 34 is a graph illustrating the torque of motors when interference occurs during operation (in a case of a collision).

FIG. 34 is a graph illustrating the torque of each motor (35a, 35b, 35c) when interference occurs during operation (in a case of a collision). When distal end member 8 is driven, each motor gives torque as illustrated at time t0 to t1 in FIG. 34 to rotate the link member (4a, 4b, 4c). Torques M1, M2, and M3 in normal operation exhibit a certain value at a low level, but when some interference occurs to distal end member 8 at time t1 during operation, the interference increases or decreases torques M1, M2, and M3 of the motors.

Figure 35:
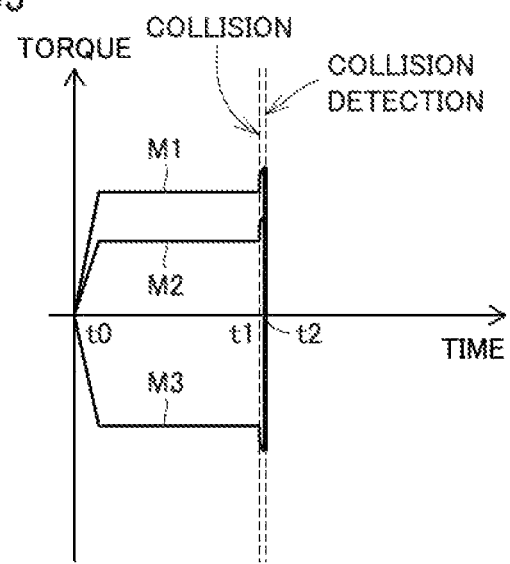
FIG. 35 is a diagram for explaining an example in which control is performed by detecting disturbance in torque when interference occurs at the distal end member of the link actuation device.

FIG. 35 is a diagram for explaining an example in which control is performed by detecting disturbance in torque when interference occurs to the distal end member of the link actuation device. In FIG. 35, when disturbance in torques M1, M2, and M3 is detected at time t1, it is assumed that a collision has occurred and at time t2, for example, torques M1, M2, and M3 of the motors are set to zero after time t2 to make emergency stop of the link actuation device.

Figures 36, 37:
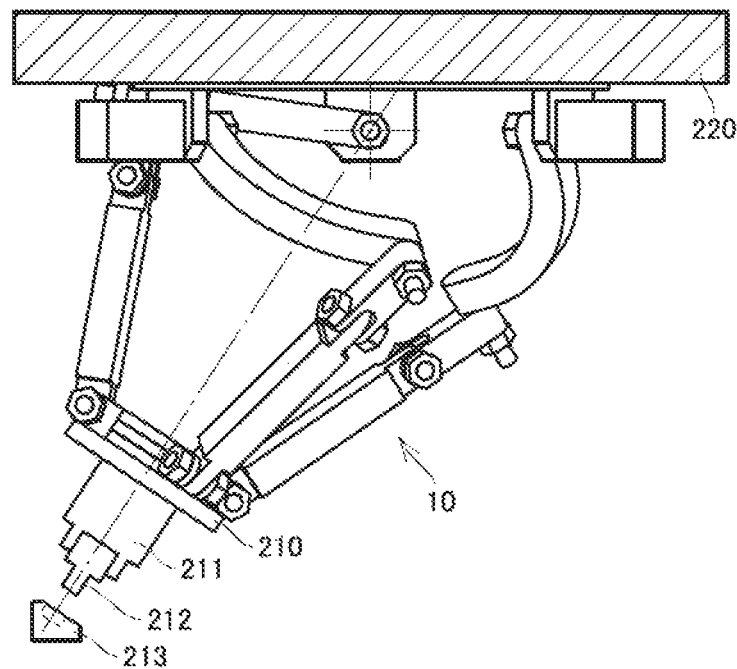
FIG. 36 is a diagram illustrating an example of a database of torque acting on motors that is provided in a control device.
FIG. 37 is a diagram illustrating a first working example to which load estimation is applied.

FIG. 36 is a diagram illustrating an example of a database of torque acting on each motor that is provided in the control device. In a certain posture of the link actuation device, the torque (T1, T2, T3) of each motor in the direction and magnitude (acting force) of a load exerted on the distal end portion can be determined by calculation. However, preferably, as illustrated in FIG. 36, a database is registered in advance, and control device 100 refers to the database to estimate the direction and magnitude of the load from the torque (T1, T2, T3) at the time when a load is exerted. With this configuration, a load can be estimated faster.

FIG. 37 is a diagram illustrating a first working example to which load estimation is applied. In FIG. 37, a hand 211 is mounted as a working body on parallel link mechanism 10. A base member 210 is fixed to distal end member 8, and hand 211 is attached to base member 210. Hand 211 thus can make a motion similar to that of distal end member 8. That is, (θ, φ, r) of hand 211 can be controlled by parallel link mechanism 10. Center shaft 82 is hollow so that a control cable for controlling grip and release of hand 211 can pass through the inside of center shaft 82 in FIG. 32. In this manner, the first working example is the operation of inserting connector 212 as a work target into a hole in the workbench 213 installed obliquely, using hand 211 attached to parallel link mechanism 10.

Figure 38:
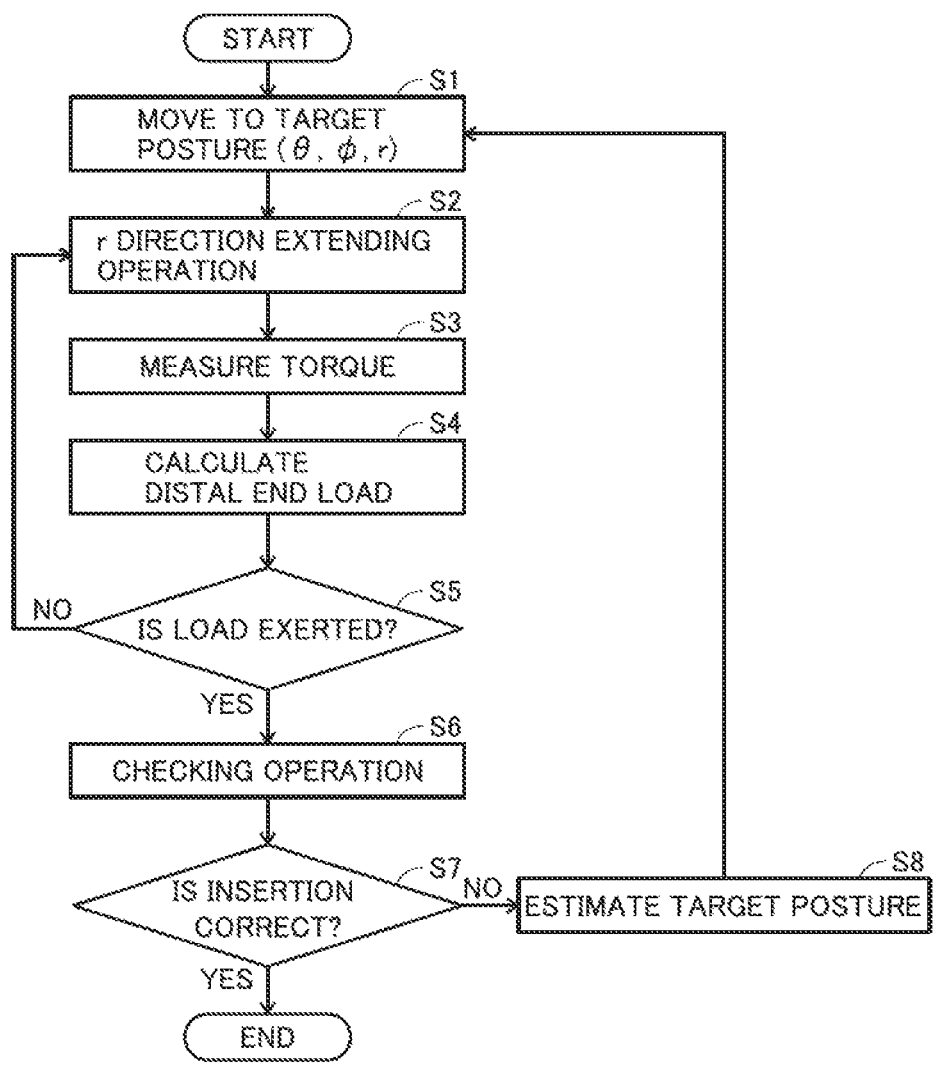
FIG. 38 is a flowchart illustrating a method of measuring and estimating a load exerted on a working body by calculation.
Figure 39:
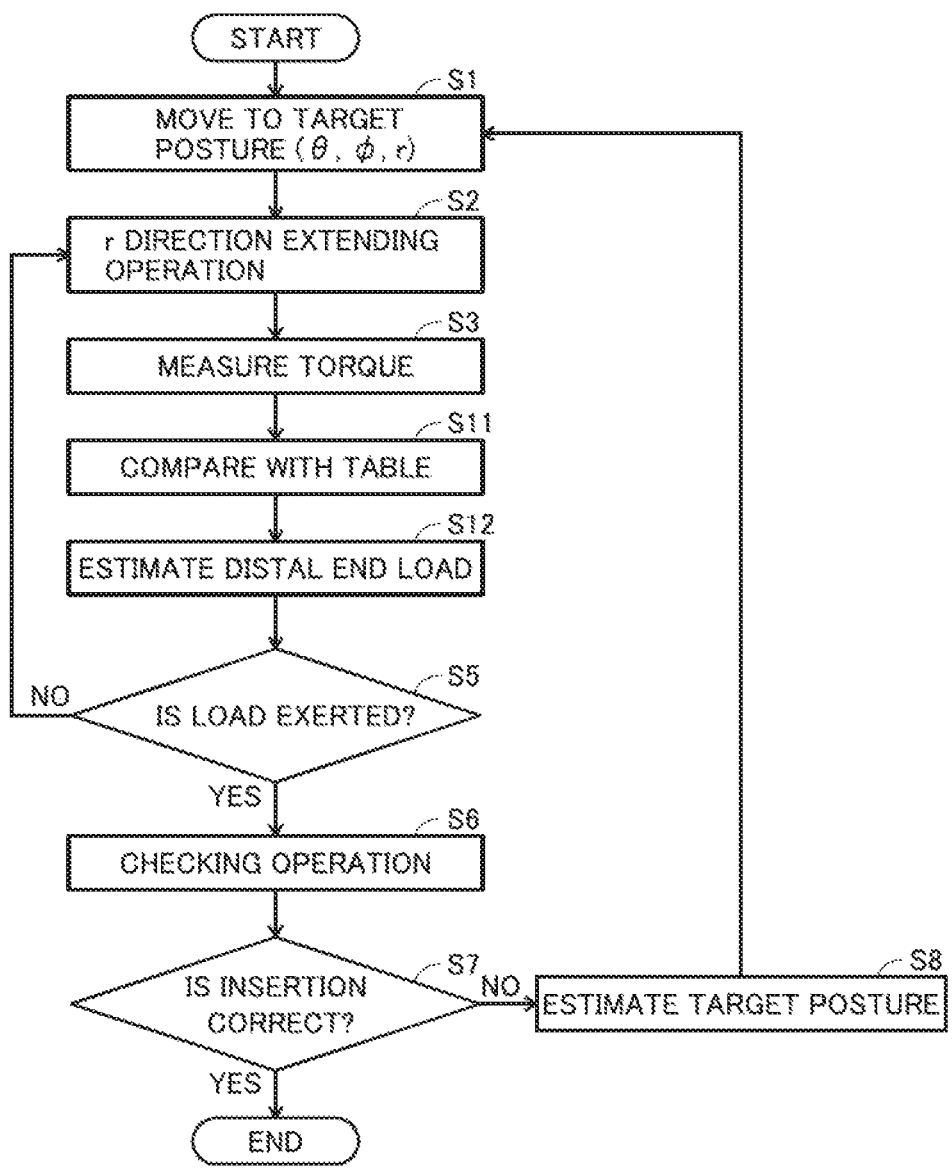
FIG. 39 is a flowchart illustrating a method of measuring and estimating a load exerted on a working body using a table.

A flowchart illustrating control of this operation is shown in FIG. 38 and FIG. 39. FIG. 38 is a flowchart illustrating a method of measuring and estimating a load exerted on the working body by calculation.

First, at step S1, control device 100 changes the posture of parallel link mechanism 10 to take a position immediately before connector insertion, which is the initial target posture represented by three-dimensional polar coordinates (θ, φ, r). When parallel link mechanism 10 disclosed in the present eleventh embodiment is used, subsequently at step S2, r is operated in the extending direction so that connector 212 can be fitted in from a direction along the depth direction of the hole in workbench 213.

In doing so, at step S3, control device 100 measures the torque of the motor in operation and estimates the distal end load by calculation at step S4.

If no load is exerted at step S5 (NO at S5), parallel link mechanism 10 is extended in the r direction until a load is exerted. At a point of time when a load is exerted at step S5 (YES at S5), the operation of hand 211 is stopped. Then, at step S6, a checking operation is performed. The checking operation is the operation of checking whether connector 212 has been inserted into a connector slot in workbench 213, based on the load during operation (torque). For example, the insertion can be checked with a database including a load (torque) at the time of completion of insertion in a certain operation. If insertion of the connector is confirmed as a result of the checking operation at step S6 (YES at S7), the process ends. If not confirmed (NO at S7), a target position is estimated again based on the direction and magnitude of the load exerted on the distal end at step S8. A series of operation continues to enable insertion of the connector.

FIG. 39 is a flowchart illustrating a method of measuring and estimating a load exerted on the working body using a table. The flowchart in FIG. 39 illustrates the process in which the process at step S4 in the flowchart in FIG. 38 is replaced by steps S11 and S12. The process at steps S1 to S3 and S5 to S8 is the same as the one described in FIG. 38 and will not be further elaborated. In FIG. 39, at step S11, the load at the distal end portion is estimated by referring to a table as illustrated in FIG. 36 to compare each torque value with the measured torque value and selecting data indicating the closest value (step S12). Then, at step S5, a determination is executed using the estimated load.

Figure 40:
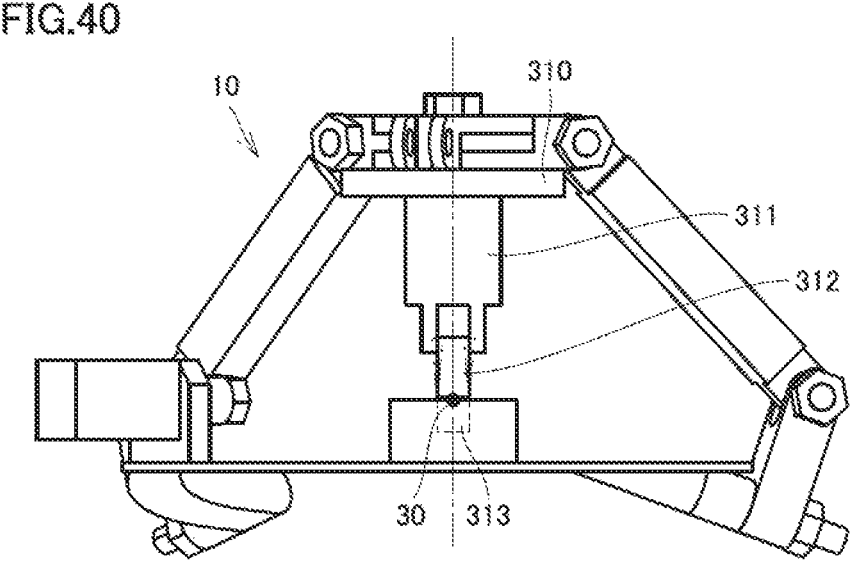
FIG. 40 is a diagram illustrating a second working example to which load estimation is applied.

FIG. 40 is a diagram illustrating a second working example to which load estimation is applied. In FIG. 40, a hand 311 is mounted as a working body on parallel link mechanism 10 in the orientation opposite to that in FIG. 37. A base member 310 is fixed to distal end member 8, and hand 311 is attached to base member 310. Hand 311 thus can make a motion similar to that of distal end member 8. That is, (θ, φ, r) of hand 311 can be controlled by parallel link mechanism 10. FIG. 40 illustrates an operation of pushing a pin 312 into a pin slot in a workbench 313. Hand 311 as a working body grips pin 312. Then, the pin is inserted while the operation of aligning the pin with the pin slot in workbench 313 formed in the vertical direction is performed.

Figure 41:
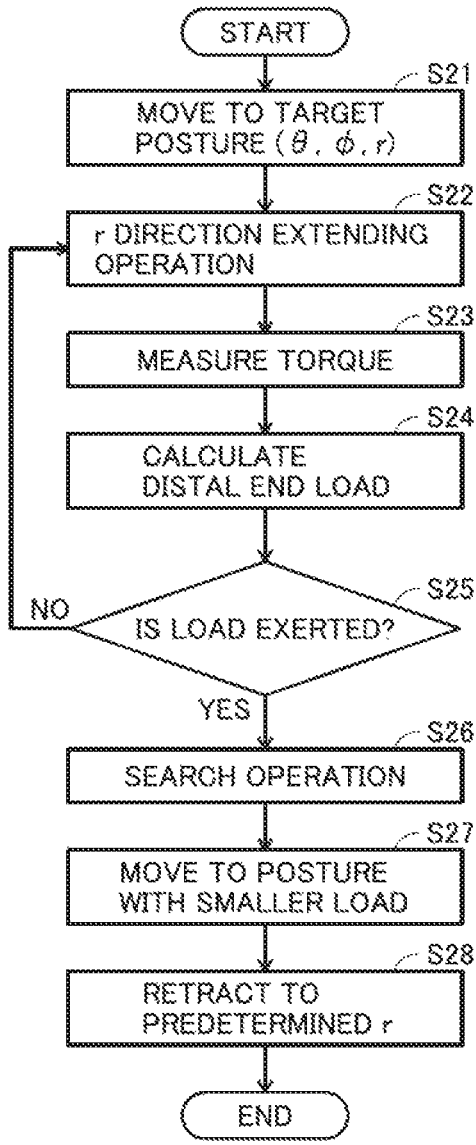
FIG. 41 is a flowchart for explaining a pin pushing operation.

FIG. 41 is a flowchart for explaining the pin pushing operation. First, at step S21, control device 100 changes the posture of parallel link mechanism 10 to take a position immediately before pin insertion, which is the initial target posture represented by three-dimensional polar coordinates (θ, φ, r). Subsequently, at step S22, control device 100 operates r minutely in the retracting direction (downward in FIG. 40) and performs torque measurement (step S23) and distal end load calculation (S24), and at step S25, it is determined whether a load corresponding to a collision is exerted on the distal end portion. Control device 100 repeats the process at steps S22 to S25 until a collision with workbench 313 occurs.

At step S25, if a load corresponding to a collision is detected, control device 100 performs a search operation at the position where pin 312 has collided against parallel link mechanism 10 at step S26. The search operation is an operation of searching for the angle at which the depth direction of the hole agrees with the direction of the pin. The search operation is, for example, but not limited to, the operation of making a turn with the turning angle φ at a minute bend angle θ from the collision position. Subsequently, at step S27, control device 100 sets parallel link mechanism 10 to a posture at which a load is smallest, and, at step S28, manipulates parallel link mechanism 10 such that pin 312 is pushed up to a predetermined r value (pin push completion value). With such processing, the link actuation device in the present eleventh embodiment enables insertion of pin 312 into the pin slot from an appropriate direction.

The calculation process at step S23 in FIG. 41 may be changed to a process of using a table in the same manner as steps S11 and S12 in FIG. 39.

Lastly, referring to FIG. 28 again, the present eleventh embodiment will be summarized. Link actuation device 200 controls the position and posture of distal end member 8 using parallel link mechanism 10 described in detail with reference to FIG. 29 to FIG. 33. Parallel link mechanism 10 includes proximal end member 1 and at least three link mechanisms 11 configured to connect proximal end member 1 to distal end member 8.

At least three link mechanisms 11 each include first link member 4a, 4b, 4c rotatably connected to proximal end member 1 at the first revolute pair unit, second link member 6a, 6b, 6c rotatably connected to first link member 4a, 4b, 4c at the second revolute pair unit, third link member 7a, 7b, 7c rotatably connected to second link member 6a, 6b, 6c at the third revolute pair unit, and fourth link member 8a, 8b, 8c rotatably connected to third link member 7a, 7b, 7c at the fourth revolute pair units. In each of at least three link mechanisms 11, first center axis 15a, 15b, 15c of the first revolute pair unit and second center axis 16a, 16b, 16c of the second revolute pair unit intersect at a single spherical link center point 30. The respective fourth link members 8a, 8b, and 8c of at least three link mechanisms 11 are rotatably connected to each other at the fifth revolute pair unit. Fifth center axis 19 of the fifth revolute pair unit passes through spherical link center point 30. Fourth link member 8a of at least one of at least three link mechanisms 11 is fixed to distal end member 8 at the fifth revolute pair unit. Link actuation device 200 includes: first to third posture control drive sources 35a, 35b, and 35c provided corresponding to the first to third link mechanisms among at least three link mechanisms 11 and configured to change the rotation angles at the respective first revolute pair units of first link members 4a, 4b, and 4c; and control device 100 that estimates respective torques of posture control drive sources 35a, 35b, and 35c, based on values of current flowing through posture control drive sources 35a, 35b, and 35c or current command values and estimates a load acting on distal end member 8 based on the estimated torques of posture control drive sources 35a, 35b, and 35c.

As illustrated in FIG. 28, control device 100 for a motor (posture control drive source) used in posture control for the link actuation device includes torque detector 103 for detecting torque of the motor from the magnitude of current for driving the motor and further includes load detector 104 that estimates a load acting on distal end member 8 from the torque of the motor, thereby estimating a load without providing a dedicated sensor. This contributes to downsizing and cost reduction of link actuation device 200. Link actuation device 200 can move smoothly in all directions with no singular point within an operable range. Therefore, even when a load acts on distal end member 8 from various directions in a given posture, torque is reliably transmitted to the motor, and the load can be estimated accurately.

Preferably, control device 100 detects that a collision has occurred to distal end member 8 or a working body mounted on distal end member 8 from the amount of change in the estimated torque of each posture control drive source 35a, 35b, 35c and suspends the operation of each posture control drive source 35a, 35b, 35c. For example, as the suspension process, the torque of posture control drive sources 35a, 35b, and 35c may be set to zero, or the direction of receiving the load may be calculated and distal end member 8 may be moved in a direction opposite to the calculated direction.

In this way, a collision may be detected from the amount of change in torque at the time when distal end member 8 or a working body mounted on distal end member 8 collides against another object, and measures such as stopping the device may be taken. With this configuration, even when link actuation device 200 comes into contact with a person or an object, the contact can be detected, and measures such as stopping link actuation device 200 can be taken to improve safety.

Preferably, a working body is mounted on distal end member 8. Control device 100 controls each posture control drive source 35a, 35b, 35c such that the operation of pushing a member (for example, connector) gripped by the working body illustrated in FIG. 37 to FIG. 39 into another member (for example, terminal block) or the operation of pulling a member (for example, pin) gripped by the working body illustrated in FIG. 40 and FIG. 41 out of another member (for example, a member having a hole) is performed while the estimated torque of each posture control drive source 35a, 35b, 35c is monitored.

In this way, link actuation device 200 can be applied to an assembly device that is equipped with a working body or a work target mounted on the distal end of parallel link mechanism 10 and performs workings such as pushing/removing a work target while detecting torque. This configuration can provide a device capable of working using feedback of torque, such as positioning operation by searching.

It is preferable that control device 100 includes, for load estimation, a database that indicates a relation between torque acting on each motor and a load acting on the distal end, or a calculation formula for determining a load acting on the distal end from the torque acting on each motor. With this configuration, the load on the distal end side can be estimated from the torque value detected by the torque detector.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 proximal end member, 2a, 2b, 2c proximal-end connecting portion, 3a, 3b, 3c, 5a, 5b, 5c, 9 nut, 4a, 4b, 4c first link member, 6a, 6b, 6c second link member, 7a, 7b, 7bc, 7c third link member, 8 distal end member, 8a, 8b, 8c fourth link member, 10 parallel link mechanism, 10A, 10B, 10C link actuation device, 11 link mechanism, 13a, 13b, 13c, 14a, 14b, 14c coupling member, 15a, 15b, 15c first center axis, 16a, 16b, 16c second center axis, 17a, 17b, 17c third center axis, 18a, 18b, 18c fourth center axis, 19 fifth center axis, 21 base portion, 22, 42 shaft portion, 25, 26, 27, 28, 29 bearing, 30 spherical link center point, 31 distal end member center, 35a, 35b, 35c posture control drive source, 36a, 36b, 36c fixing part, 37 rotation shaft, 37a, 37b, 37c, 42a, 42b, 42c shaft portion, 38, 39 gear, 41, 41a, 41b, 41c second end, 43, 43a, 43b, 43c, 63, 63a, 63b, 63c, 73, 73a, 73b, 73c, 74, 74a, 74b, 74c through hole, 45 opening, 81a, 81b, 81c base member, 82 center axis, 83, 83a, 83b, 83c wall portion, 100 control device, 101 external command converter, 102a, 102b, 102c individual controller, 103 torque detector, 104 load detector, 111 position command converter, 112 current generator, 121 working body attachment member, 122 through hole, 123 bolt-accommodating hole, 124 bolt, 125 hole, 126 attachment portion, 127 working body, 128 work target, 129 workbench, 130 proximal end member through hole, 150 external command device, 151, 152 external output terminal, 200 link actuation device, 211, 311 hand, 212 connector, 213, 313 workbench.

The invention claimed is:

1. A parallel link mechanism comprising:
a proximal end member; and
three or more link mechanisms, wherein
the three or more link mechanisms connect the proximal end member to a distal end member,
the three or more link mechanisms are capable of changing a posture of the distal end member relative to the proximal end member,
each of the three or more link mechanisms includes
a first link member rotatably connected to the proximal end member at a first revolute pair unit,
a second link member rotatably connected to the first link member at a second revolute pair unit, a third link member rotatably connected to the second link member at a third revolute pair unit, and a fourth link member rotatably connected to the third link member at a fourth revolute pair unit, the fourth link member is rotatably connected to the distal end member at a fifth revolute pair unit, in the three or more link mechanisms, a first center axis of the first revolute pair unit and a second center axis of the second revolute pair unit intersect at a spherical link center point, and fifth center axes of the respective fifth revolute pair units of the three or more link mechanisms overlap each other and intersect with the spherical link center point.

2. The parallel link mechanism according to claim 1, wherein a third center axis of the third revolute pair unit and a fourth center axis of the fourth revolute pair unit extend in parallel with each other and extend in a direction intersecting the second center axis.

3. The parallel link mechanism according to claim 2, wherein the third center axis and the fourth center axis extend in a direction orthogonal to the second center axis.

4. The parallel link mechanism according to claim 1, wherein at least one of the first to fifth revolute pair units includes a bearing.

5. The parallel link mechanism according to claim 1, wherein when the proximal end member is two-dimensionally viewed from the distal end member, the second revolute pair unit is positioned outside of an outer periphery of the proximal end member.

6. The parallel link mechanism according to claim 1, wherein the proximal end member has an opening, and when the proximal end member is two-dimensionally viewed from the distal end member, the second revolute pair unit is positioned inside of the opening.

7. A link actuation device comprising:

the parallel link mechanism according to claim 1; and a posture control drive source installed in each of at least three link mechanisms among the three or more link mechanisms, the posture control drive source changing a posture of the distal end member relative to the proximal end member as desired.

8. A link actuation device comprising:

a proximal end member; and three or more link mechanisms, wherein the three or more link mechanisms connect the proximal end member to a distal end member, the three or more link mechanisms are capable of changing a posture of the distal end member relative to the proximal end member, each of the three or more link mechanisms includes a first link member rotatably connected to the proximal end member at a first revolute pair unit, a second link member rotatably connected to the first link member at a second revolute pair unit, a third link member rotatably connected to the second link member at a third revolute pair unit, and a fourth link member rotatably connected to the third link member at a fourth revolute pair unit, the fourth link member is rotatably connected to the distal end member at a fifth revolute pair unit, in the three or more link mechanisms, a first center axis of the first revolute pair unit and a second center axis of the second revolute pair unit intersect at a spherical link center point, and fifth center axes of the respective fifth revolute pair units of the three or more link mechanisms overlap each other and intersect with the spherical link center point, the link actuation device further comprising:

a posture control drive source installed in each of at least three link mechanisms among the three or more link mechanisms, the posture control drive source changing a posture of the distal end member relative to the proximal end member as desired; and a working body attachment member fixed to any of the three or more fourth link members.

9. The link actuation device according to claim 8, wherein a working body that performs working is attachable to the working body attachment member, and the working body is attached to the working body attachment member such that a center of gravity of the working body is arranged on the proximal end member side with respect to the distal end member.

10. The link actuation device according to claim 9, wherein the working body attachment member is fixed to face the proximal end member side of the distal end member, and a work target operated by the working body is able to be arranged on the proximal end member side with respect to the distal end member.

11. The link actuation device according to claim 10, wherein the work target is able to be arranged between the distal end member and the proximal end member.

12. The link actuation device according to claim 10, wherein the proximal end member has a proximal end member through hole, the work target is able to be arranged on a side opposite to the distal end member relative to the proximal end member, and the working body is able to work on the work target arranged on the side opposite to the distal end member with the proximal end member through hole interposed.

13. A link actuation device that uses a parallel link mechanism including a proximal end member and at least three link mechanisms connecting the proximal end member to a distal end member and controls a position and a posture of the distal end member, each of the at least three link mechanisms including a first link member rotatably connected to the proximal end member at a first revolute pair unit, a second link member rotatably connected to the first link member at a second revolute pair unit, a third link member rotatably connected to the second link member at a third revolute pair unit, and a fourth link member rotatably connected to the third link member at a fourth revolute pair unit, wherein in each of the at least three link mechanisms, a first center axis of the first revolute pair unit and a second center axis of the second revolute pair unit intersect at a single spherical link center point, the fourth link members of the at least three link mechanisms are rotatably connected to each other at a fifth revolute pair unit, a fifth center axis of the fifth revolute pair unit passes through the spherical link center point, and the fourth link member of at least one link mechanism among the at least three link mechanisms is fixed to the distal end member at the fifth revolute pair unit, the link actuation device comprising:

first to third posture control drive sources provided corresponding to first to third link mechanisms among the at least three link mechanisms, each of the first to third posture control drive sources changing a rotation angle at the first revolute pair unit of a corresponding first link member; and a control device that estimates respective torques of the first to third posture control drive sources based on values of current flowing through the first to third posture control drive sources or current command values and estimates a load acting on the distal end member based on the estimated torques.

14. The link actuation device according to claim 13, wherein the control device detects that a collision occurs to the distal end member or a working body mounted on the distal end member from the amount of change in the estimated torques and interrupts operation of the first to third posture control drive sources.

15. The link actuation device according to claim 13, wherein a working body is mounted on the distal end member, and the control device controls the first to third posture control drive sources such that an operation of pushing the working body into a work target or an operation of pulling the working body out of the work target is performed while the estimated torques are monitored.

* * * * *